US006801327B1

(12) United States Patent
Haneda et al.

(10) Patent No.: US 6,801,327 B1
(45) Date of Patent: *Oct. 5, 2004

(54) FILING SYSTEM AND METHOD, AND APPARATUS AND METHOD FOR REPRODUCING IMAGE DATA

(75) Inventors: Norihisa Haneda, Asaka (JP); Kenji Kojima, Tokyo (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,447

(22) Filed: Jan. 29, 1997

(30) Foreign Application Priority Data

| Jan. 30, 1996 | (JP) | 8-034283 |
| Jan. 31, 1996 | (JP) | 8-035780 |

(51) Int. Cl.⁷ ............................................. B41B 13/00
(52) U.S. Cl. ................... 358/1.1; 358/1.18; 358/527; 358/471
(58) Field of Search ................... 395/101, 117; 358/527, 450, 540, 448, 487, 506, 1.1, 1.18, 471; 355/40

(56) References Cited

U.S. PATENT DOCUMENTS

| 4,888,648 A | * 12/1989 | Takeuchi et al. ............. 358/906 |
| 5,016,114 A | * 5/1991 | Sakata et al. ................. 358/404 |
| 5,146,548 A | * 9/1992 | Bijnagte ...................... 358/1.18 |
| 5,267,333 A | * 11/1993 | Aono et al. ................... 358/450 |
| 5,293,475 A | * 3/1994 | Hennigan et al. ............ 358/451 |
| 5,394,406 A | * 2/1995 | Ono et al. .................... 714/748 |
| 5,459,819 A | * 10/1995 | Watkins et al. ............. 358/1.18 |
| 5,477,264 A | * 12/1995 | Sarbadhikari et al. ...... 348/231 |
| 5,543,925 A | * 8/1996 | Timmermans ................ 386/40 |
| 5,563,722 A | * 10/1996 | Norris ......................... 358/453 |

(List continued on next page.)

FOREIGN PATENT DOCUMENTS

| JP | 6-276473 | 9/1994 |
| JP | 6-350817 | 12/1994 |
| JP | 7-182366 | 7/1995 |

*Primary Examiner*—Edward Coles
*Assistant Examiner*—Joseph R. Pokrzywa
(74) *Attorney, Agent, or Firm*—Birch, Stewart, Kolasch & Birch, LLP

(57) ABSTRACT

A virtual photo album is created in conformity with a title given to a large number of images such as the images of flowers, the images of animals and the images of a journey. These images are recorded on film and a title is selected for a set of these images that have a subject in common. Data representing the image of a mount, an ornamental image and background music corresponding to the selected tire are stored on a large-scale storage medium such as an optical disk together with the image data. At playback, images belonging to the same title are pasted on a mount specified by the title. An album of images having a common title can thus be produced. In another aspect, images produced by a user are printed by a photo processing laboratory system at a comparatively high speed. Image data are stored on a digital medium, and a directory "DFS" managed by a directory "ROOT", a directory "INFO" managed by the directory "DFS", and a directory "ODR" managed by the directory "INFO" are created on the digital medium storing the image data. An image represented by image data that have been stored on the digital medium is processed by the user's own filing system, and ordered image data representing this processed image are stored in the directory "ODR". The ordered image data that have been stored in the directory "ODR" are read out and printed by the laboratory system. This makes rapid printing possible in a comparatively simple manner.

19 Claims, 80 Drawing Sheets

U.S. PATENT DOCUMENTS

| | | | | |
|---|---|---|---|---|
| 5,595,389 A | * | 1/1997 | Parulski et al. | 463/31 |
| 5,608,542 A | * | 3/1997 | Krahe et al. | 358/449 |
| 5,633,678 A | * | 5/1997 | Parulski et al. | 348/232 |
| 5,706,097 A | * | 1/1998 | Schelling et al. | 358/401 |
| 5,706,457 A | * | 1/1998 | Dwyer et al. | 345/349 |
| 5,734,915 A | * | 3/1998 | Roewer | 707/512 |
| 5,786,904 A | * | 7/1998 | Narita | 358/487 |
| 5,838,457 A | * | 11/1998 | Umemoto | 358/302 |
| 6,005,679 A | * | 12/1999 | Haneda | 358/453 |
| 6,249,644 B1 | * | 6/2001 | Inoue et al. | 386/130 |

* cited by examiner

Fig. 2

| SS | VER | ID | LNG | DATA | LCR | ES |

Fig.50

WHICH COMPONENT DO YOU WISH TO CHANGE?

MOUNT — $A_{91}$

ORNAMENTAL IMAGE — $A_{92}$

BGM — $A_{93}$

Fig. 51
WHICH MOUNT DO YOU WISH TO SELECT?
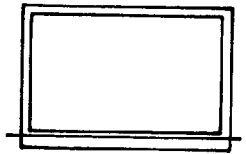
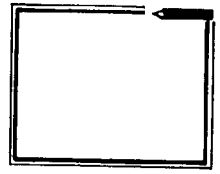

CREATION OF NEW IMAGE

CHANGE OF BACKGROUND

OPENING OF RECORDED IMAGE
PHT0001.JPG

From: John and Jane Doe,
Jimmy and Bobby
123-45 Street,
New York, N.Y.

SAMPLE IMAGE $A_F$

Fig.66a1
FOR FATHER
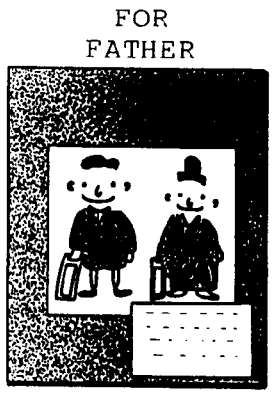
Fig.66b1
FOR MOTHER
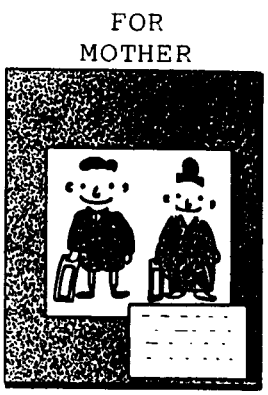
Fig.66c1
FOR CHILDREN (Jimmy and Bobby)
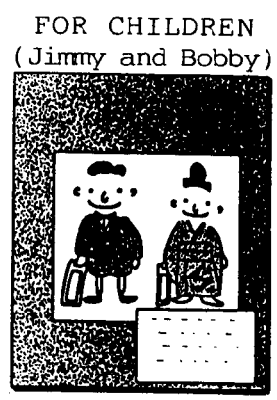
Fig.66a2
A2 WITH INSERTED CHARACTERS
Fig.66b2
B2 WITH INSERTED CHARACTERS
Fig.66c2
C2 WITH INSERTED CHARACTERS
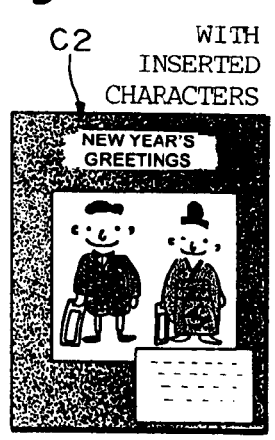
Fig.66a3
WITH INSERTED ORNAMENTAL IMAGE
A3
Fig.66b3
WITH INSERTED ORNAMENTAL IMAGE
B3
Fig.66c3
WITH INSERTED ORNAMENTAL IMAGE
C3

FATHER'S NEW YEAR'S CARD
(ORDERED IMAGE)

PRINTING INFORMATION
    PAPER SIZE:    POSTCARD
    ORIENTATION:   VERTICAL
    NUMBER OF COPIES:   200
    PRINTING STARTING COORDINATES:   0 cm (VERTICAL)
                                                                   0 cm (HORIZONTAL)

MOTHER'S NEW YEAR'S CARD
(ORDERED IMAGE)

PRINTING INFORMATION
- PAPER SIZE: POSTCARD
- ORIENTATION: VERTICAL
- NUMBER OF COPIES: 50
- PRINTING STARTING COORDINATES: 0 cm (VERTICAL)
  0 cm (HORIZONTAL)

CHILDREN'S NEW YEAR'S CARD
(ORDERED IMAGE)

PRINTING INFORMATION
    PAPER SIZE:   POSTCARD
    ORIENTATION:   VERTICAL
    NUMBER OF COPIES:   20
    PRINTING STARTING COORDINATES:   0 cm (VERTICAL)
                                                      0 cm (HORIZONTAL)

FILING SYSTEM AND METHOD, AND APPARATUS AND METHOD FOR REPRODUCING IMAGE DATA

BACKGROUND OF THE INVENTION

1. Field of the Invention

This invention relates to a filing system and method for recording digital image data, which have been obtained from an input medium such as photographic film, printed matter or a memory card, on an output recording medium such as a floppy disk or optical disk, as well as to a reproduction apparatus and method for reproducing an image represented by digital image data that have been stored on a recording medium created by this filing system.

The invention relates further to a filing system and method for filing image data on a recording medium on which, by specifying a name, data managed in accordance with the name designated can be accessed, a reproduction apparatus and method for reading and outputting image data that have been recorded on such a recording medium, and a computer-readable recording medium storing a program for controlling a computer so as to accomplish this.

2. Description of the Related Art

The digitization of a variety of information and the preservation of such information by recording it on various recording media have been realized by the popularization of computers and devices that utilize them. Image information is no exception. There is growing need for a system capable of reading, by way of a scanner, images that appear on photographic film, photographs, printed manner and the like, converting the read images to digital image data and recording these data on a recording medium such as an optical disk.

Such a system would, in its simplest form, reproduce image data either by merely displaying or printing the images represented by the image data recorded on the recording medium.

Since image data representing a large number of images can be recorded on a large-capacity recording medium such as an optical disk, situations can arise in which a variety of images are mixed, examples of such images being images of photographs taken on holidays, pictures taken at entrance ceremonies and pictures taken when traveling. From the standpoint of organization, there is a need to collectively display or print images of the same category.

The recording of image data on a high-density recording medium can be carried out by a user employing his or her own personal computer or by employing a special-purpose image-data recording apparatus installed in a photo processing laboratory or the like. Further, using a personal computer, the user can add indicia such as characters or pictures to images represented by image data that have been recorded on the high-density recording medium, thereby making it possible to create one's own personal collection of images.

In a case where images thus created are printed, one's own printer is connected to the personal computer. The printer is activated by the personal computer and is used to print the images. In general, however, printers owned by ordinary users are low in cost and therefore the quality of the prints they produce is low. In order to realize high-quality printing of images, a special-purpose printing apparatus installed in a photo processing laboratory must be used.

On the other hand, in situation where the user records images on a high-density recording medium using his or her own personal computer, the usual practice is for the user to assign a desired directory name. Consequently, in order for images represented by image data that have been recorded on the high-density recording medium to be printed using a special-purpose printing apparatus located in a photo processing laboratory, it is required that a clerk at the laboratory search for the particular directory name. Accordingly, printing cannot be performed in rapid fashion. In addition, the user records the image data on the high-density recording medium in a desired format. This means that the recording formats of individual users must be dealt with in order to carry out the high-quality printing of images represented by image data, which have been recorded on the high-density recording medium, using a special-purpose printing apparatus located in a photo processing laboratory or the like.

SUMMARY OF THE INVENTION

Accordingly, an object of the present invention is to make it possible to collectively store images of the same category, or to collectively display or print images of the same category in correlated fashion, in a filing system for recording image data, which represent images that appear on photographic film, photographs or printed matter, on a recording medium such as an optical disk, and for reproducing the image data as necessary.

Another object of the present invention is to print, at high speed and quality, images created by a user.

A filing system according to a first aspect of the present invention comprises an image data input unit for entering image data representing an image, a mount image data memory in which mount image data, which represent images of plural types of mounts on which images represented by the image data entered by the image data input unit are to be pasted, have been stored in advance, a mount image selecting unit for selecting a desired mount image from the mount images represented by the mount image data that have been stored in the mount image data memory, and a memory control unit for storing the image data, which have been entered from the image data input unit, and the mount image data, which represent the image of the mount selected by the mount image selecting unit, on a portable storage medium in correlated form.

The first aspect of the invention provides a filing method as well. Specifically, a filing method according to the present invention comprises the steps of entering image data representing an image, storing, in advance, mount image data, which represent images of plural types of mounts on which images represented by the entered image data are to be pasted, selecting a desired mount image from the mount images represented by the mount image data that have been stored in advance, and storing the entered image data and the mount image data, which represent the image of the selected mount, on a portable storage medium in correlated form.

In accordance with the first aspect of the invention, the image data and the mount image data are correlated and stored on the portable storage medium. The image data and mount image data that have been correlated with each other and stored on the portable storage medium are reproduced by the reproduction apparatus or reproduction method described below.

The reproduction apparatus comprises a readout unit for reading out the image data and mount image data that have been stored on the portable storage medium, and a synthesizing unit for synthesizing and outputting data representing a virtual album image obtained by pasting an image, which is represented by the image data that have been read out by the readout unit, on the mount image represented by the mount image data read out by the readout unit.

The reproduction method comprises the steps of reading out the image data and mount image data that have been stored on the portable storage medium, and synthesizing data representing a virtual album image obtained by pasting an image, which is represented by the image data that have been read out, on the mount image represented by the mount image data that have been read out.

In a case where the image data of a plurality of images are correlated with mount image data of a single mount image, data representing a virtual album image obtained by pasting the plurality of images on a single mount image are synthesized.

The virtual album image is eventually outputted by being displayed on a display unit or printed using a printer.

It should be noted that the term "virtual album image" conceptually covers both an instance in which the virtual album image is composed of a single mount image and one or a plurality of images combined with the mount image, and an instance in which the virtual album image is composed of a plurality of mount images (which may be the same or different) and one or a plurality of images combined with each mount image.

The reproduction apparatus may be constructed as an independent apparatus or as part of a filing system.

In accordance with the first aspect of the invention, image data and mount image data are stored on a portable storage medium in a form associated with each other. A plurality of items of image data are collected and organized in relation to a mount image. The images represented by these image data are displayed or printed in a state in which they are pasted on the mount image represented by the mount image data. This is akin to creating a photo album.

The selection of a mount image on which an image is pasted can be performed automatically in dependence upon the type of image, or the user or operator can make the selection and enter the type of mount image selected. In either case the mount image suited to the image is selected and it is possible to create a virtual album worthy of admiration.

In a case where a visible image medium such as developed film is imaged, image data are entered by a visible image medium reading unit for reading the visible image medium. In a case where image data are read from a digital medium such as a memory card or optical disk on which the image data have been stored, the image data are entered by the image data reading unit.

A new type of photographic film that takes into account handling by a device utilizing a computer has also been studied. This photographic film is provided along both longitudinal edges thereof with information recording zones in which data can be magnetically recorded. Film and frame information relating to the photography performed is recorded in the information recording zones. The image of a frame appearing on such film may be read and the image data may be entered into the filing system. In such case a mount image is selected automatically based upon the information that has been recorded in an information recording zone, the mount image data representing the selected mount image are correlated with the above-mentioned image data and the data so correlated are recorded on the portable storage medium.

An arrangement may be adopted in which it is determined whether the portable storage medium has enough capacity to store the image data and mount image data and, when it is determined that there is enough storage capacity, the entered image data and the mount image data representing the selected mount image are stored on the portable storage medium.

When the image data and mount image data are thus stored on the portable storage medium, it is possible to avoid a situation in which data cannot be stored owing to too little remaining storage capacity of the portable storage medium.

An arrangement may be adopted in which it is determined whether the portable storage medium is a large-capacity storage medium and, when it is determined that this is the case, the entered image data and the mount image data representing the selected mount image are stored on the large-scale portable storage medium.

A portable storage medium such as a floppy disk has a comparatively small capacity. As a result, image data representing a large number of images cannot be stored. Accordingly, it is determined whether the portable storage medium is a large-capacity storage medium and the image data and mount image data are stored on the portable storage medium only when the portable storage medium has a large storage capacity. This makes it possible to preserve a large quantity of image data.

In a situation where there are a large number of images, it is desired that only image data representing those of the images that are desired be storable on the portable storage medium. In such case a list of thumbnail images of all images represented by the entered image data is displayed, the user is allowed to designate desired images from among the displayed thumbnail images and the image data representing the designated images are stored on the portable storage medium in a form correlated with the above-mentioned mount image data. As a result, even if the amount of remaining storage capacity of the portable storage medium is small, the desired image data that have been selected can be stored on the portable storage medium.

Further, image data may be compressed and the compressed image data may be stored on the portable storage medium. In such case the compressed image data would be decompressed (expanded) at the time of reproduction.

Ornamental image data representing an ornamental image which ornaments an image represented by image data that have been entered by the image data input unit are set in advance. The ornamental image data representing a prescribed ornamental image may be stored on the portable storage medium in association with the entered image data and the mount image data representing the image of the mount that has been selected. The selection of the ornamental image can be performed automatically or the selection may be made in accordance with a designation entered by the user or operator. In either case an ornamental image suited to the image would be selected.

Sound data are set in advance. An appropriate item of sound data may be selected from the set sound data, and the sound data representing the selected sound may be stored on the portable storage medium in association with the image data and ornamental image data. The term "sound data" is meant to include data representing background music (BGM) and voice such as narration. An arrangement may be adopted in which the sound data are selected automatically or in which the user or operator makes the selection. In either case a sound that matches the image would be selected.

In these cases the reproduction apparatus would be provided with a reproduction unit for reproducing the ornamental image data or sound data.

It is mentioned above that a desired mount image is selected and that the mount image data representing the selected mount image are stored on the portable storage medium along with the image data. However, an arrangement may be adopted in which predetermined mount image data are stored on the portable storage medium without being selected.

An arrangement may be adopted in which image data representing an image are stored on a first portable storage medium and mount image data representing a mount image on which an image representing the image data that have been stored on the first portable storage medium is to be pasted are stored on a second storage medium. In this case, the image data that have been stored on the first portable storage medium and the mount image data that have been stored on the second storage medium would be read out and data representing a virtual album image obtained by pasting an image, which is represented by the read image data, on the mount image represented by the read mount image data would be synthesized.

In this filing system or method, mount image data are selected and the selected mount image data are stored on the portable storage medium in correlation with the entered image data. However, an arrangement may be adopted in which predetermined mount image data are stored on a portable storage medium in correlation with entered image data.

Furthermore, the correlation between an image and a mount image data or ornamental image may be changed. In such case the changed correlation would be stored in a memory in advance.

According to a second aspect of the invention, there is provided a filing system for filing image data on a recording medium on which, by specifying a name (e.g., the name of a directory), data managed by the name specified can be accessed, comprising an input unit for entering subject image data representing the image of a subject, an indicia synthesizing unit for combining desired indicia with the image of the subject represented by the subject image data entered by the input unit, and outputting combined image data representing the image of the subject combined with the indicia, and a recording control unit for recording the combined image data, which are outputted by the indicia synthesizing unit, on the recording medium as data managed by the name, which has been predetermined.

The second aspect of the invention provides a filing method as well. Specifically, there is provided a filing method for filing image data on a recording medium on which, by specifying a name (e.g., the name of a directory), data managed by the name specified can be accessed, comprising the steps of entering subject image data representing the image of a subject, combining desired indicia with the image of the subject represented by the entered subject image data, obtaining combined image data representing the image of the subject combined with the indicia, and recording the combined image data obtained on the recording medium as data managed in accordance with the name, which has been predetermined.

The second aspect of the invention also provides a recording medium for implementing the above-described filing method. The recording medium is a computer-readable recording medium storing a program which, in order to file image data on a recording medium on which, by specifying a name, data managed by the name specified can be accessed, is for controlling a computer in such a manner that subject image data representing the image of a subject are allowed to be entered, desired indicia are combined with the image of the subject represented by the entered subject image data, combined image data representing the image of the subject combined with the indicia are obtained, and the combined image data obtained are recorded on the recording medium as data managed by the name, which has been predetermined.

The data thus recorded on the recording medium are reproduced in the manner set forth below.

Specifically, a reproduction apparatus for reading and reproducing data that have been stored on a recording medium on which, by specifying a name, data managed by the name specified can be accessed, comprises a recording medium loading unit for loading the recording medium, a determination unit for determining whether combined image data representing a combined image with which indicia have been combined, which data are managed by a predetermined name, have been recorded on the recording medium loaded in the recording medium loading unit, and a combined image data output unit for reading and outputting the combined image data, which have been recorded on the loaded recording medium, in dependence upon a determination by the determination unit to the effect that the combined image data have been recorded on the loaded recording medium.

A method of reproducing image data in a reproduction apparatus for reading and reproducing data that have been stored on a recording medium on which, by specifying a name, data managed in accordance with the name specified can be accessed, comprising the steps of determining whether combined image data representing a combined image with which indicia have been combined, which data are managed by a predetermined name, have been recorded on the recording medium, which has been loaded, and reading and outputting the combined image data, which have been recorded on the loaded recording medium, in dependence upon a determination to the effect that the combined image data have been recorded on the loaded recording medium.

A recording medium for implementing the above-described reproduction method is also provided. Specifically, the recording medium is a recording medium storing a program which, in order to read and reproduce data that have been recorded on a recording medium on which, by specifying a name, data managed in accordance with the name specified can be accessed, is for controlling a computer in such a manner that it is determined whether combined image data representing a combined image with which indicia have been combined, which data are managed by a predetermined name, have been recorded on a recording medium that has been loaded, and the combined image data, which have been recorded on the loaded recording medium, are read and outputted in dependence upon a determination to the effect that the combined image data have been recorded on the loaded recording medium.

In accordance with the second aspect of the invention, the combined image data are recorded on the recording medium as data managed in accordance with a predetermined name. Since the name for managing the combined image data is predetermined, the combined image data can be found merely by searching for the name. Accordingly, rapid reproduction of the data is possible.

In a case where the combined image data are recorded on the recording medium as data managed in accordance with the predetermined name, printing data relating to printing of the combined image represented by the combined image data may be recorded on the recording medium, in addition to the combined image data, as data managed by the predetermined name.

In this case, it is determined whether printing data relating to printing of the combined image represented by combined image data have been recorded on the loaded recording medium, in addition to the combined image data, as data managed by the predetermined name, the combined image data and the printing data, which have been recorded on the loaded recording medium, are read in dependence upon a determination to the effect that the combined image data and printing data have been recorded on the loaded recording medium, and the combined image data are outputted upon being converted to data suited to printing conditions decided by the printing data.

It is possible to find the printing data merely by searching for the predetermined name. The combined image., which is represented by the combined image data can be printed rapidly by referring to the printing data found.

An arrangement may be adopted in which it is determined whether the combined image data have not been recorded on the recording medium in a prescribed format, and the combined image data are converted to the prescribed format in response to a determination that the combined image data have not been recorded in the prescribed format. As a result, irrespective of the format in which a user has recorded image data, a combined image can be printed upon effecting a conversion to the prescribed format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 illustrates the format of data recorded on an information recording zone;

FIG. 50 illustrates an example of a screen displayed on the display unit of the reproduction apparatus;

FIG. 51 illustrates an example of a screen displayed on the display unit of the reproduction apparatus;

FIGS. 66a1~66a3, FIGS. 66b1~66b3 and FIGS. 66c1~66c3 illustrate a process through which images representing a New Year's card are generated;

DESCRIPTION OF THE PREFERRED EMBODIMENTS

A. Embodiment of Virtual Album (1) Photographic Film Having Information Recording Zones Photographic film of the conventional type (so-called "35-mm film") is roll film in which 12, 24 or 36 frames are capable of being exposed. After the film is developed it is cut into strip lengths of six frames each and the strips generally are preserved by being accommodated in sheaths. Only the images of the photographed subjects and the frame numbers are recorded on this photographic film of the conventional type. With the exception of the frame numbers, information relating to the images of the subjects (e.g., information directly representing the images, the dates of photography and shutter speeds, etc.) is not recorded on the film. Consequently, information relating to the image of a subject (with the exception of the frame number) must be written on the sheath or jotted down as a memo on a separate sheet of paper. A new type of photographic film has been developed which allows the recording of information relating to the images of subjects, such as the information directly representing the images, the dates of photography and shutter speeds, etc., which could not be recorded on the conventional photographic film. The filing system according to this embodiment preferably makes use of this new type of photographic film. It goes without saying, however, that the photographic film of the conventional type also can be used.

Figure 1:
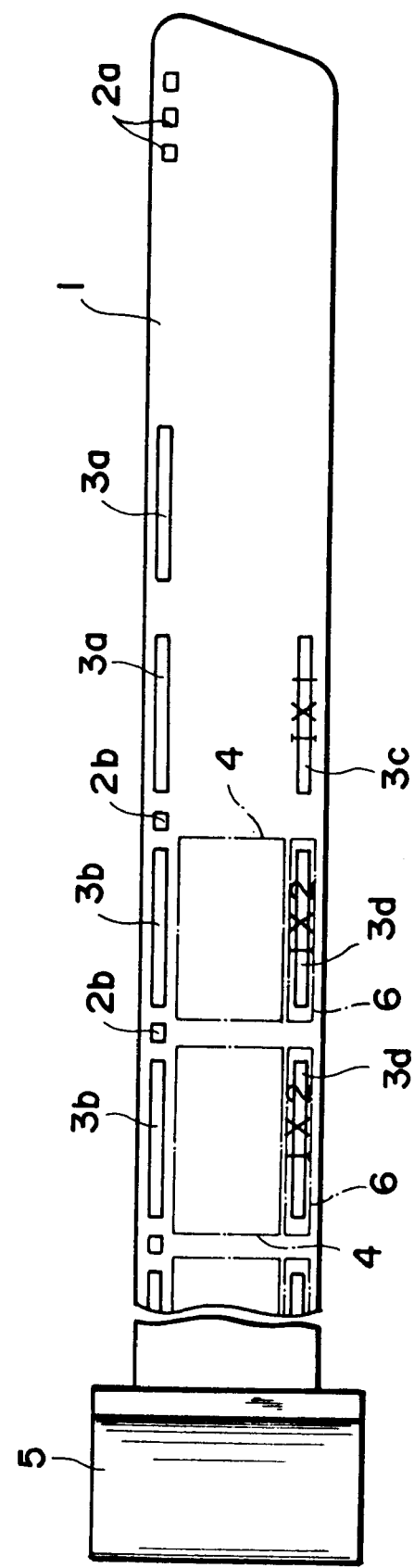
FIG. 1 illustrates photographic film having information recording zones.

FIG. 1 illustrates a new type of photographic film, namely photographic film having information recording zones (this photographic film having information recording zones will be referred to as a "new photographic film").

As shown in FIG. 1, the new photographic film 1 has one end thereof secured to a spool (not shown) rotatably provided inside a cartridge (Patrone) 5. FIG. 1 shows the new photographic film 1 after it has been pulled out of the cartridge 5.

The distal end of the new photographic film 1 is formed to have several perforations 2a for mating with a portion of a film take-up shaft in a camera.

With the exception of a suitable length of the distal end portion of the film, the entirety of the new photographic film 1 has areas 4 for recording images (these areas 4 are formed by taking photographs and are indicated by the phantom lines in FIG. 1 for the sake of description). Further, an elongated, band-shaped optical information recording zones 6 are provided below each image recording areas 4 (the areas 6 also are formed by exposure to light and are indicated by phantom lines in FIG. 1 for the sake of description).

Elongated, band-shaped information recording zones $3b$, $3d$ are provided on an upper side and a lower side of the image recording areas 4. The information recording zone. $3d$ overlaps the optical information recording zone 6. A perforation $2b$ is formed in the film between neighboring information recording zones $3b$ so as to correspond to each image recording area 4. The perforations $2b$ are used mainly to position the image recording areas 4 at the imaging position in the camera.

The distal end of the new photographic film 1 also is provided with information recording zones 3a, 3c on respective ones of an upper side and a lower side.

The information recording zones 3a, 3b, 3c, and 3d are magnetic recording layers generally formed by applying a transparent magnetic material to the film. The information recording zones 3a, 3b provided on one side of the new photographic film 1 generally are used at a photo processing laboratory. The information recording zones 3c, 3d provided on the other side of the new photographic film 1 generally are used to record information (data) in response to an input from the user or automatically by operation of the camera. The optical information zones 6 generally are used by a manufacturer to record information.

The information recording zones (leader information recording zones) 3a and 3c at the distal end of the film are used to record information (film information) relating to one roll of the new photographic film 1. The information recording zones (frame information recording zones) 3b and 3d provided to correspond to each image recording area 4 are used to record information (frame information) relating to the images recorded in the respective areas 4. The optical information recording zones 6 record information such as manufacturer codes.

To give one example, comprehensive information with which all images captured using the photographic film 1 are associated is recorded in the leader information recording zone 3c utilized by the user. This is referred to as information IX1. In this embodiment, the information IX1 need not necessarily be recorded.

The information recorded in the frame information recording zone 3d utilized by the user includes title information which the user enters into the camera (where the title directly represents the image, e.g., "Flowers", "Animals", "Children", "Journey", etc.), and information which the camera records automatically (e.g., shutter speed used when the picture of the frame was taken). These items of information are referred to as information IX2. An arrangement may be adopted in which only information entered by the user serves as information IX2.

Figure 2:
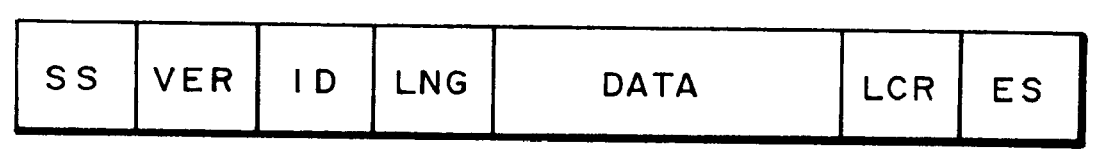

FIG. 2 illustrates the data disposition (format) of data in the information recording zones 3a, 3b, 3c and 3d of the new photographic film 1. This data format is applied to both information IX1 and IX2 and includes SS, VER, ID, LNG, DATA, LCR and ES.

The aforementioned SS is the abbreviation of "Start Sentinel" and is a code representing the start of a data string. VER indicates a version of the recording format (specifications). ID represents the type of information (IX1,: IX2) recorded. LNG indicates the length of the following data. DATA is the data representing information desired to be recorded or information to be recorded. LCR is a CRC check code. ES is the abbreviation of "End Sentinel" and is a code representing the end of the data string.

One or a plurality of data strings having such a format are provided for one of the information recording zones 3a, 3b, 3c, 3d. For example, a data string representing data entered by the user and a data string representing data to be written in by the camera are recorded in the frame information recording zones 3d. If necessary, the same data string is written in the information recording zones a plurality of times in parallel in order to enhance reliability.

(2) Camera for the New Photographic Film

Figure 3:
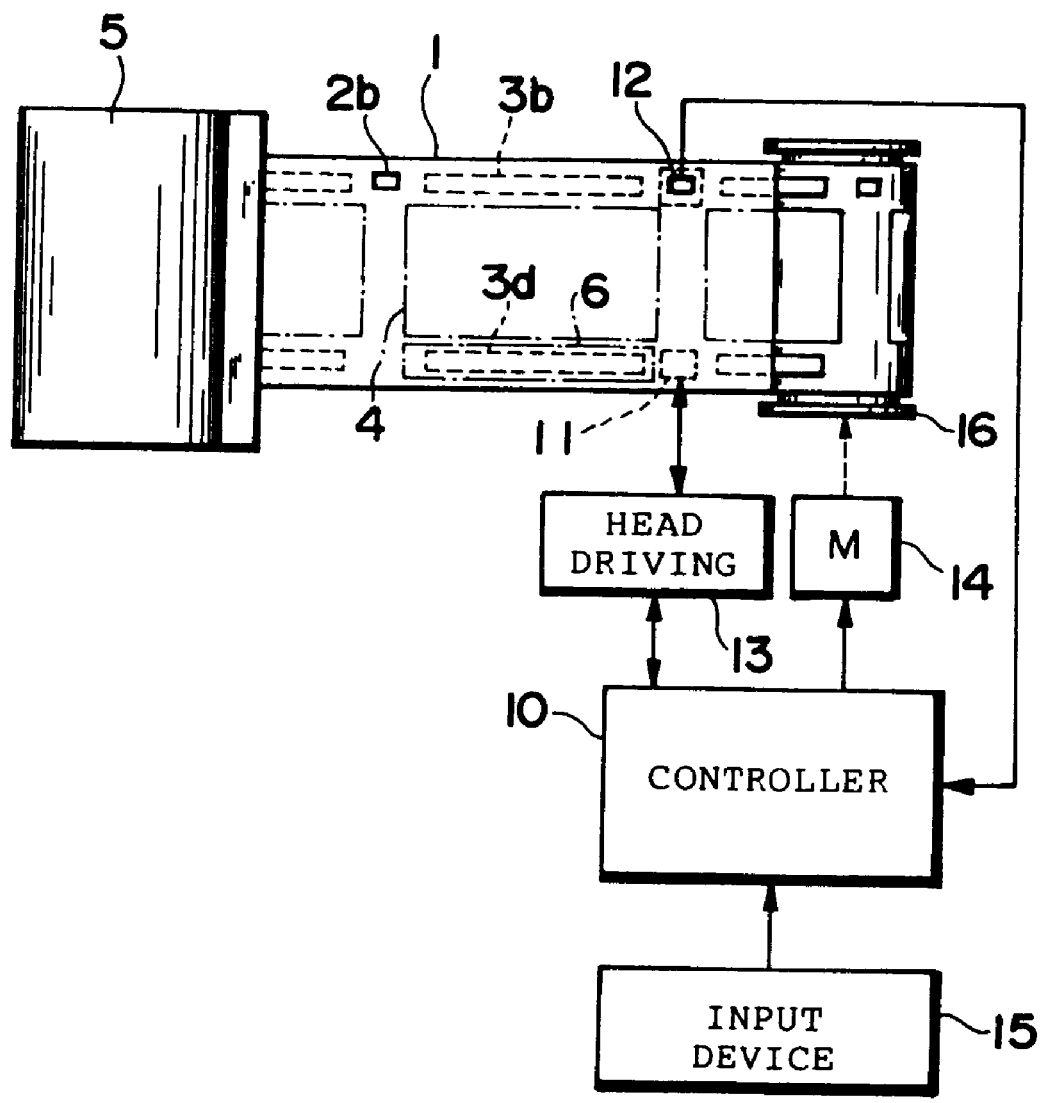
FIG. 3 illustrates part of a camera capable of handling a photographic film having information recording zones.

FIG. 3 illustrates part of the construction of a camera capable of handling such new photographic film. FIG. 3 mainly shows the components relating to the recording of information in the information recording zones 3a, 3b, 3c and 3d of the photographic film 1; components constructing the imaging optical system and the like are not shown.

The cartridge 5 is supported on a fork within the camera so as to be free to turn. The distal end of the new photographic film 1 pulled out of the cartridge 5 is wound up on a take-up shaft 16 for the photographic film. The camera is provided with a photoelectric sensor 12 for sensing the perforations 2b and produces a detection signal that is applied to a control unit 10. The :control unit 10 drives a motor 14 to rotate the take-up shaft 16 and successively take up the new photographic film 1 and, on the basis of the detection signal from the photoelectric sensor 12, positions the new photographic film 1 each time a picture is taken so as to bring the image recording area 4 to the imaging position.

A magnetic head 11 is provided on the traveling path of the user's magnetic information recording zones 3c, 3d in order to record information on these magnetic information recording zones 3c, 3d. Information entered from the input unit 15 or information generated by the control unit 10 is recorded on the information recording zones 3c, 3d via a head drive circuit 13 under the control of the control unit 10 in the course of take-up of the new photographic film 1 (i.e., during the travel of the film).

The input unit 15 enters numerals or characters. For example, the input unit 15 includes numeric keys, alphabetic keys, etc. If necessary, the input unit 15 includes a display device on which information entered by key input is displayed. In order to reduce the number of keys, an arrangement can be adopted in which the character displayed is changed whenever a single key is pressed and the user selects the character displayed.

In this embodiment, the title information, namely the types of information IX2, is predetermined. The user selects the desired type of information from among these: types of information. There are 99 types of information IX2, and codes 01~99 are allocated thereto. For example, code 01 is a photograph of flowers, code 02 is a photograph of an animal, etc. Accordingly, the code selected by the user need only be recorded in the frame information recording zone 3d. Character codes or numeric codes entered from the input unit 15 may of course be recorded in the frame information recording zone 3d.

(3) Film Scanner

Figure 4:
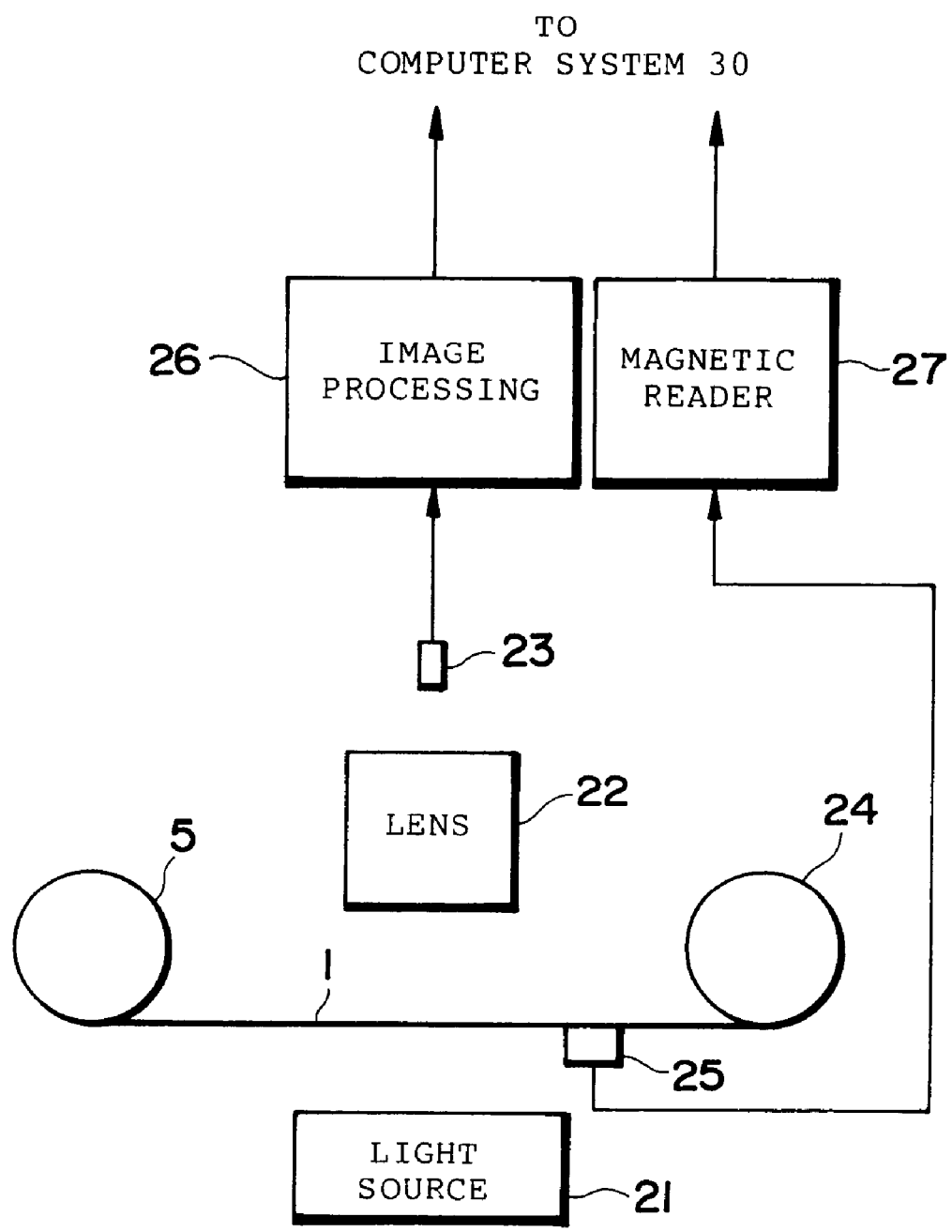
FIG. 4 illustrates the construction of a film scanner.

FIG. 4 illustrates, in simplified form, the construction of a film scanner for reading images and information that have been recorded on the new photographic film 1.

The new photographic film 1 is pulled from the cartridge 5 and is wound up on a take-up shaft 24 for the photographic film. The new photographic film 1 is conveyed at a prescribed speed by a film feeding mechanism (not shown).

Light from a light source 21 irradiates the conveyed new photographic film 1. Light representing an image appearing in an image recording area of the new photographic film 1 forms an image on a CCD line sensor 23 via a lens system 22. The CCD line sensor 23 includes a number (e.g., 2048) of photoelectric transducers arrayed in a direction which perpendicularly intersects the longitudinal direction of the new photographic film 1. Video signals are sent from the CCD line sensor 23 to an image processor 26 line by line as the new photographic film 1 is fed. When the new photographic film 1 is fed by a length equal to one image recording area, one frame of image data is obtained (for example, image data having a resolution of 2048×3072 pixels is obtained when the film is fed at the smallest pitch).

The image processor 26 is constituted by a signal processing circuit (inclusive of circuits selected from among a white balance circuit, gamma correction circuit and negative/positive reversal circuit, etc., as required) for processing a video signal (distal image data converted by an A/D converter circuit) obtained from the CCD line sensor 23. Digital image data obtained when the new photographic film 1 has been fed by the smallest pitch are referred to as original digital image data. The original image data are applied to a computer system 30, described later.

The original image data are for prints. So-called "high-vision" (high-definition) image data are obtained by reducing the original digital image data to ½ in the vertical direction and ½ in the horizontal direction. Standard image data are obtained by further reducing these high-definition image data to ½ in the longitudinal direction and ½ in the horizontal direction. Thumbnail image data are obtained by further reducing these standard image data to ⅛ in the vertical direction and ⅛ in the horizontal direction. The reduction of the image is carried out by executing subsampling processing or by executing averaging processing in units of a plurality of adjacent pixels. The reduction processing is executed by the computer system 30. These items of original (print) digital image data, high-definition digital image data, standard image data and thumbnail digital image data are recorded on the user's disk after being compressed as necessary. Image data having a different resolution can also be obtained by changing the pitch at which the new photographic film 1 is fed in the film scanner.

The film scanner shown in FIG. 4 has a magnetic head 25 provided in the conveyance path of the new photographic film 1 at a position traversed by the information recording zones 3c, 3d of the film. The magnetic head 25 reads the information magnetically recorded on the information recording zones 3c, 3d and sends the resulting read signals to a magnetic reading circuit as the new photographic film 1 is being fed. A magnetic reading circuit 27 applies the required processing (demodulation, encoding, etc.) to the read signals and then applies the processed results to the computer system 30, described later.

(4) Filing System

Figure 5:
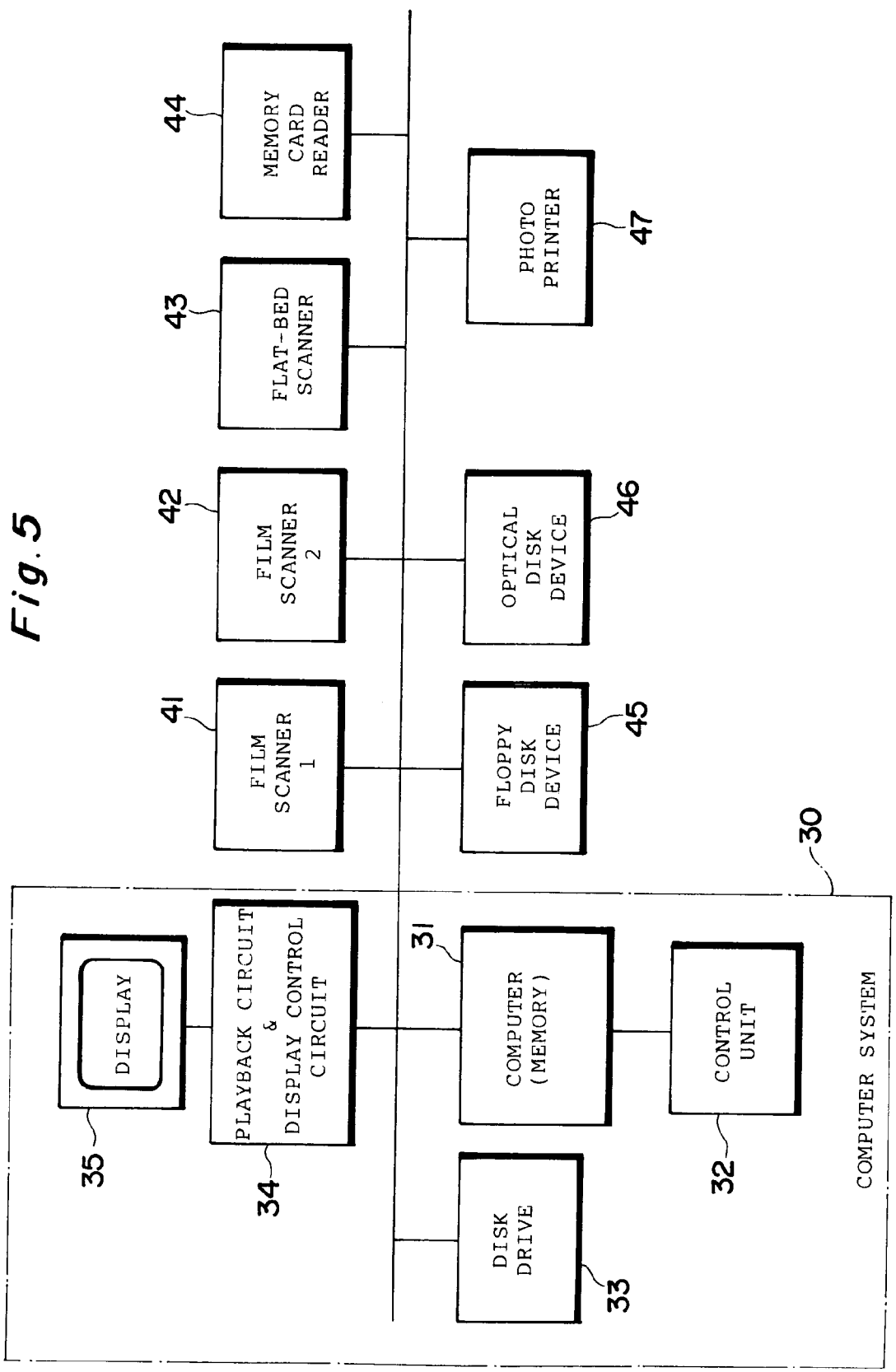
FIG. 5 is a block diagram illustrating the electrical configuration of a filing system.

FIG. 5 illustrates the electrical configuration of a filing system.

This filing system would be installed at a variety of locations, examples of which are a film developing establishment (store), photography shop, department store, convenience store and other types of stores and shops. The filing system generally is operated by the customer (user). At locations such as a film developing store where an operator is always present, the filing system would be operated in its entirety by the operator.

The media handled by this filing system are divided broadly into two types. The first is media which represent images visually, such as photographic film, photographs printed on photographic printing paper and images on printed matter (photographs on posters and calendars, etc.). These types of media are referred to as visible image media. The second is media for recording (or storing) digital data representing images, such as optical disks, magneto-optical disks, magnetic disks and memory cards. These type of media are referred to as digital media.

Broadly speaking, the filing system has two functions. These are filing processing (a filing service) and print processing (a printing service).

In filing processing, a visible image medium and a memory card are used as the input media. An optical disk, magneto-optical disk or magnetic disk is used as the output medium.

Filing processing is processing through which at least subject image data and mount image data are recorded on an output medium, wherein the mount image data represent a mount for pasting the image of a subject represented by the subject image data. By using a reproduction apparatus, described later, to play back the output medium on which the subject image data and mount image data have been recorded, a virtual photo album consisting of one or a plurality of pages consisting of subject images pasted on mount images is displayed (or printed). Images obtained by thus pasting subject images on mount images are referred to as a virtual album in this embodiment. One or a plurality of images are pasted on the mount images.

In filing processing, a visible image appearing on a visible image medium serving as the input medium is read by a scanner. An image signal outputted by the scanner is converted to digital image data and the data are subjected to compression processing if necessary, after which the digital image data are recorded on an optical disk, magneto-optical disk or magnetic disk, which serves as the output medium, in a prescribed format. Image data that have been stored on a memory card serving as the input medium are read out by a memory card reader and recorded on an optical disk, magneto-optical disk or magnetic disk, which serves as the output medium, in a prescribed format.

Furthermore, in filing processing according to this embodiment, ornamental image data for ornamenting a subject image and background music (BGM) data representing background music (or narration) are recorded on the output medium in addition to the subject image data and mount image data representing a mount suited to the subject image represented by the subject image data to be recorded. Of course, since a virtual album can be created if subject image data and mount image data are recorded on an output medium, it is not necessarily required that ornamental image and BGM data be recorded on the output medium.

In printing processing, digital media, which include optical disks, magneto-optical disks and magnetic disks, and visual image media are used as the input media. The output medium is a printed photograph. The image data of a frame that is to be printed are read out of the digital medium serving as the input medium. These image data are applied to a photographic printer, by which an image represented by the image data is printed on recorded paper. In a case where photographic film is used as the input medium, an image (a negative or a positive) appearing on the film is printed on photographic printing paper by a printing unit. Alternatively, an image on the film is read by a film scanner. An image signal outputted by the film scanner is applied to the photographic printer (following conversion to digital image data if required), whereby a printed photograph is obtained. Similarly, if the input medium is printed matter, the image represented on the printed matter is read by the scanner and the output image signal from the scanner is applied to the photographic printer.

In the main, filing processing is described in detail in this embodiment.

The filing system includes a computer system 30, which has a computer 31, a control unit 32, a disk drive 33, a playback and display control circuit 34 and a display unit 35. The computer 31 controls not only the computer system 30 but also the entire operation of the filing system. The computer 31 includes memories (a semiconductor memory, floppy disk, hard disk, etc.) and other peripheral equipment.

The control unit 32 enters various commands and data when the filing system is used by an operator or user.

The disk drive 33 writes data to or reads data from a hard disk, optical disk or magneto-optical disk. A program for operating the filing system is recorded on the disk in advance. The disk drive 33 reads the program from the disk and applies the program to the computer 31. The disk drive 33 temporarily stores image data, which have been read by film scanners 41, 42, etc., described below, on the disk. In a case where a hard disk and optical disk are used, two disk drives dedicated to these disks are provided. Furthermore, various mount image data, ornamental image data and BGM data to be recorded on the output medium in filing processing have been stored on the hard disk.

The display unit 35 is controlled by the playback and display control circuit 34. A touch panel is formed on the display surface of the display unit 35. Guidance (comprising illustrations and text) for assisting operation and one or a plurality of areas to be touched are displayed on the display screen of the display unit 35. A key function (inclusive of a numerical value) is displayed in each area. This makes it possible to implement function keys and numeric keys. An input signal representing the position of an area touched by the finger of the operator or user is applied to the computer 31. By utilizing the touch panel, the user selects the type of processing (service) (namely filing processing or printing processing), designates the input medium, designates a frame to be recorded on the output medium or printed, etc.

The filing system is further provided with the film scanners 41, 42, a flat-bed scanner 43, a memory card reader 44, a floppy disk device 45, an optical disk device 46 and a photographic printer 47. These are connected to the computer system 31 via an SCSI (small computer system interface) bus.

The film scanner 41 has the above-described construction shown in FIG. 4. The film scanner 41 reads the image (negative or positive) appearing in the image recording area 4 of the new photographic film, outputs an image signal (image data) representing this image, reads information that has been recorded in the information recording zones 3a, 3b, 3c, 3d and 6 of the new photographic film, and outputs data representing this information. The digital image data and the data representing information read from the information recording zones are applied to the computer system 30, where these data are stored in memory temporarily.

The film scanner 42 reads the image (negative or positive) appearing on conventional photographic film and outputs an image signal (image data) representing this image. This film scanner includes a light source, an image sensing optical system, a line sensor (or two-dimensional image sensing device), a mechanism for transporting the film or line sensor, a signal processing circuit and an A/D converter circuit, etc. The image data obtained from the conventional photographic film have the same number of pixels and the same number of tones as the image data obtained from the new photographic film.

The flat-bed scanner 43 reads pictures, photographs, figures, characters and the like (these shall be referred to generically as "images") represented on catalogs, photographs, printed matter and the like (these shall be referred to as "reflective originals") and outputs an image signal (image data representing the image read. The scanner 43 has a flat bed on which a reflective original to be read is placed. Light from the light source is projected upon the reflective original and light reflected from the reflective original enters the line sensor or two-dimensional image sensing device. A video signal outputted by the line sensor or image sensing device is subjected to prescribed processing and then outputted as digital image data.

The memory card reader 44 reads image data out of a memory card serving as the input medium in filing processing.

The floppy disk device 45 writes image data and other data to a floppy disk (magnetic disk) serving as the output medium in filing processing and reads image data and other data out of the floppy disk in print processing. In a case where an ordinary floppy disk and a high-density floppy disk are available as usable floppy disks, two floppy disk devices are provided in conformity with these two types of floppy disks.

The optical disk device 46 writes data, which include image data, to an optical disk (inclusive of a magneto-optical disk) serving as the output medium, reads such data out of the optical disk, rewrites the data, etc.

It should be noted that the filing system need not necessarily be provided with the floppy disk device 45.

The photographic printer 47, which is used in print processing, prints the image represented by the applied image data.

(5) File Structure of Hard Disk

FIGS. 6 through 12 illustrate the file structure (data structure) of a hard disk included in the filing system. The file structure is illustrated in logical form; what is shown is not the physical structure. The various data shown in FIGS. 6 through 12 may be in a dispersed state rather than in the state of a single, continuous group. In a case where the filing system has a plurality of hard disks, the data may be recorded by being dispersed among the plurality of hard disks even if all of the data illustrated in FIGS. 6 through 12 do not exist on a single hard disk.

Figure 6:
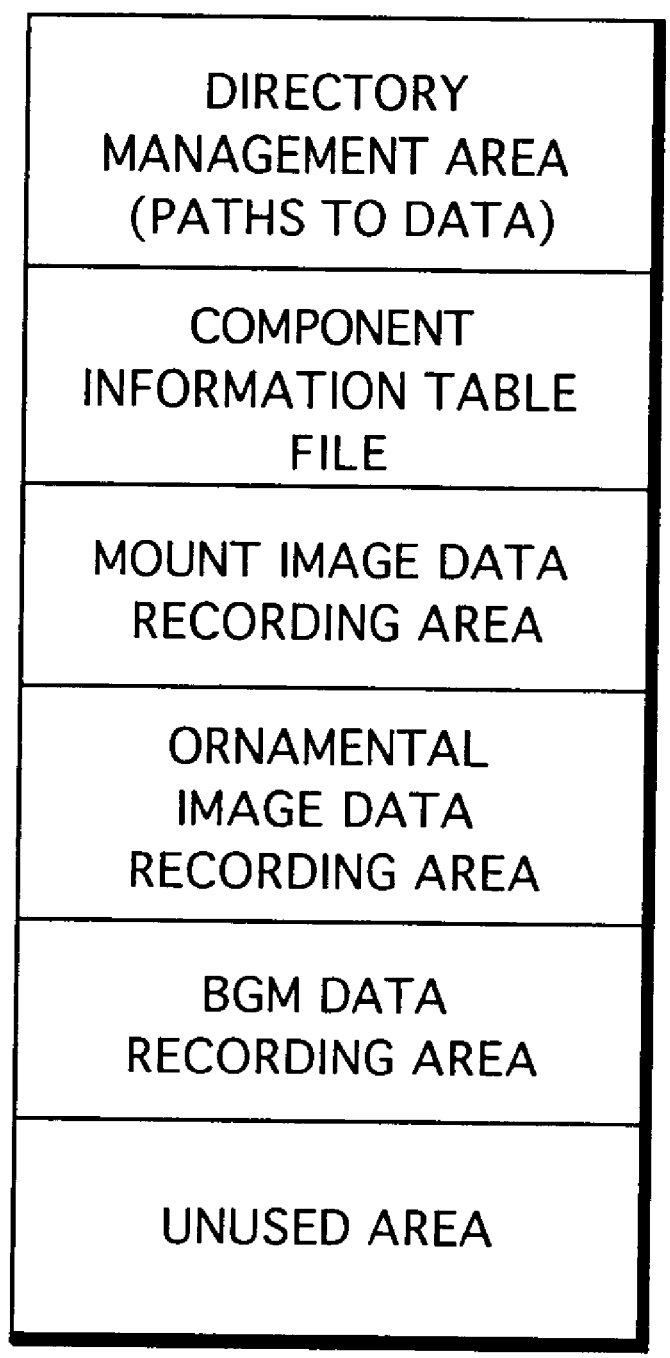
FIG. 6 illustrates the file structure of a hard disk included in the filing system.

As shown in FIG. 6, the file structure includes a directory management area for managing all of the data that have been recorded on the hard disk, a component information table file in which the corresponding relationship among title codes, mount image data names, directory names of ornamental image data and BGM data names is recorded as a table, a mount image data recording area for recording mount image data, an ornamental image data recording area for recording ornamental image, a BGM data recording area for recording BGM data, and an unused area.

Figure 7:
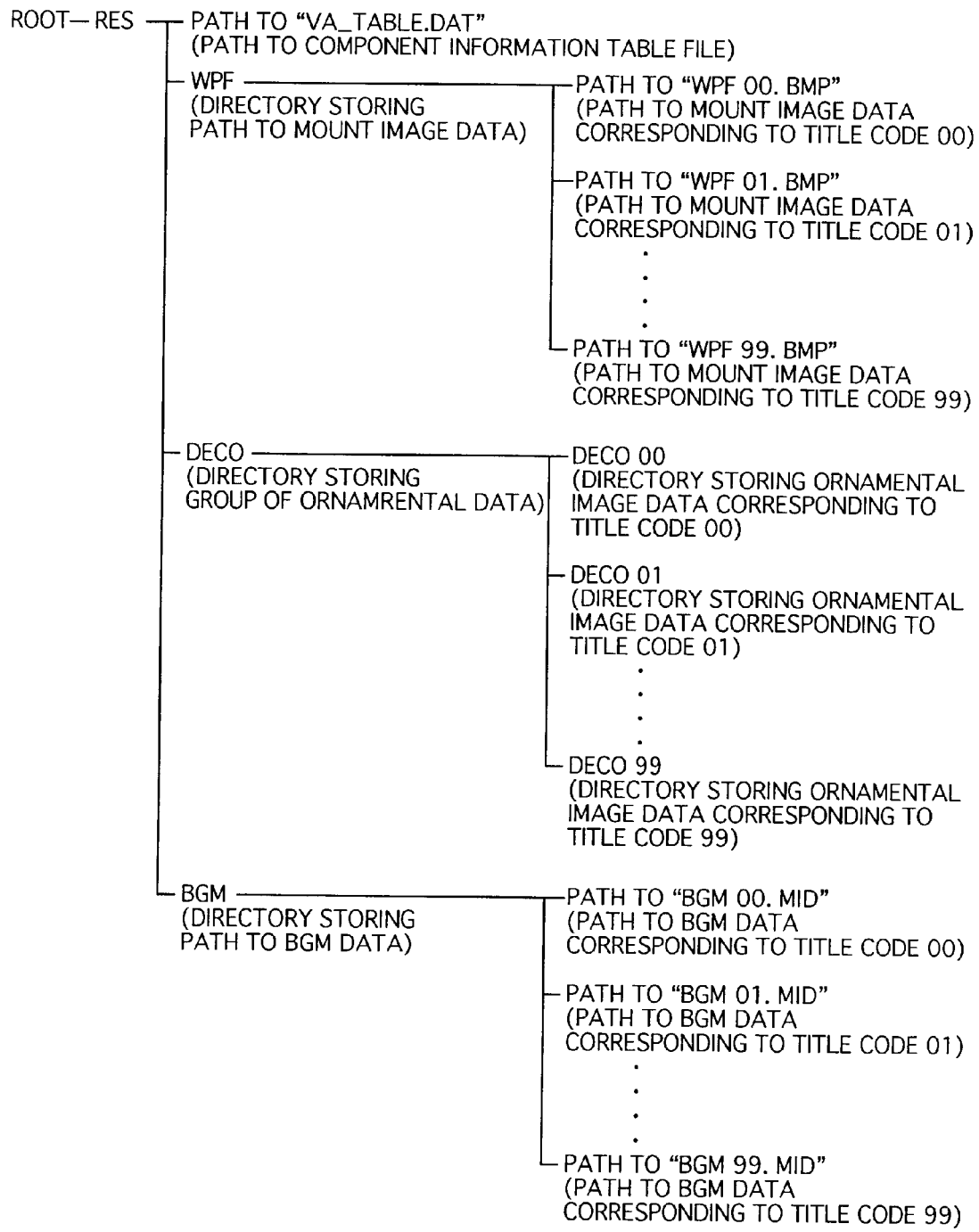
FIG. 7 illustrates the constitution of a directory management area.
Figure 8:
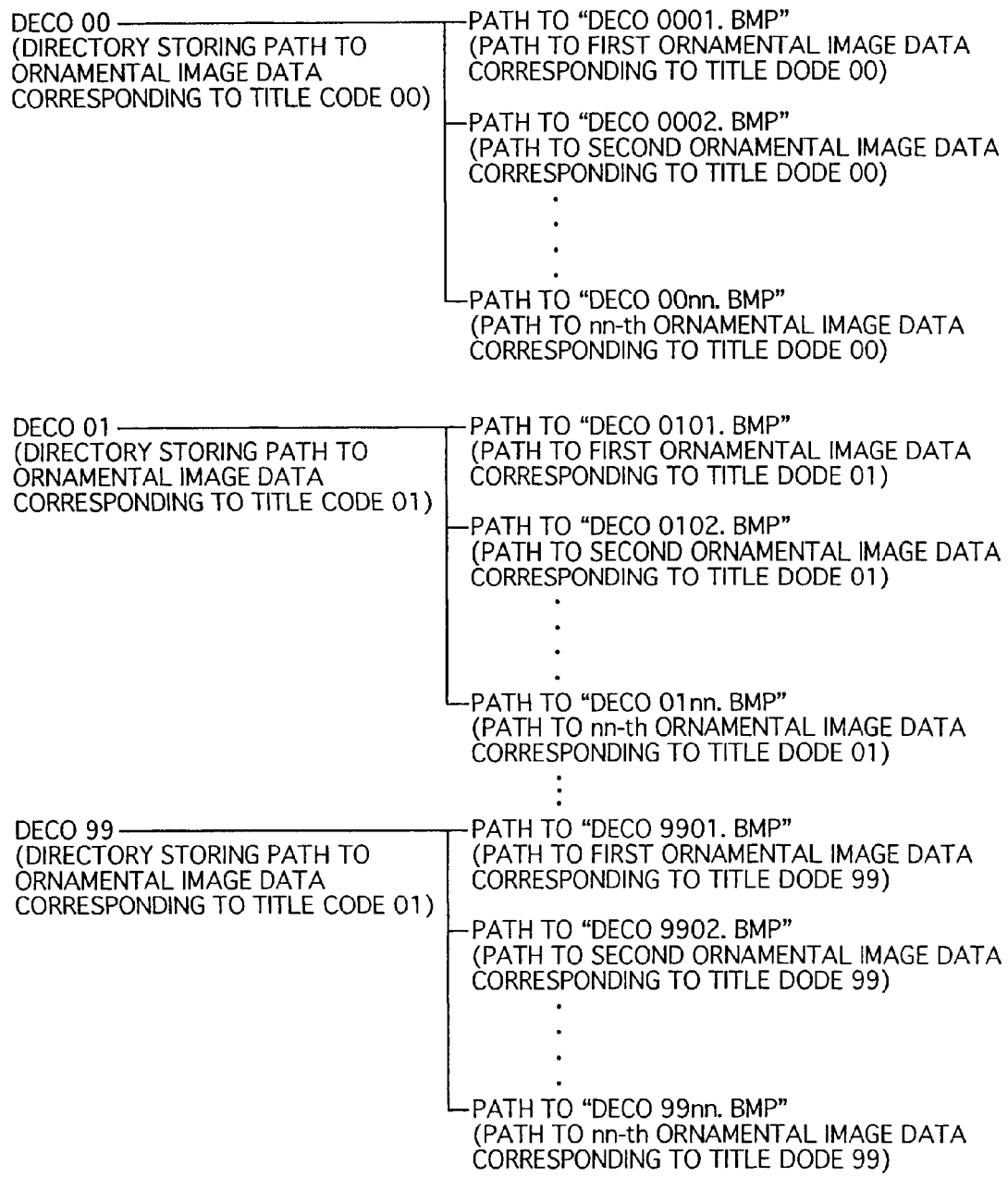
FIG. 8 illustrates the constitution of a directory management area.

The details of the directory management area are illustrated in FIGS. 7 and 8, in which only data relating to the filing system of this embodiment are shown.

In the filing system of this embodiment, mount image data, ornamental image data and BGM data corresponding to 100 types of title codes of from "00" to "99" have been recorded on the hard disk.

A root directory "ROOT" in the directory management area has a plurality of sub-directories. One of these plurality of sub-directories is a sub-directory "RES". The sub-directory "RES" stores data peculiar to the filing system of this embodiment (among the plurality of subdirectories that exist, the sub-directory "RES" is illustrated in FIG. 7).

The sub-directory "RES" includes a path to the component information table file (VA TABLE.DAT) (the path is information necessary for the computer to access the storage locations at which each of the items of data have been stored), a directory "WPF" in which a path to the mount image data has been stored, a directory "DECO" in which a group of ornamental image data has been stored, and a directory "BGM" in which a path to the BGM data has been stored.

Paths to mount image data (WPF 00. BMP~WPF 99. BMP) corresponding to the title codes "00"~"99" have been stored in the directory "WPF". The directory "DECO" has directories "DECO00~DECO99" in which groups of ornamental data have been stored. As shown in FIG. 8, the paths to the ornamental image data corresponding to the title codes "00"~"99" have been stored in the directories "DECO00~DEC099". The ornamental image data are nn in number, which correspond to the title codes. Accordingly, paths to nn-number of items of ornamental image data have been stored in the directory management area in correspondence with the items of ornamental image data. By way of example, paths from the path to the first ornamental image data (DECO0001. BMP) to the path to the nn-th ornamental image data (DECO00nn. BMP) have been stored with regard to the ornamental image data corresponding to the title code "00". Paths to the BGM data (BGM00. MID~BGM99. MID) corresponding to the title codes "00"~"99" have been stored in the directory "BGM".

Figure 9:
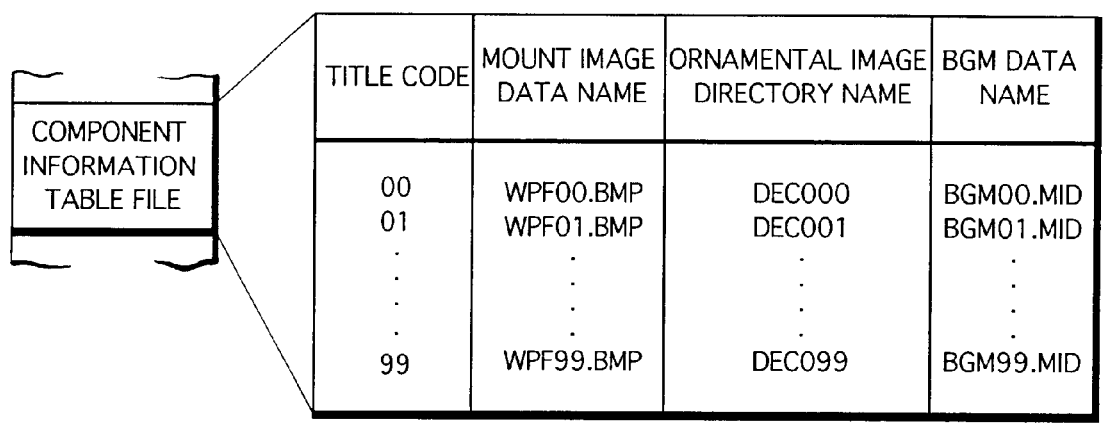
FIG. 9 illustrates the content of a component information table file.

FIG. 9 illustrates the details of the component information table file.

Title codes of 100 types from "00" to "99" have been recorded in the component information table file. Mount image data names, ornamental image directory names and BGM data names have been recorded in correspondence with the title codes "00"~"99". If necessary, title information specified by title codes may also be recorded. Accordingly, the mount image data, ornamental image data and BGM data are specified by title codes.

Figure 10:
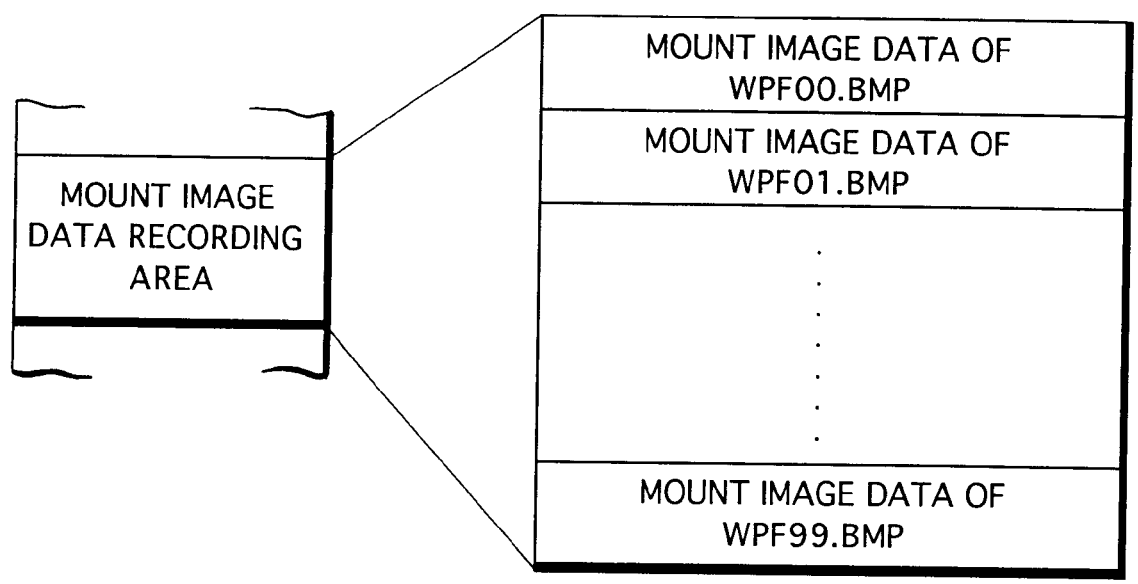
FIG. 10 illustrates the content of an area for recording mount image data.

FIG. 10 illustrates the details of the mount image data recording area.

Mount image data of 100 types of data names from "WPF00. BMP." to "WPF99. BMP" corresponding to the title codes "00"~"99" have been recorded in the mount image data recording area.

Figure 11:
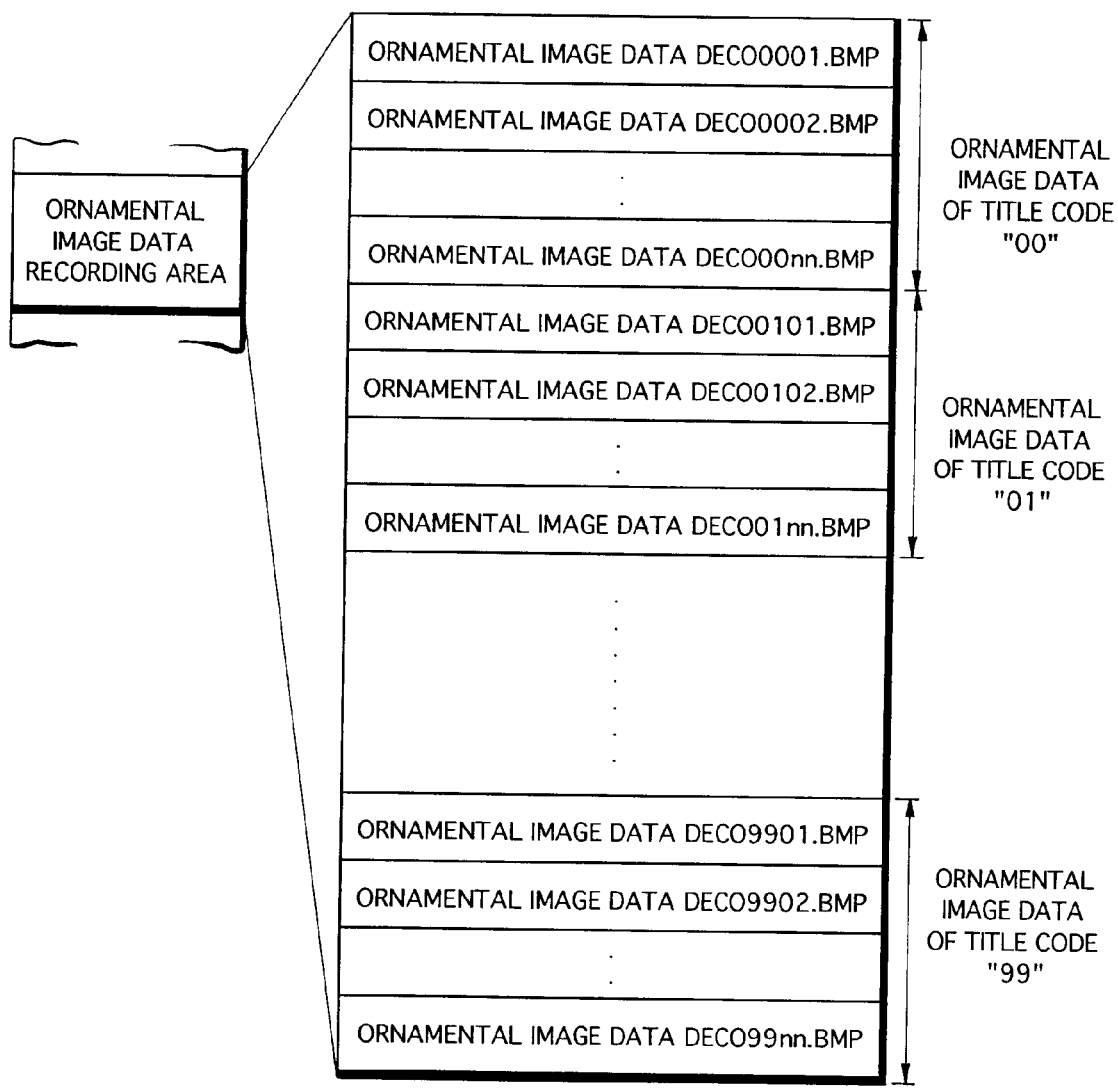
FIG. 11 illustrates the content of an area for recording ornamental image data.

The details of the ornamental image data recording area are shown in FIG. 11.

One hundred sets of ornamental image data corresponding to the title codes "00"~"99" have been recorded in the ornamental image data recording area. The ornamental image data corresponding to each title code has ornamental image data of nn-number of types. For example, nn-number of types of ornamental image data of data names "DECO0001.BMP"~"DECO00nn. BMP" are recorded in correspondence with the title code "00".

Figure 12:
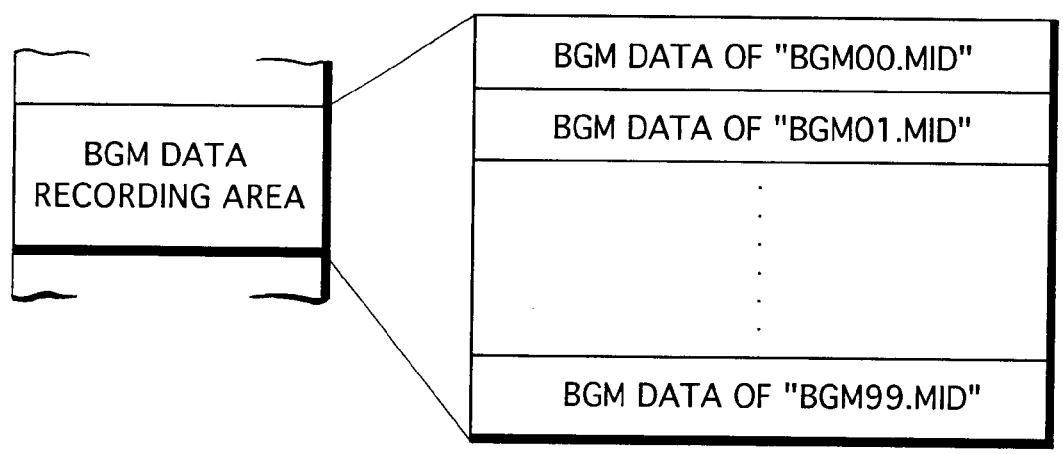
FIG. 12 illustrates the content of an area for recording background music data.

FIG. 12 illustrates the details of the BGM data recording area.

One hundred types of BGM data of data names "BGM00. MID) ~"BGM99. MID" corresponding to the title codes "00"~"99" have been recorded in the BGM data recording area.

Figure 13:
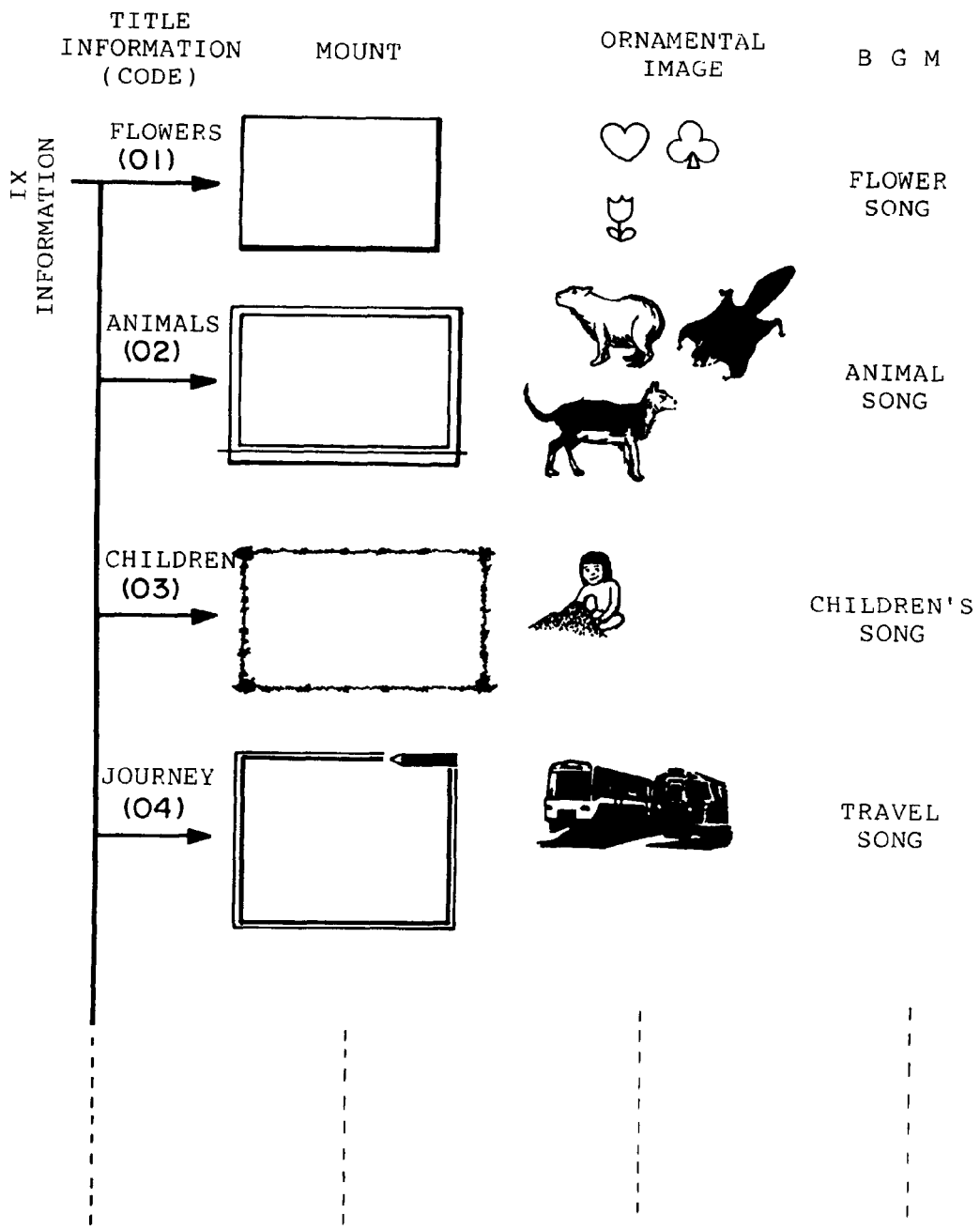
FIG. 13 illustrates the relationship among title information, mounts, ornamental image and background music.

Since the hard disk included in the filing system has the file structure shown in FIGS. 6 through 12, mount image data, ornamental image data and BGM data corresponding to title codes can be read. For example, if a title code has been recorded in the information recording area 3d of the new photographic film, this title code is read. When the title code is read, reference is made to the directory management area of the hard disk and the path to the component information table file is read. The storage area of the component information table file is known from the path to the component information table file and reference can be had to the component information table file. When the component information table file is referred to, the data name of the mount image data, the directory name of the ornamental image data and the data of the BGM data corresponding to the title code can be determined. When the data name and directory name are determined, reference is had to the directory management area again and the paths of the mount image data, ornamental image data and BGM data corresponding to the title code are read. The recording locations of the mount image data, ornamental image data and BGM data are determined from the read paths and the mount image data, ornamental image data and BGM data corresponding to the title code are read from the hard disk (see FIG. 13).

(6) Various Processing Executed in Filing System

FIGS. 14 through 17 are flowcharts illustrating the processing procedures of various processing inclusive of filing processing in the filing system. FIGS. 18 through 31 illustrate examples of screens displayed on the display unit 35 of the filing system.

① Setting of Secret Code

In the filing system according to this embodiment, a secret code is stored in memory in advance. As a result, if a secret code entered by a maintenance man matches the secret code that has been stored in memory, the execution of various processing in the filing system can be suspended and a prescribed screen for altering processing can be displayed on the display unit 35. The setting of the secret code is performed by the maintenance man. To assure accuracy, the setting of the secret code is performed twice, i.e., by a first entry of the secret code and a second entry of the same secret code. This setting of the secret code will be described below.

Figure 18:
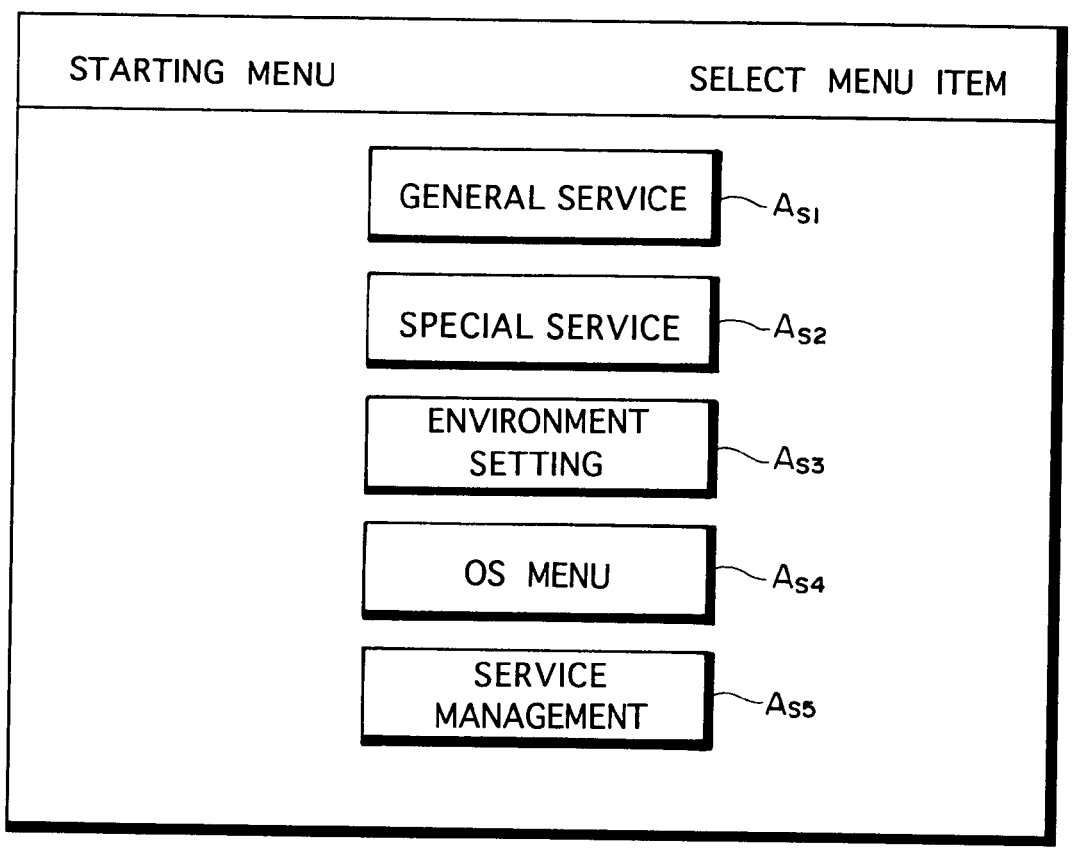
FIG. 18 illustrates an example of a screen displayed on a display unit of the filing system.

In the initial state, a starting screen of the kind shown in FIG. 18 is displayed on the display unit 35 (step 11). The starting screen includes areas $A_{S1} \sim A_{S5}$. When the area $A_{S1}$ is touched by the finger of the maintenance man, a transition is made to various service processing (a filing service, printing service, etc.), described later. When the area $A_{S2}$ is touched by the finger of the maintenance man, a transition is made to various maintenance processing such as adjustment of color of the image displayed on the display unit 35. When the area $A_{S3}$ is touched by the finger of the maintenance man, a transition is made to secret-code setting processing. When the area $A_{S4}$ is touched by the finger of the maintenance man, a transition is made to an OS (operating system) menu display screen. When the area $A_{S5}$ is touched by the finger of the maintenance man, a transition is made to service management processing, such as fee collection for use of the filing service.

Figure 19:
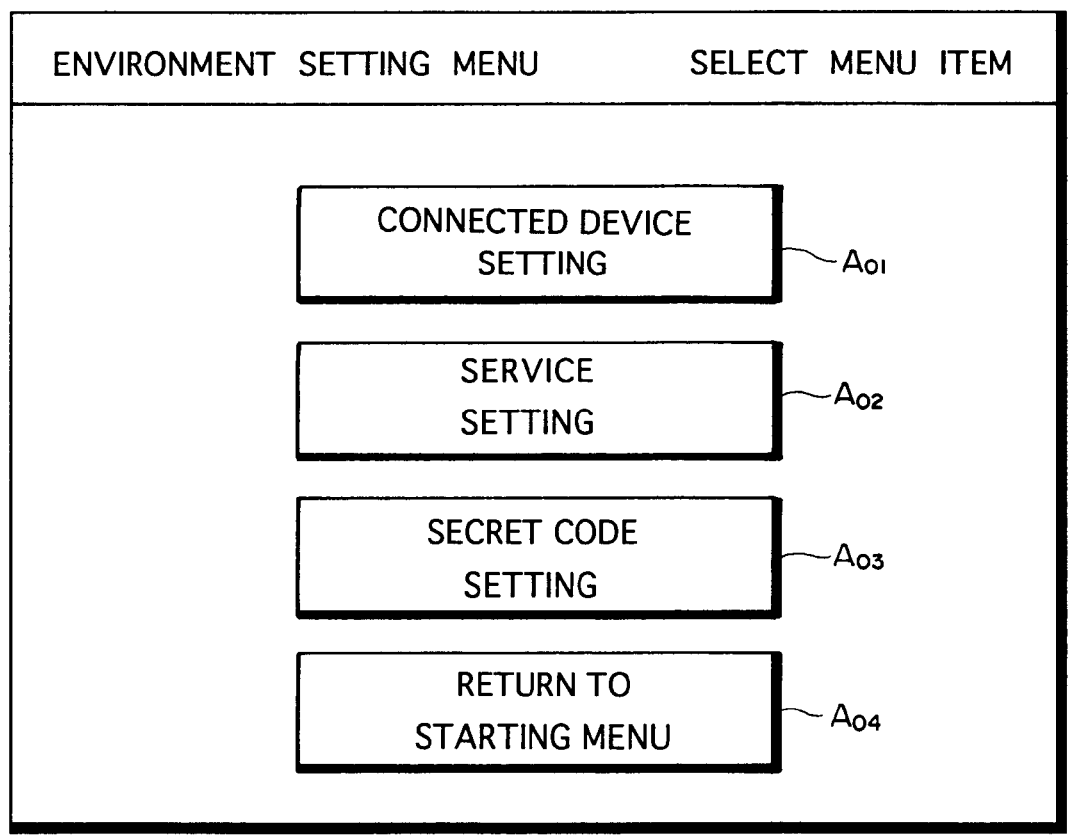
FIG. 19 illustrates an example of a screen displayed on the display unit of the filing system.
Figure 20:
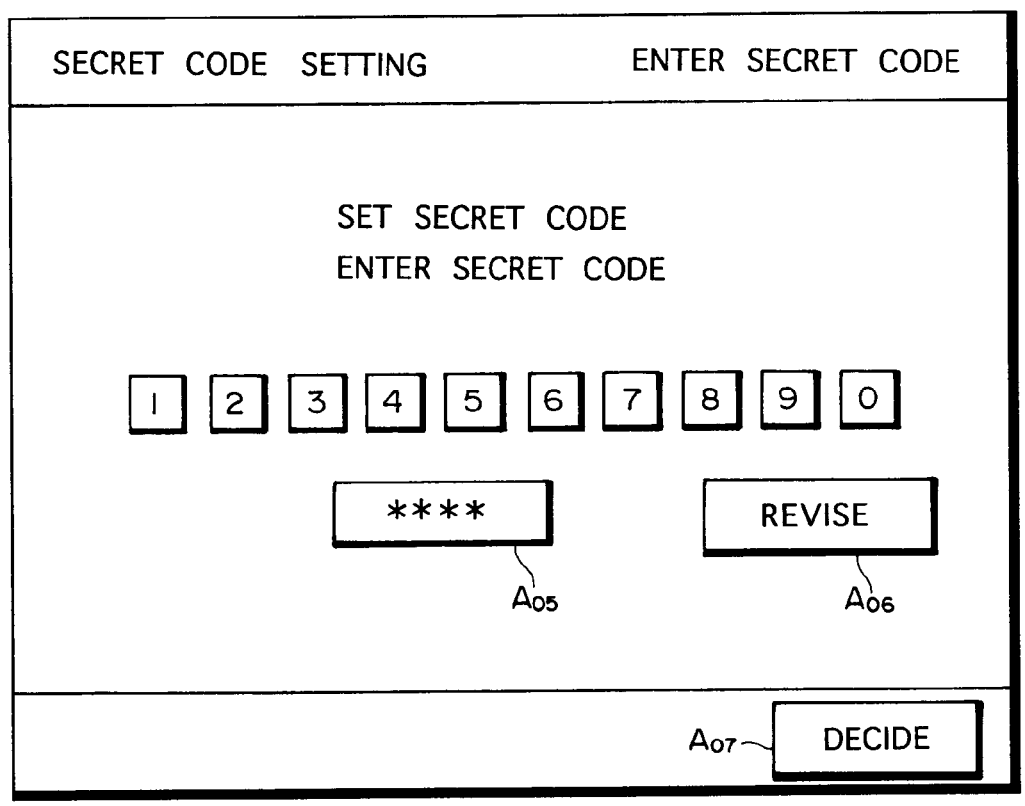
FIG. 20 illustrates an example of a screen displayed on the display unit of the filing system.

The maintenance man touches the area $A_{S3}$ to set the secret code (step 12, "YES" at step 13). When the area $A_{S3}$ is touched by the finger of the maintenance man, an environment setting screen shown in FIG. 19 is displayed on the display unit (step 14).

The environment setting screen includes areas $A_{O1} \sim A_{O4}$. The filing system is such that peripherals by different manufacturers can be connected even if the type of peripheral is the same. For example, a film scanner by Company A can be connected and so can a film scanner by Company B. In a case where peripherals by different manufacturers are connected to the system, it is required that a setting be made that conforms to the manufacturer of the peripheral. The area touched by the finger of the maintenance man to thus make the setting of the peripheral is area $A_{O1}$. A transition is made to processing for limiting or setting various processing in the filing system in response to the maintenance man's touching of the area $A_{O2}$, a transition is made to processing for setting the secret code in response to the maintenance man's touching of the area $A_{O3}$, and the starting screen shown in FIG. 18 is restored in response to the maintenance man's touching of the area $A_{O4}$.

The area $A_{O3}$ is touched by the finger of the maintenance man to set the secret code ("YES" at step 15). When the area $A_{O3}$ is touched by the maintenance man, a screen shown in FIG. 20 for setting the secret code is displayed on the display unit 35 (step 16).

In addition to areas $A_{O5}$, $A_{O6}$ and $A_{O7}$, numeric keypad for the numbers 0 through 9 and a message calling for entry of a secret code are displayed on the secret-code setting screen. The secret code is entered by the maintenance man using the numeric keypad (step 17). Asterisks appear in the area $A_{O5}$ as each numeral of the secret code is entered. Since asterisks are displayed in the area $A_{05}$, another person can be prevented from learning the code by looking at the area $A_{05}$. The maintenance man can change the entered secret code by touching the area $A_{06}$. The maintenance man finalizes the entered secret code by touching the area $A_{07}$.

Figure 21:
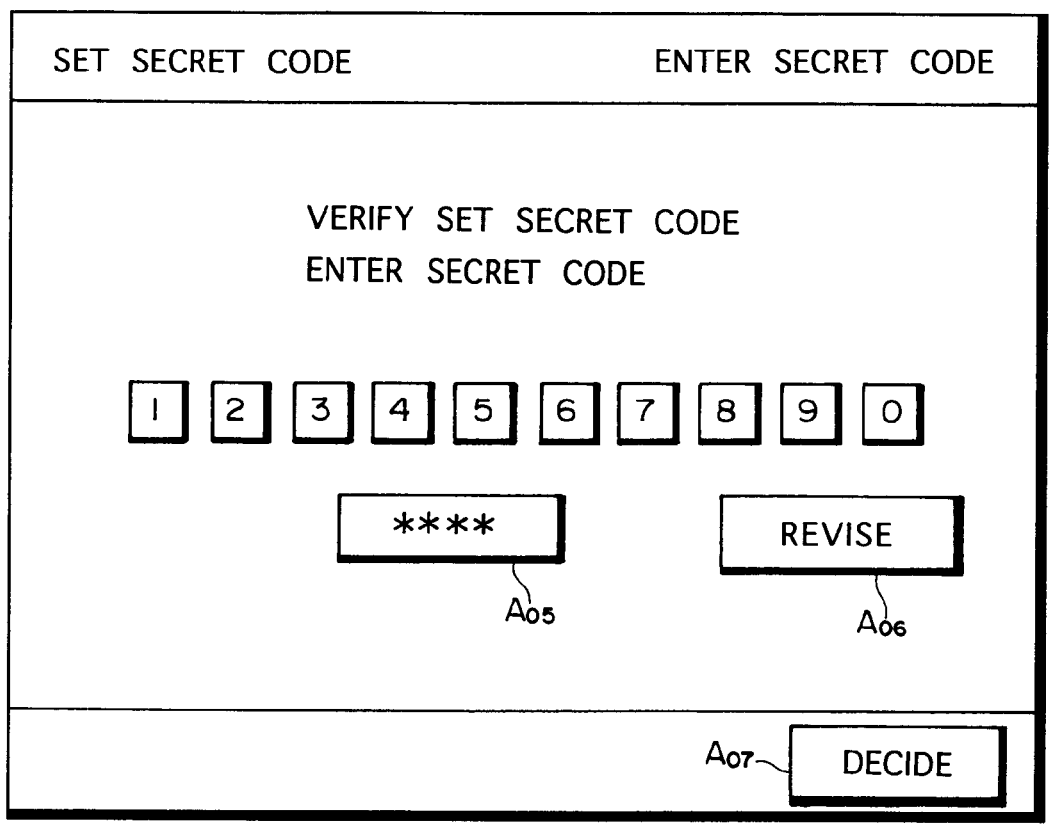
FIG. 21 illustrates an example of a screen displayed on the display unit of the filing system.
Figure 22:
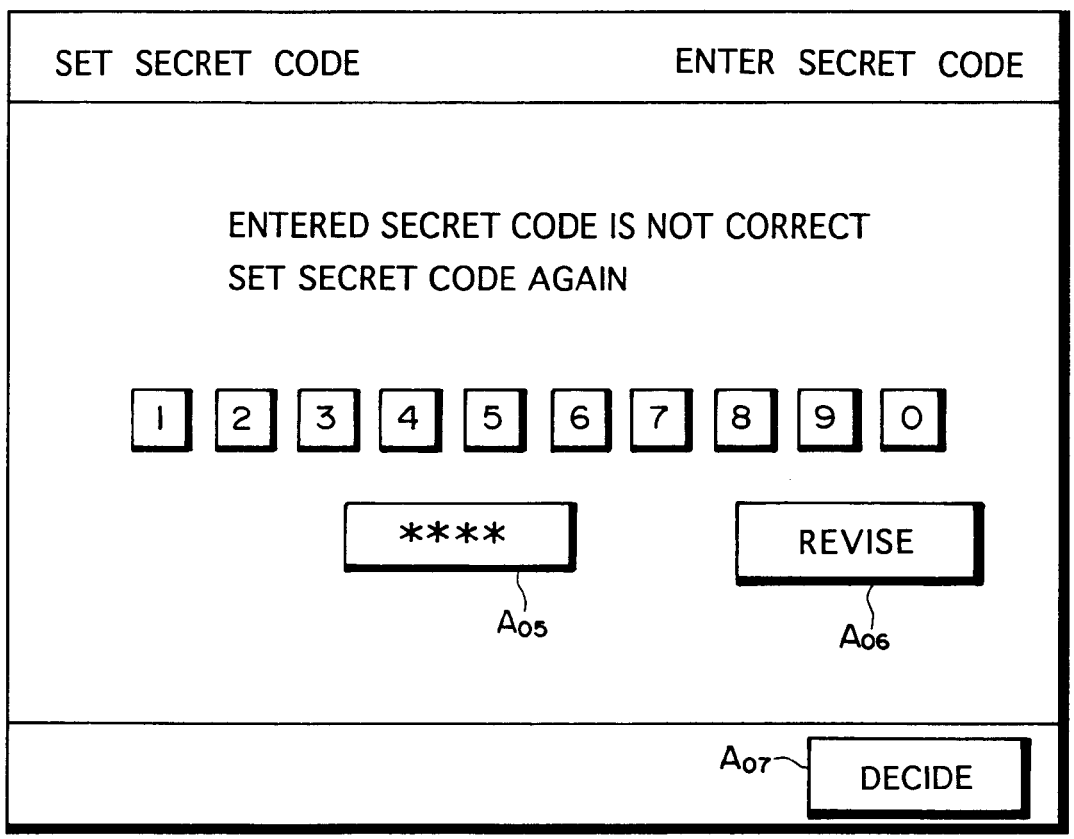
FIG. 22 illustrates an example of a screen displayed on the display unit of the filing system.

When the secret code is entered by the maintenance man using the numeric keypad and the secret code is finalized in response to touching of the area $A_{07}$ by the maintenance man, a screen for re-displaying the secret code is displayed, as shown in FIG. 21 (step 18). The maintenance man enters the secret code again using the numeric keypad (step 19). It is determined whether the re-entered secret code is the same as the secret code already entered (step 20). If the already entered secret code and the re-entered secret code are judged to be the same ("YES" at step 20), then the secret code is stored in the memory of computer 31 as a legitimate secret code (step 22). As a result, the display screen on the display unit 35 returns to the starting screen shown in FIG. 18. If the already entered secret code and the re-entered secret code are different ("NO" at step 20), then the display screen presented by the display unit 35 changes to a screen calling for re-entry of the secret code, as shown in FIG. 22 (step 21). The maintenance man sets the secret code again in accordance with this message (steps 17~20).

② Filing Processing

By touching the area $A_{S1}$ when the starting screen shown in FIG. 18 is being displayed (step 11), the maintenance man (or an operator employed at the store where the filing system has been installed) causes the system to shift to filing processing ("NO" at step 13 and "YES" at step 33).

In filing processing use is made of an output medium on which playback application software has been recorded. It is of course permissible to record the application software on the output medium in filing processing.

Prescanning and main scanning of images that have been recorded on an input medium are carried out in filing processing. Rough reading of images is performed by prescanning and reduced images are displayed on the display unit 35. Images recorded on the output medium are selected by observing the reduced images. By performing main scanning with regard to a selected image, the image is read finely and the resulting image data are recorded on the output medium.

Figure 23:
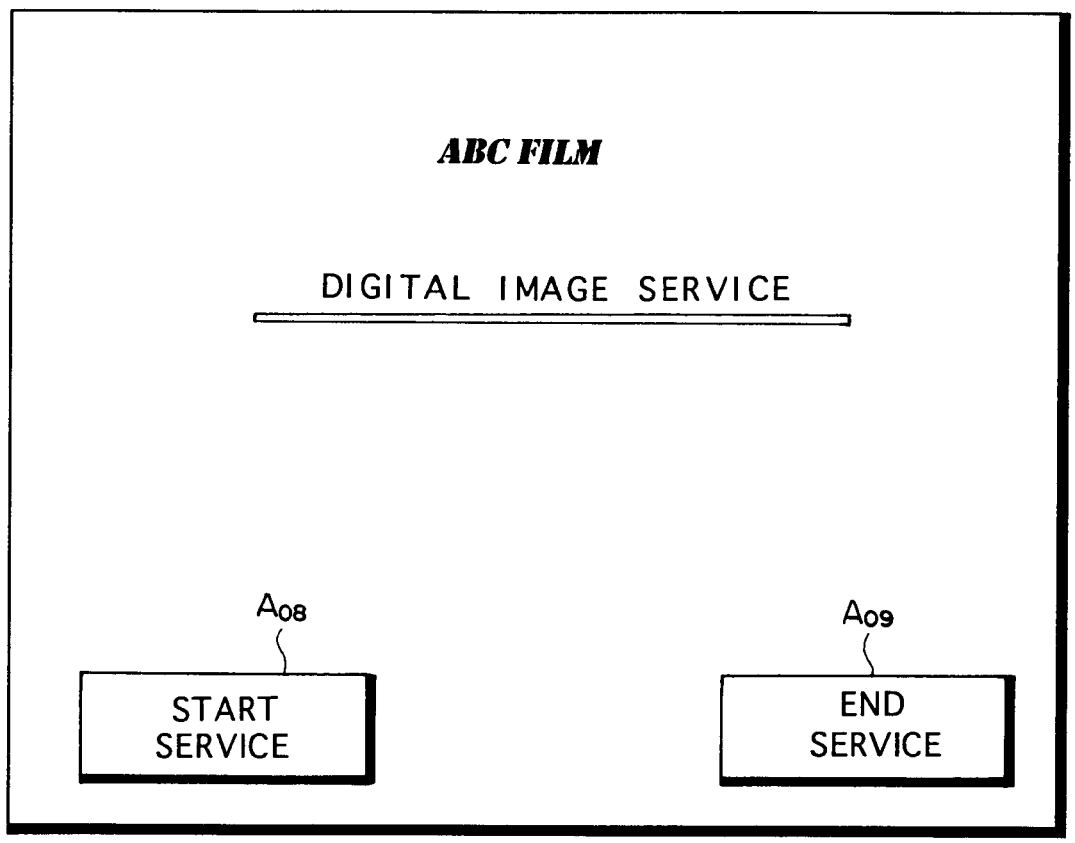
FIG. 23 illustrates an example of a screen displayed on the display unit of the filing system.

If the maintenance man (or the operator employed at the store where the filing system has been installed) touches the area $A_{S1}$ when the display screen on the display unit 35 of the filing system is the starting display screen (FIG. 18) ("NO" at step 13 and "YES" at step 33), the display screen on the display unit 35 changes to a general service screen shown in FIG. 23 (step 34).

The general service screen includes an area $A_{08}$ touched by the maintenance man (or operator) when processing is started and an area $A_{09}$ touched by the maintenance man (or operator) when processing is ended. A service selection screen of the kind shown in FIG. 24 is displayed in response to the area $A_{08}$ being touched by the maintenance man (or operator) ("YES" at step 35; step 37).

Three areas $A_{11}$, $A_{12}$ and $A_{13}$ enclosed by the frames are displayed on the service selection screen. By touching area $A_{11}$ among the areas $A_{11}$, $A_{12}$ and $A_{13}$, the user starts filing processing and causes the screen on the display unit 35 to change over to an input medium selection screen of the kind shown in FIG. 25 (YES at step 38; step 41 in FIG. 15).

Figure 24:
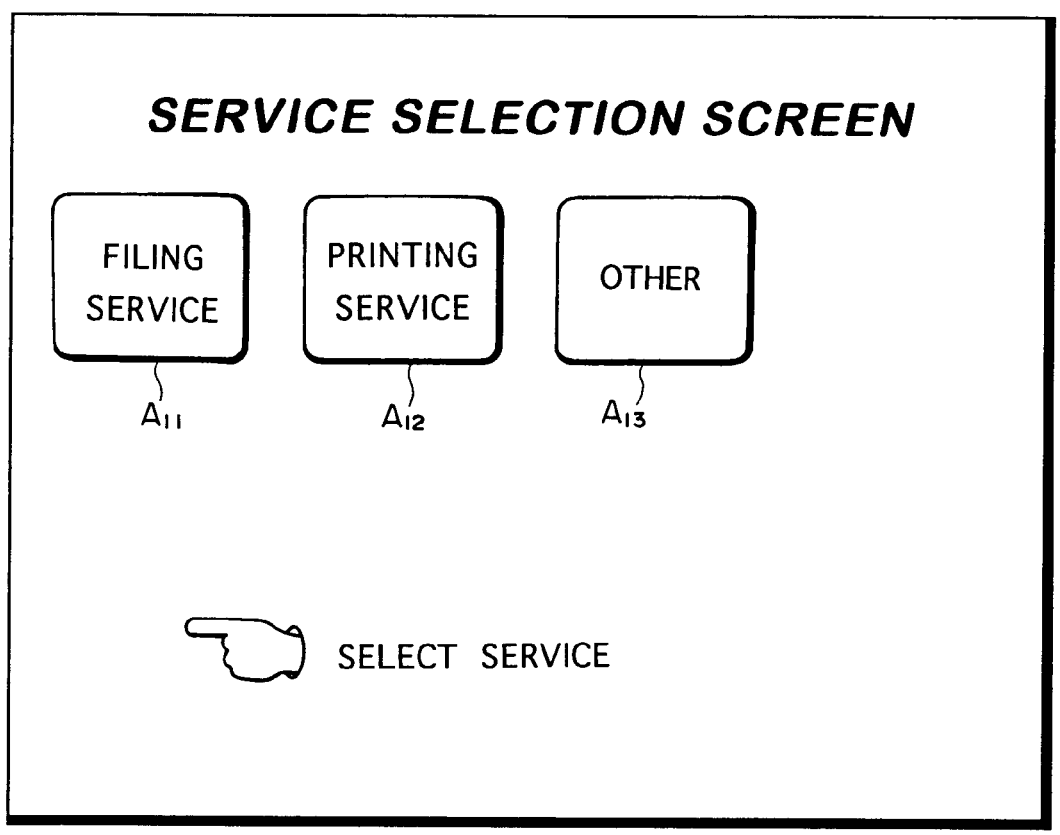
FIG. 24 illustrates an example of a screen displayed on the display unit of the filing system.

The area $A_{12}$ in FIG. 24 is touched in a case where printing processing is executed in the filing system shown in FIG. 5. The area $A_{13}$ in FIG. 24 is touched by the maintenance man in a case where, say, maintenance of the filling system shown in FIG. 5 is performed. Touching the area $A_{12}$ or $A_{13}$ causes a changeover to the screen suited to the particular processing. As these screens have no bearing upon filing processing, however, they are not described in this embodiment.

Figure 25:
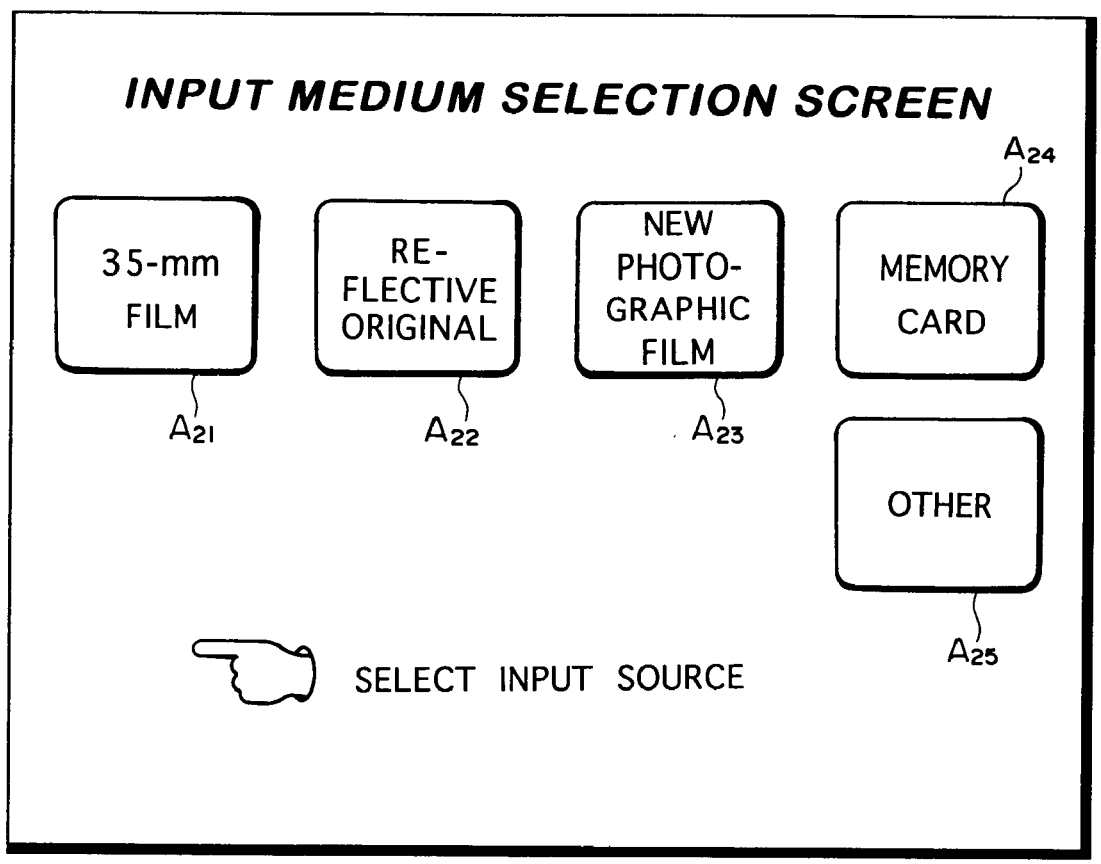
FIG. 25 illustrates an example of a screen displayed on the display unit of the filing system.

Areas $A_{21}$, $A_{22}$, $A_{23}$, $A_{24}$ and $A_{25}$ surrounded by frames are displayed on the input medium selection screen, as shown in FIG. 25. The area $A_{21}$ is touched by the user when the input medium is 35-mm photographic film of the conventional type, the area $A_{22}$ when the input medium is the reflective original, the area $A_{23}$ when the input medium is the new photographic film, the area $A_{24}$ when the input medium is the memory card, and the area $A_{25}$ when the input medium is of another type. The user touches the area that conforms to the input medium (step 42). Whichever of the film scanners 41, 42, flat-bed scanner 43 and memory card reader 44 suits the input medium is selected by the user and the input medium is loaded in the device selected.

Figure 26:
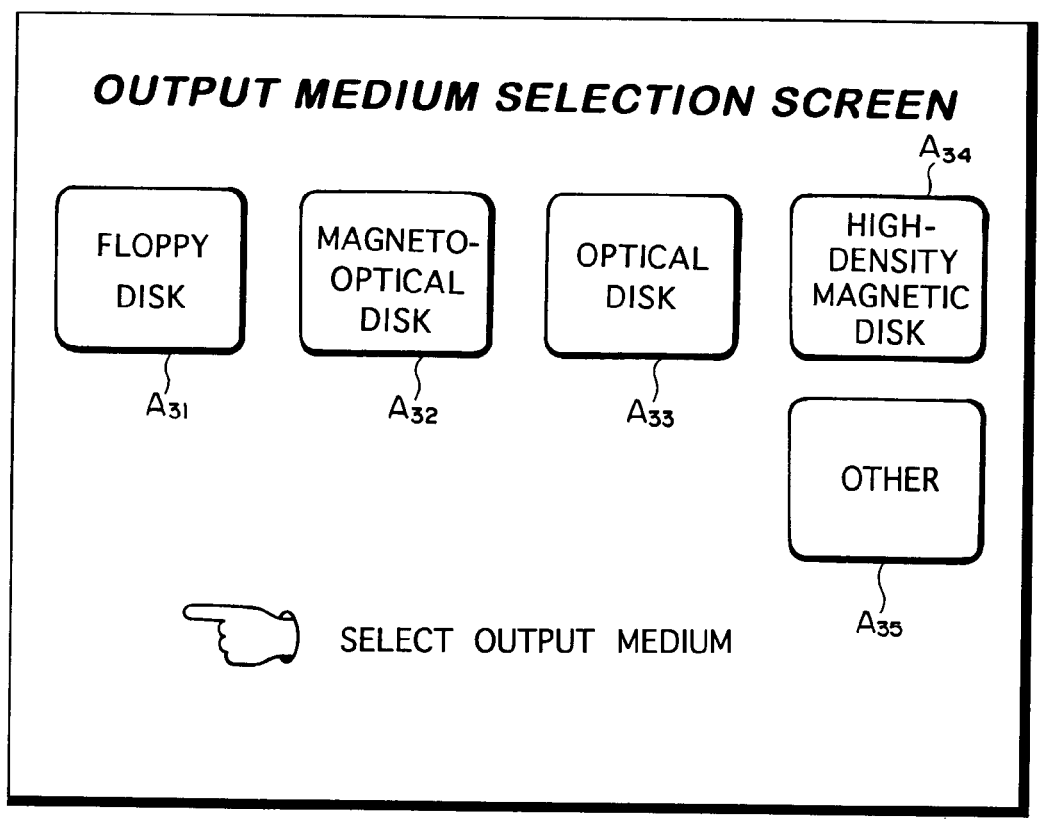
FIG. 26 illustrates an example of a screen displayed on the display unit of the filing system.

When the selection using the input medium selection screen is finished, the display screen on the display unit 35 changes over to an output medium selection screen shown in FIG. 26 (step 43). Five areas $A_{31}$, $A_{32}$, $A_{33}$, $A_{34}$ and $A_{35}$ surrounded by frames are displayed on the output medium selection screen. The area $A_{31}$ is touched by the user when the output medium is the floppy disk, the area $A_{32}$ when the output medium is the magneto-optical disk, the area $A_{33}$ when the output medium is the optical disk, the area $A_{34}$ when the output medium is the high-density magnetic disk, and area $A_{35}$ when the output medium is of another type. The user touches the area that conforms to the output medium chosen by the user (step 44). Whichever of the floppy disk device 45 or optical disk device 46 suits the output medium is selected by the user and the output medium is loaded in the device selected.

Figure 27:
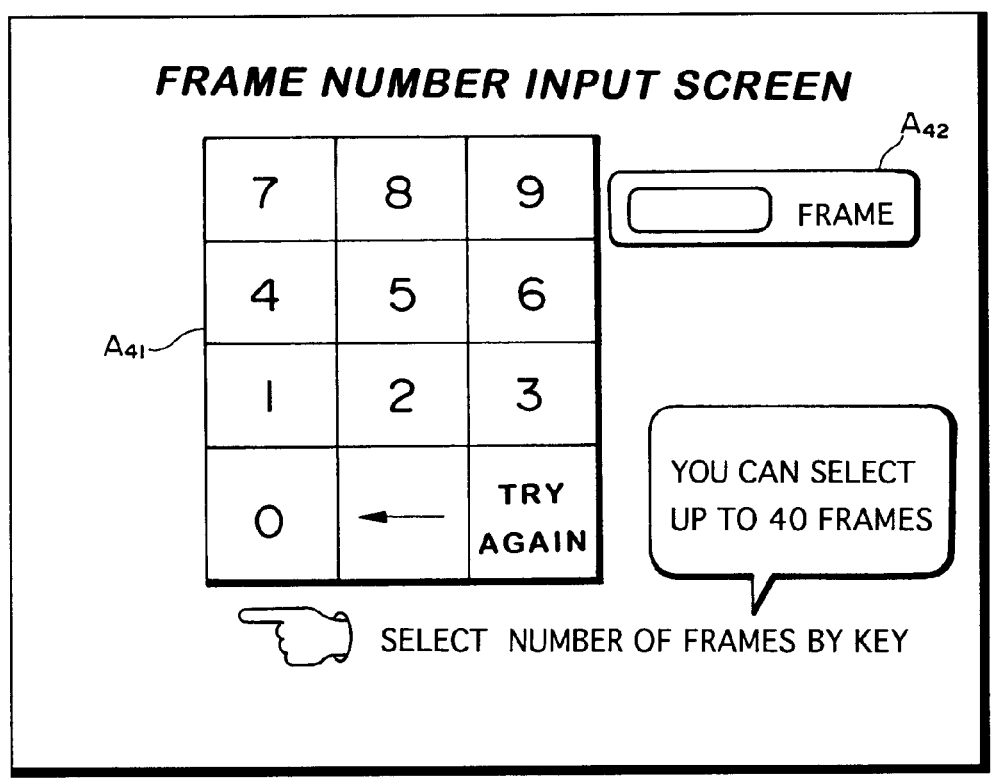
FIG. 27 illustrates an example of a screen displayed on the display unit of the filing system.

When the selection using the output medium selection screen is finished, the display screen on the display unit 35 changes over to a frame-number input screen shown in FIG. 27 (step 45). Areas $A_{41}$ and $A_{42}$ and messages are displayed on the frame-number input screen. The area $A_{41}$ includes numeric keypad, an arrow keypad pressed when entry of the number of frames is finished, and a keypad for re-specifying the number of frames from the beginning. The entered number of frames is displayed in the area $A_{42}$.

By touching the screen on the numeric keypad contained in the area $A_{41}$, the user enters the number of frames of images represented by the subject image data recorded on the output medium (step 46). The entered number of frames is displayed in the area $A_{42}$. The remaining capacity of the output medium set in the filing system is calculated and it is determined whether a data capacity required for the subject image data representing the images of the selected number of frames (as well as a general data capacity for images of mounts, described later) remains (step 47). If capacity for storing the image data representing the images of the number of frames entered on the frame-number selection screen and for storing the general amount of data for the images of the mounts does not remain on the output medium that has been set in the system, a command calling for the user to revise the entry of the number of frames is displayed on the display unit 35 ("NO" at step 47). If there is enough storage capacity remaining on the output medium ("YES" at step 47), then all of the images that have been recorded on the medium selected as the input medium are prescanned and thumbnail image data representing thumbnail images of these images are obtained. The thumbnail image data are applied to the display unit 35, where the thumbnail images are displayed in columns, as shown in FIG. 28 (step 48).

Figure 28:
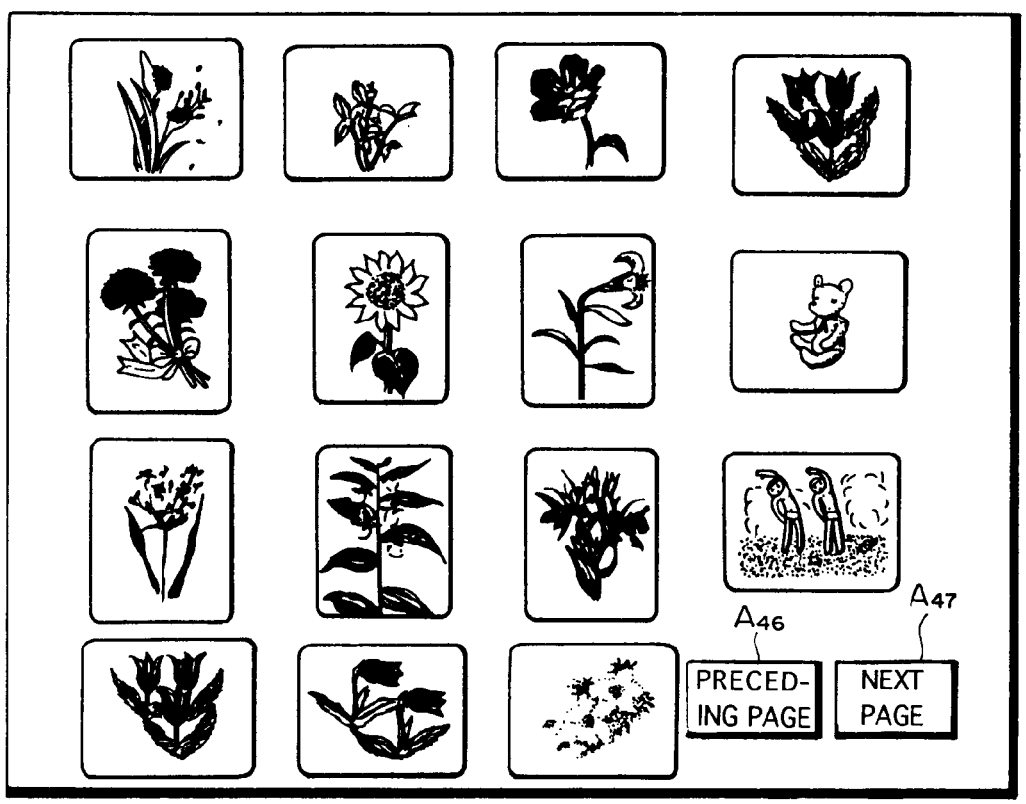
FIG. 28 illustrates an example of a screen displayed on the display unit of the filing system.
Figure 29:
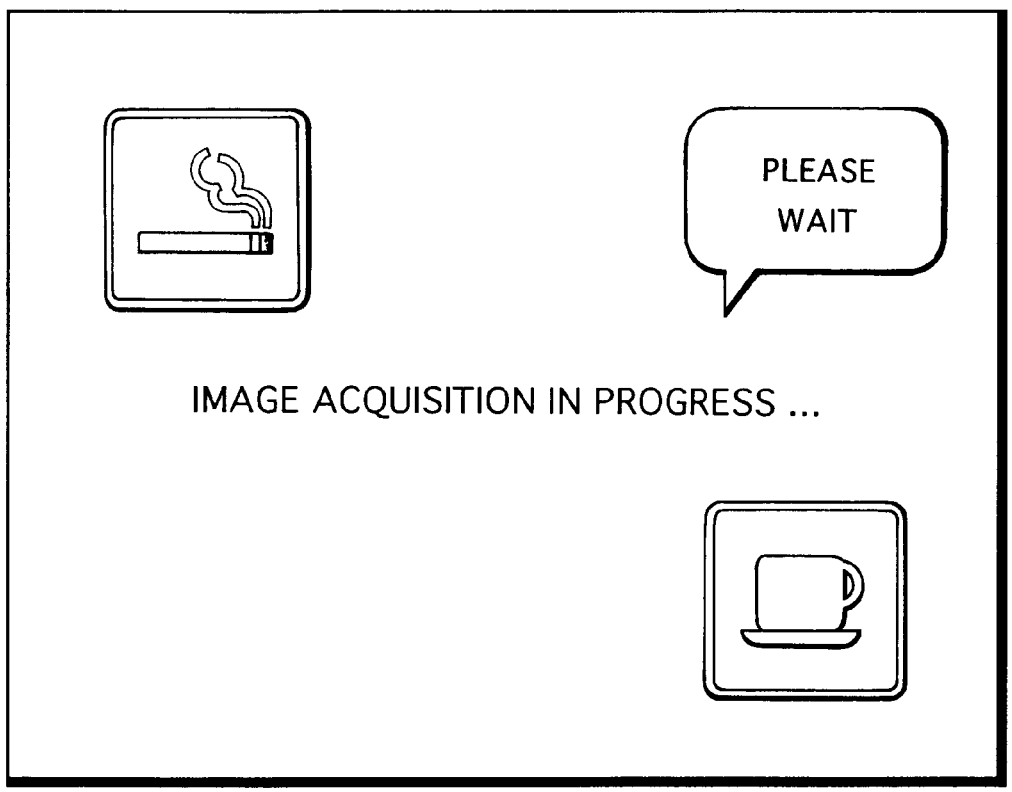
FIG. 29 illustrates an example of a screen displayed on the display unit of the filing system.

The screen showing the columns of thumbnail images in FIG. 28 includes an area $A_{46}$ which, by being touched by the user, effects a return to the preceding page, and an area $A_{47}$ which, by being touched by the user, turns the page to the next page. The desired thumbnail image is searched by touching the area $A_{46}$ or $A_{47}$.

It is determined whether the input medium is the new photographic film (step 49). If the input medium is such new photographic film ("YES" at step 49), then the IX information that has been recorded in the information recording zones 3a, 3b, 3c and 3d of this new photographic film is read (step 50 in FIG. 16). During the reading of the IX information, a screen representing this fact is displayed on the display unit 35 (step 51). Since the user must spend time waiting during the reading of the IX information, a simple animation or the like may be displayed on the display screen of the display unit 35. Furthermore, it is determined whether the IX information read includes title information (step 52). If the IX information read includes title information ("YES" at step 52), then this title information is stored temporarily in the memory of the computer 31 (step 53). If the IX information read does not include title information ("NO" at step 52), then the processing of step 53 is skipped.

Next, while observing the columns of displayed thumbnail images shown in FIG. 28, the user selects a subject image that will be recorded on the output medium (step,54). This selection is carried out by the user's touching the thumbnail image being displayed on the display screen of the display unit 35. The input medium undergoes main scanning and the image corresponding to the thumbnail image touched by the user is read (step 55). The fact that the image is being acquired is displayed on the display screen of the display unit 35 in the manner shown in FIG. 29 during the reading of the image (step 56). It is of course permissible to display a simple animation at this time. The subject image data (these image data are the original digital image data for printing) are stored temporarily in the memory of the computer 31 (step 57). The subject image data are compressed by the computer 31 (step 58) (in addition, the original digital image data for printing is subjected to processing for size reduction and both high-definition image data and thumbnail image data are generated.). These generated image data are recorded on the output medium.

Figure 30:
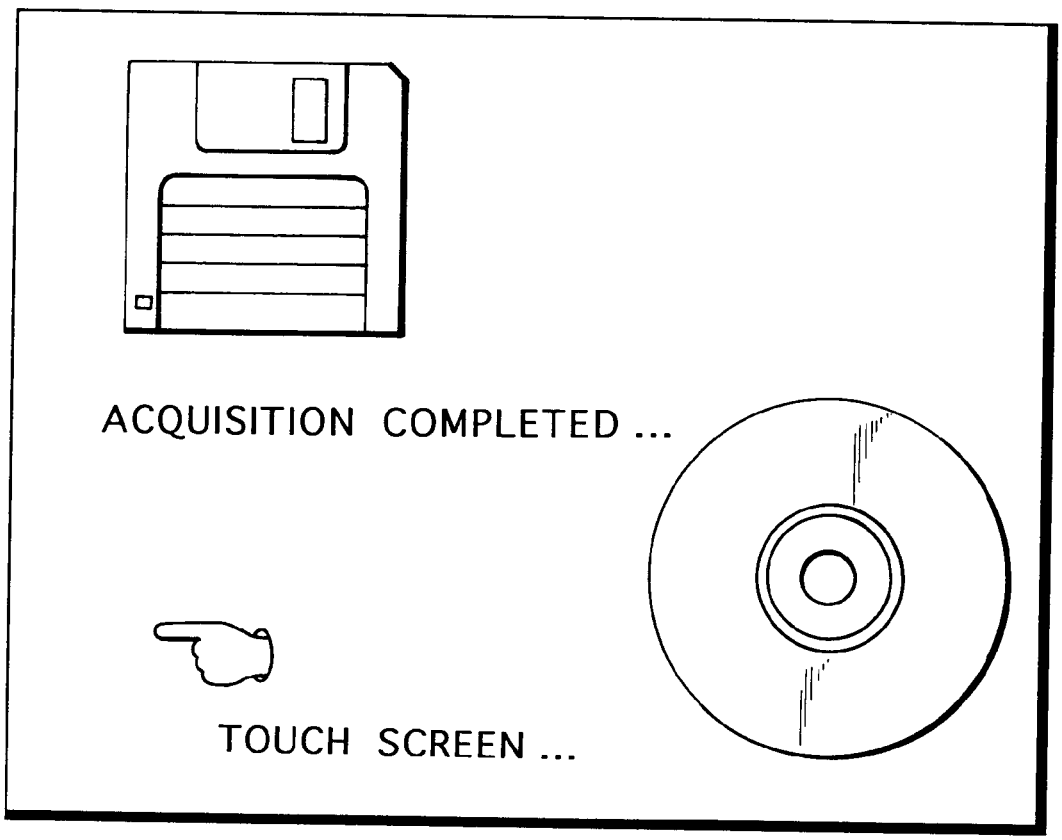
FIG. 30 illustrates an example of a screen displayed on the display unit of the filing system.

Furthermore, it is determined whether the output medium is a large-capacity output medium, i.e., an optical disk or magneto-optical disk (step 59). If the output medium does not have a large capacity, data in addition to the image data, such as the mount image data, ornamental image data and BGM data, cannot be recorded owing to the small capacity of the medium. consequently, if the output medium is not a large-capacity medium ("NO" at step 59), only the subject image data representing the selected subject image are recorded on the output medium. When the processing for recording the subject image data on the output medium is finished for all selected subject images, a message to this effect is displayed on the display screen of the display unit 35, as shown in FIG. 30 (step 63). When the processing for recording the image data on the output medium is finished and the screen shown in FIG. 30 giving notification of completion is touched by the user, the screen returns to the starting screen of FIG. 23 for general services.

If the output medium is a large-capacity recording medium, namely the magneto-optical disk or optical disk ("YES" at step 59), then it is again determined whether the input medium is the new photographic film (step 60). If the input medium is a new photographic film ("YES" at step 60), this means that title information has been stored in the memory of the computer 31 (step 53) and, hence, the title information is read out of the memory. Mount image data, ornamental image data and BGM data corresponding to the read title information are read out of the hard disk of the computer system 30 and these data are recorded on the output medium together with the subject image data representing the subject images that have been selected (step 61). At the conclusion of processing for recording all of the selected subject images and mount image data, ornamental image data and BGM data corresponding to the title information of the selected subject images, a message to this effect is displayed on the screen display of the display unit 35 in the manner shown in FIG. 30 (step 63). If the input medium is not the new photographic film ("NO" at step 60), this means that there is no title information. Accordingly, which of the mount image data, ornamental image data and BGM data should be stored on the output medium cannot be determined. Consequently, prescribed mount image data, ornamental image data and BGM data are recorded on the output medium (step 62). In this case the image of a mount represented by the mount image data, an ornamental image represented by the ornamental image and BGM represented by BGM data recorded on the output medium would be of a general variety appropriate for any subject image.

③ Concluding Service Using Secret Code

The ending of a service using a secret code is performed by the maintenance man.

If the area $A_{09}$ is touched by the finger of the maintenance man in a situation where the general service screen shown in FIG. 23 is being displayed on the display screen of the display unit 35, a transition is made to processing for concluding the service that uses the secret code. When the area $A_{09}$ is touched by the finger of the maintenance man ("YES" at step 36 in FIG. 14), the secret-code input screen shown in FIG. 31 is displayed on the display screen of the display unit 35 (step 73 in FIG. 17).

Figure 31:
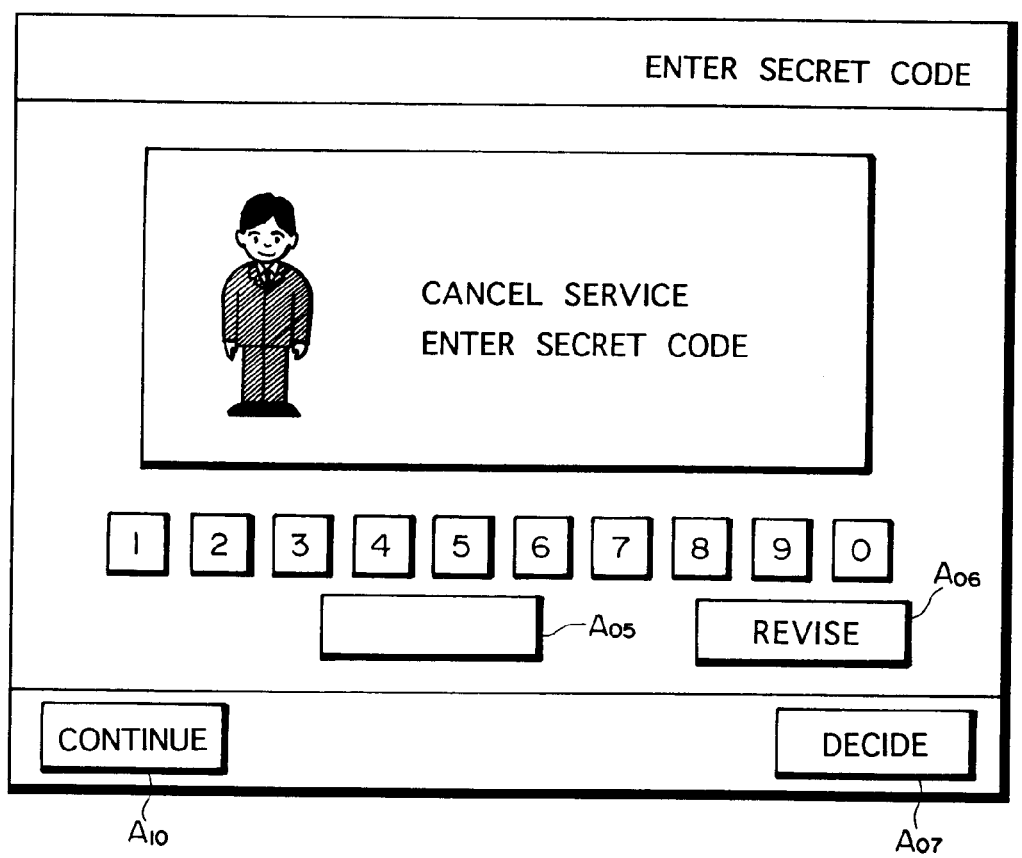
FIG. 31 illustrates an example of a screen displayed on the display unit of the filing system.

In addition to the areas $A_{05}$, $A_{06}$, $A_{07}$ and $A_{10}$, the numeric keypad of 0 through 9 and a message calling for entry of the secret code are displayed on the secret-code input screen, as shown in FIG. 31. Asterisks appear in the area $A_{05}$ as each numeral of the secret code is entered (step 74). The maintenance man can change the entered secret code by touching the area $A_{06}$. The maintenance man finalizes the entered secret code by touching the area $A_{07}$. The maintenance man suspends the processing for concluding the service by touching the area $A_{10}$.

Figure 14:
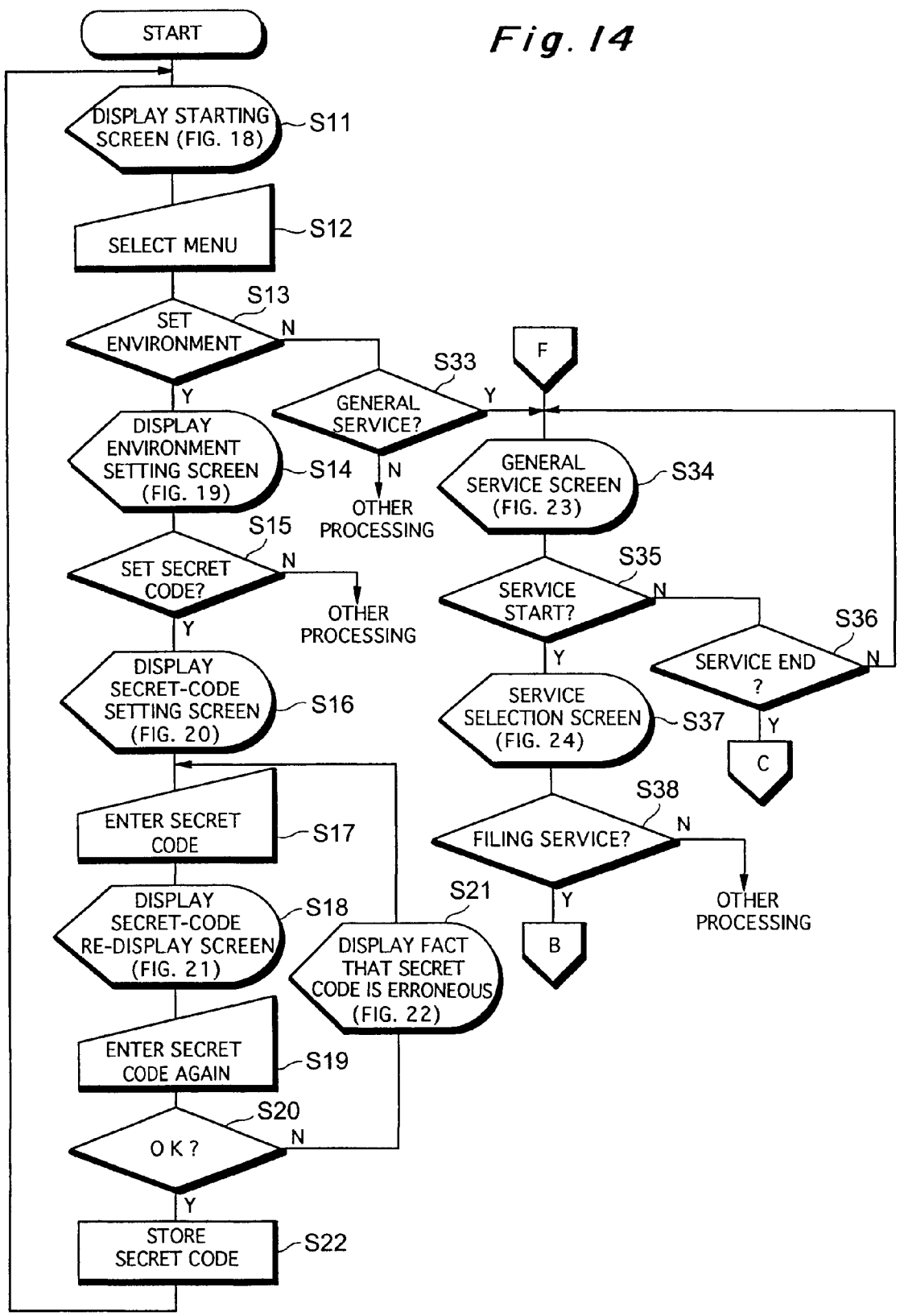
FIG. 14 is a flowchart illustrating the processing procedure of filing processing.
Figure 15:
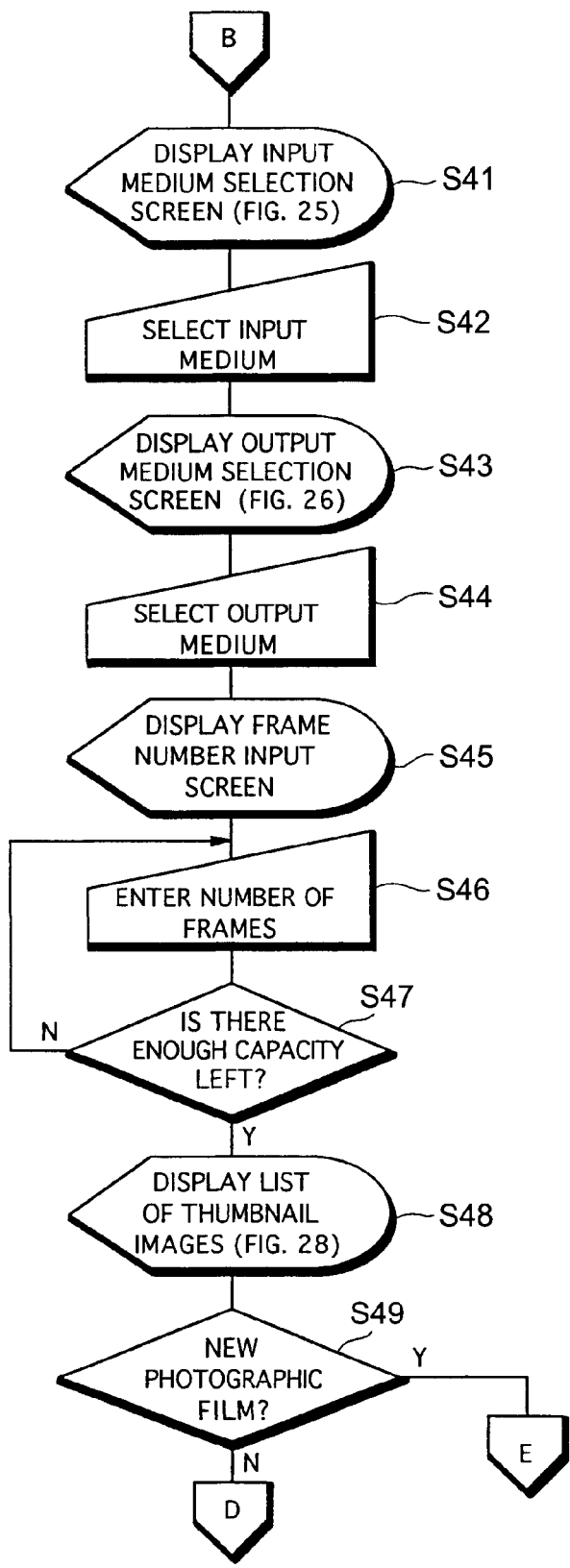
FIG. 15 is a flowchart illustrating the processing procedure of filing processing.

If the secret code entered by the maintenance man and the secret code that has been stored in the memory of the computer 31 match ("YES" at step 75), the service is terminated and the general service screen appears on the display screen of the display unit 35 (FIG. 14, step 34). If the secret code entered by the maintenance man and the secret code that has been stored in the memory of the computer 31 do not match ("NO" at step 75), then a message to the effect that the secret code is erroneous is displayed on the display screen of the display unit 35, as shown in FIG. 22 (step 76). If the secret code entered by the maintenance man is erroneous a plurality of times in succession, then any further entry of the secret code is forbidden.

④ Modification of Filing Processing

Figure 32:
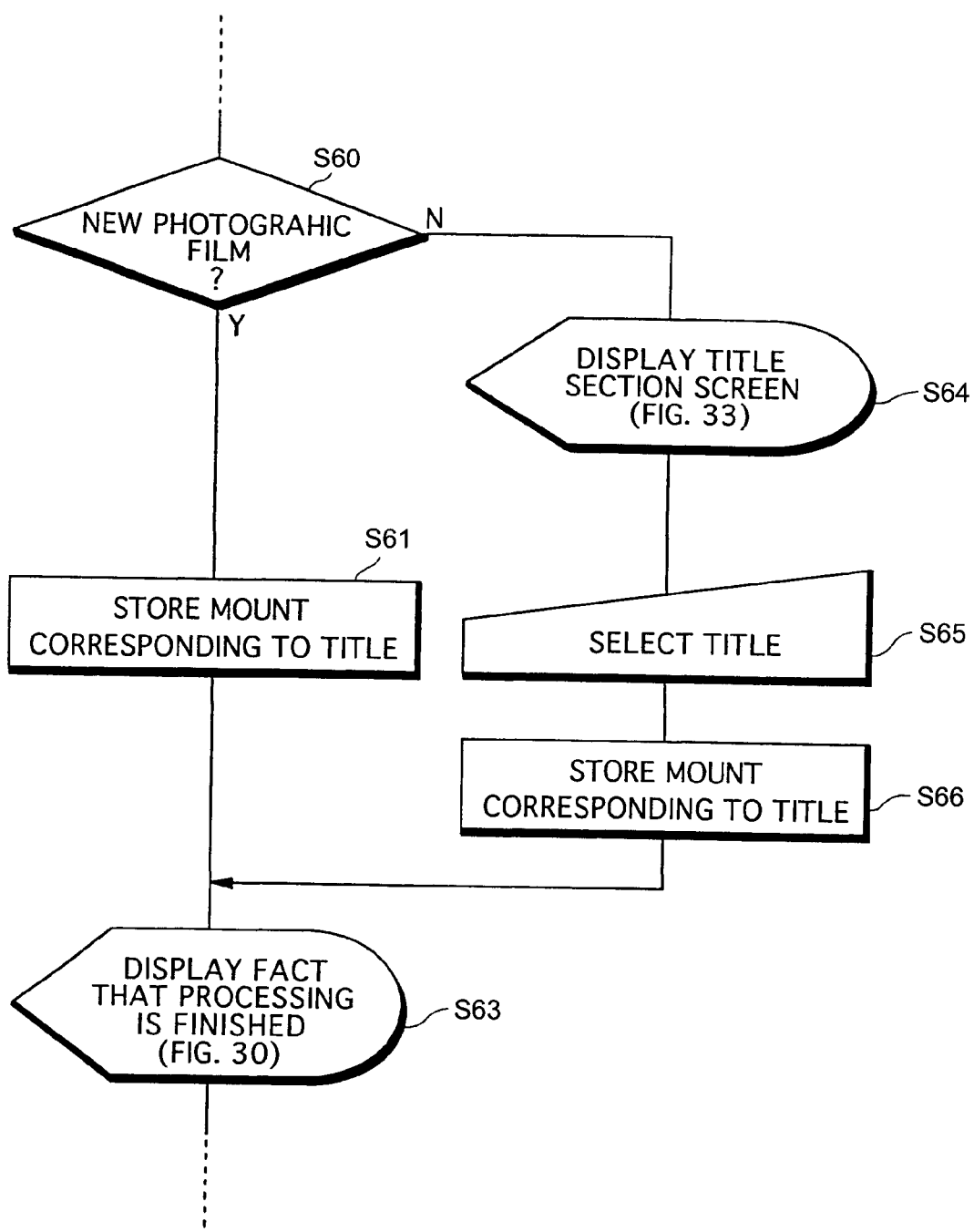
FIG. 32 is a flowchart illustrating part of another processing procedure of filing processing.

FIG. 32 is a flowchart illustrating part of a modification of filing processing in the filing system. Steps in FIG. 32 that are identical with those shown in FIGS. 14 through 17 are designated by like step numbers and need not be described again.

In a case where the input medium is determined not to be the new photographic film in the processing shown in FIGS.

14 through 17, mount image data, ornamental image data and BGM data conforming to predetermined title information are recorded on the output medium. By contrast, in a case where the input medium is determined not to be the new photographic film in the processing shown in FIG. 32, title information is designated by the user and mount image data, ornamental image data and BGM data conforming to the designated title information are recorded on the output medium.

Figure 33:
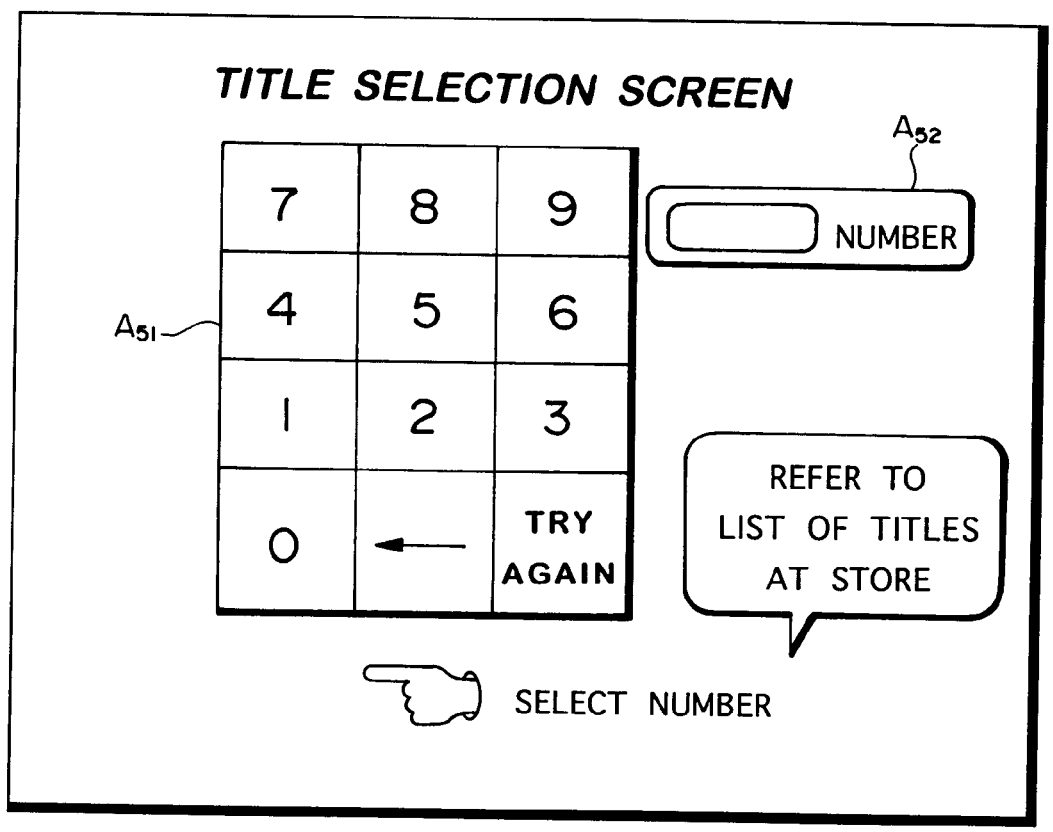
FIG. 33 illustrates an example of a screen displayed on the display unit of the filing system.

It is determined at step 60 in FIG. 32 whether the input medium is the new photographic film. If the input medium is not such new photographic film, then a title selection screen of the kind shown in FIG. 33 is displayed on the display screen of the display unit 35 (step 64). In addition to areas $A_{51}$ and $A_{52}$, messages are displayed on the title selection screen. The area $A_{51}$ includes numeric keypad, an arrow keypad pressed when entry of a title number is finished, and a keypad for re-specifying the title number from the beginning. The entered title number is displayed in the area $A_{52}$. The store in which the filing system has been installed will have a table of corresponding numerals (codes) and title information. While observing this table, the user selects a title on the title selection screen (step 65). More specifically, titles directly representing respective images to be recorded on the output medium (e.g., the title "Flower" if an image is that of a flower) are searched for in the table and the codes corresponding to these titles are found. A code thus found is entered by the user using the numeric keypad included in the area $A_{51}$.

The mount image data, ornamental image data and BGM data corresponding to a title represented by the entered code are read out of the hard disk of the computer system and these data are-stored on the output medium together with the subject image data (step 66). A mount image or the like conforming to user preference can be recorded on the output medium.

Figure 34:
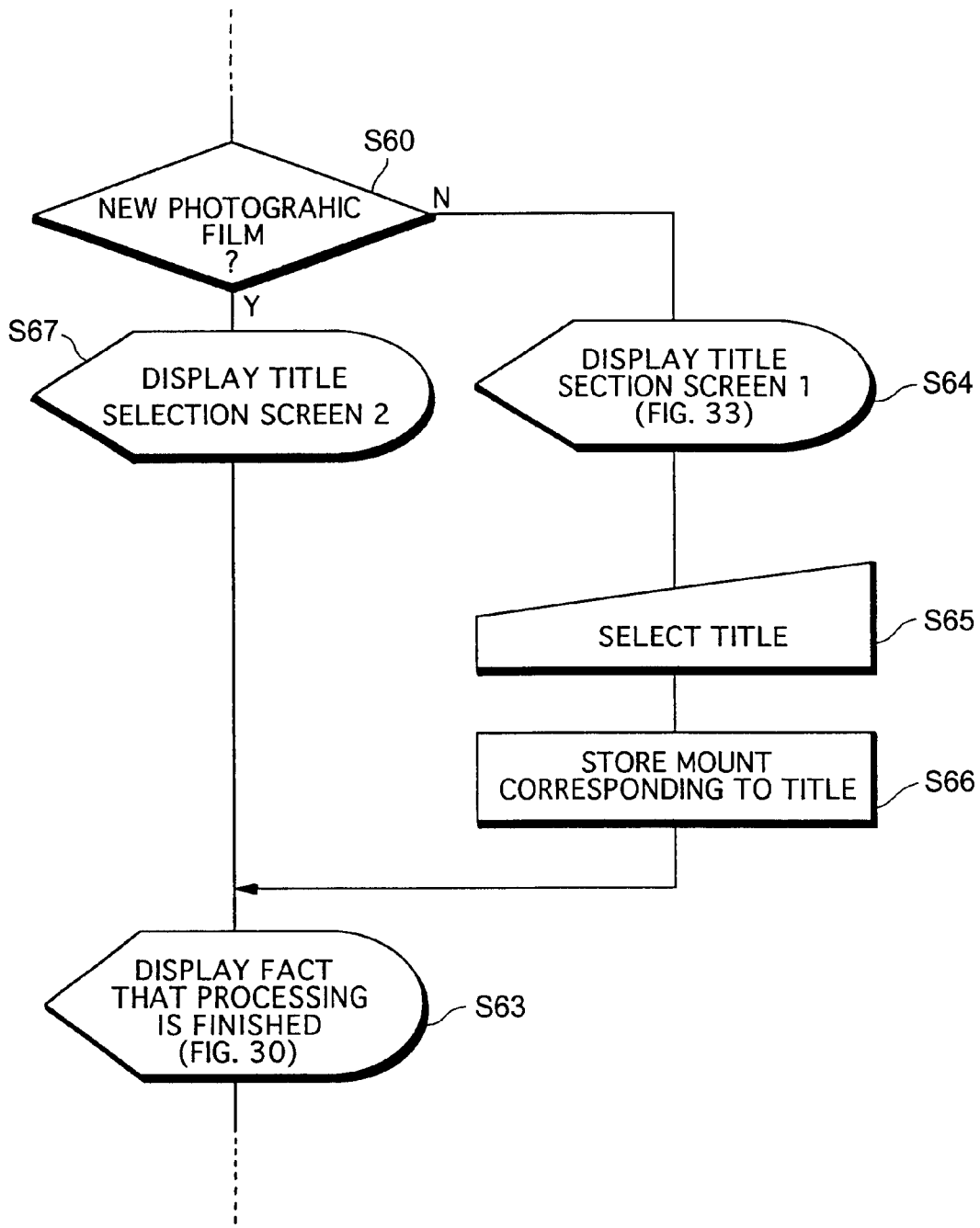
FIG. 34 is a flowchart illustrating part of another processing procedure of filing processing.

FIG. 34 is a flowchart illustrating part of another modification of filing processing in the filing system. Steps in FIG. 34 that are identical with those shown in FIGS. 14 through 17 and in FIG. 32 are designated by like step numbers and need not be described again.

In a case where the input medium is determined not to be the new photographic film in the processing shown in FIG. 32, title information is designated by the user and mount image data, ornamental image data and BGM data conforming to the designated title information are recorded on the output medium. By contrast, in the processing shown in FIG. 34, it is possible to designate title information conforming to the new photographic film also in a case where the input medium is determined not to be the new photographic film.

If it is determined at step 60 in FIG. 34 that the input medium is the new photographic film ("YES" at step 60), then a prescribed title selection screen is displayed (step 67). By way of example, if there is title information that has been recorded on the new photographic film, the title selection screen would be a screen that makes possible the designation of title information other than this title information. If the input medium is not the new photographic film ("NO" at step 60), then the title selection screen shown in FIG. 33 is displayed (step 64). In either case, selection of the title information is made using the title selection screen displayed on the display screen of the display unit 35 (step 65). It is of course permissible to adopt an arrangement in which a prescribed title selection screen is displayed at all times irrespective of whether the input medium is the new photographic film.

Figure 35:
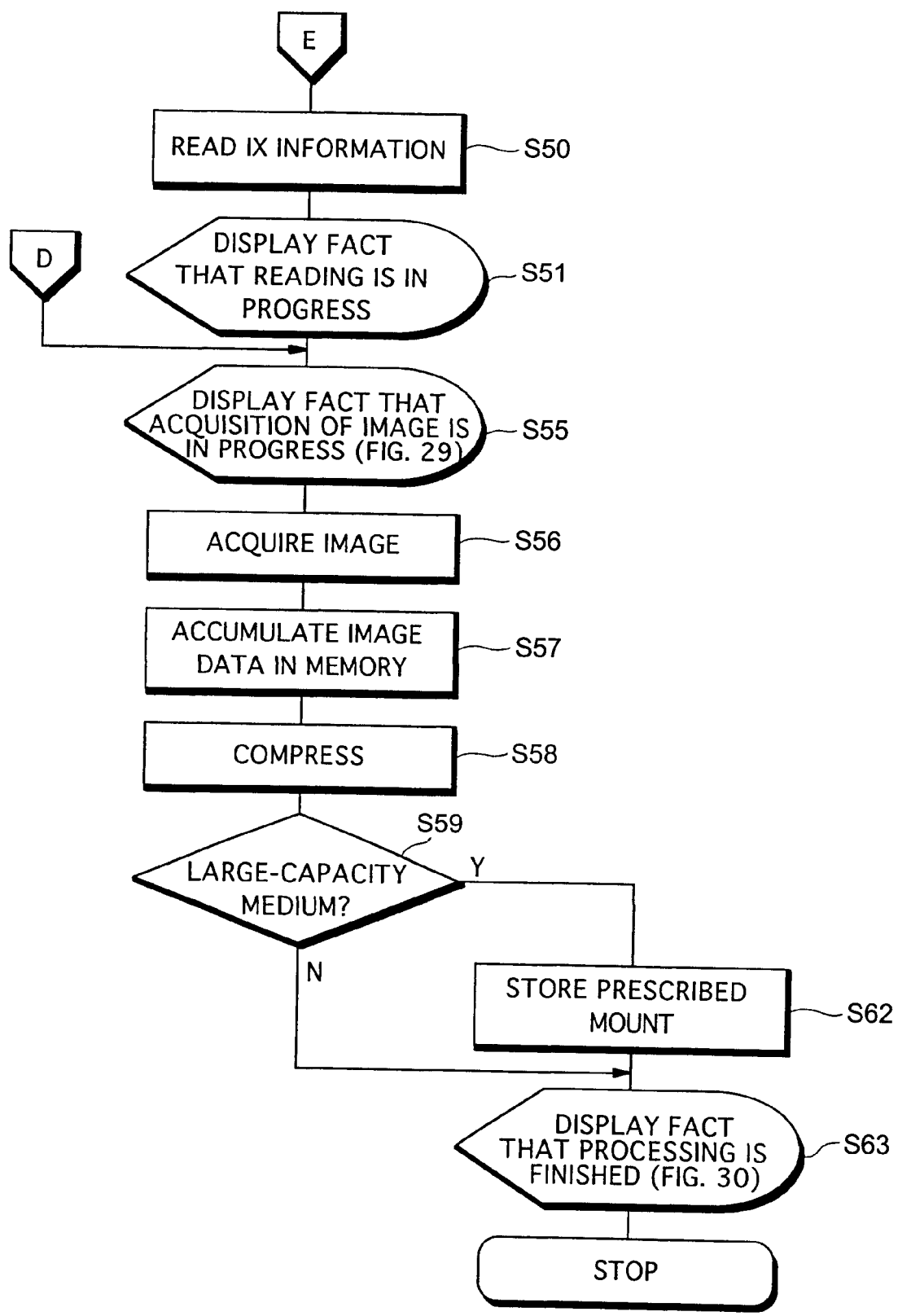
FIG. 35 is a flowchart illustrating part of another processing procedure of filing processing.

FIG. 35 is a flowchart illustrating part of another modification of filing processing in the filing system. Steps in FIG. 35 that are identical with those shown in FIGS. 14 through 17 are designated by like step numbers and need not be described again.

Figure 16:
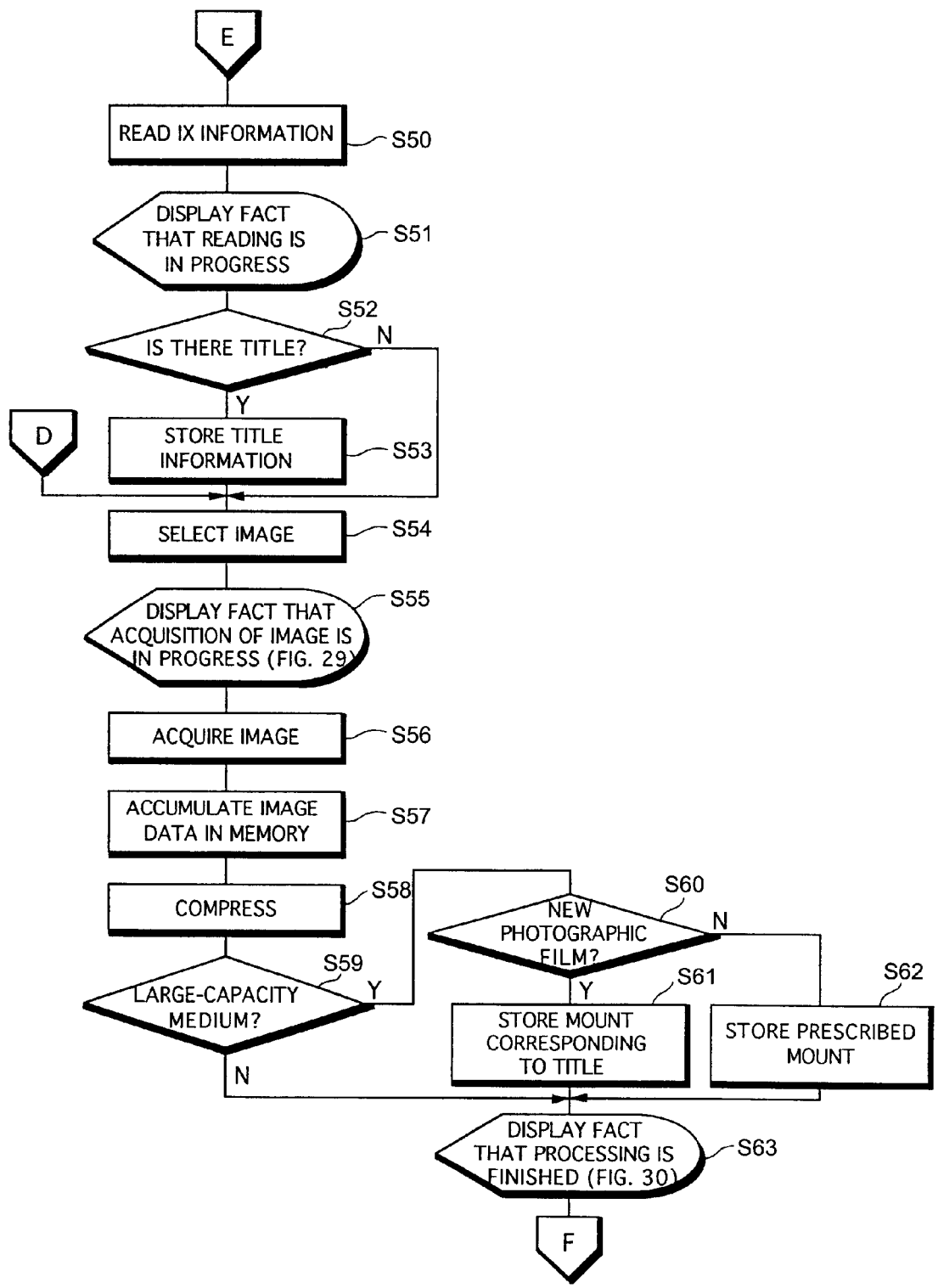
FIG. 16 is a flowchart illustrating the processing procedure of filing processing.
Figure 17:
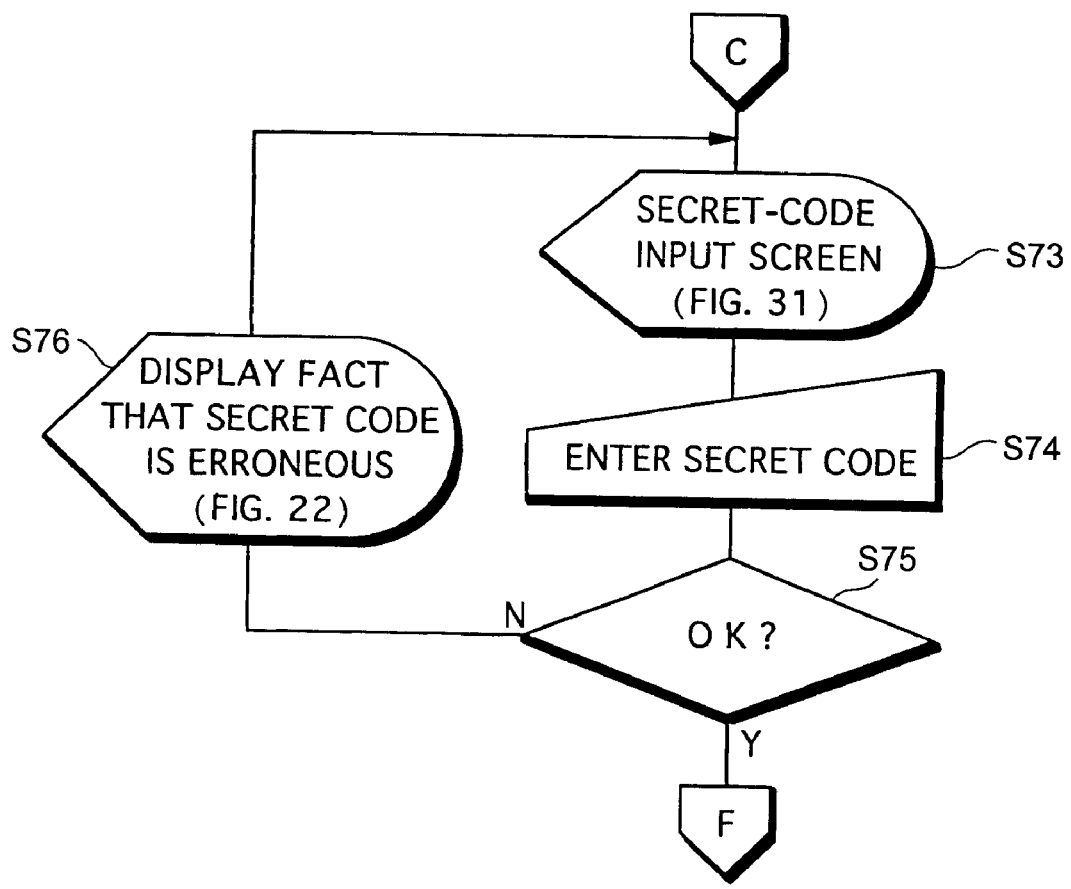
FIG. 17 is a flowchart illustrating the processing procedure of filing processing.

If the input medium is determined to be the new photographic film and title information has been stored in the information recording zone 3d, then mount image data, ornamental image data and BGM data in accordance with this title information are recorded on the output medium in the processing of steps 60~62 in FIG. 16. By contrast, in the processing of FIG. 35, mount image data, ornamental image data and BGM data corresponding to prescribed title information are always stored, irrespective of whether the input medium is the new photographic film, so long as the output medium is a large-capacity recording medium, namely a magneto-optical disk or optical disk.

(7) File Structure of Output Medium

FIGS. 36 through 41 illustrate the file structure (data structure) of the output medium. The file structure is illustrated in logical form; what is shown is not the physical structure. Accordingly, various data recorded on the output medium may be in a dispersed state rather than in the state of a single, continuous group.

Figure 36:
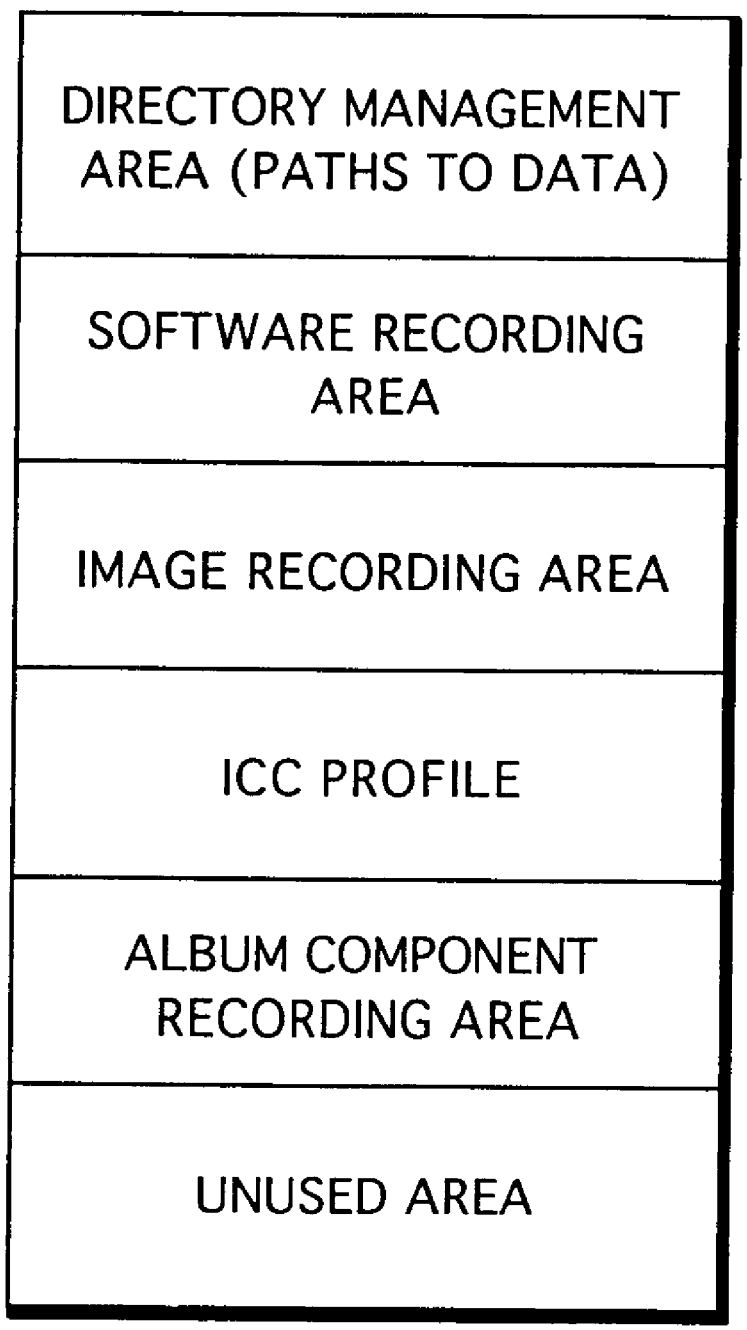
FIG. 36 illustrates the file structure of an output medium (a user's recording medium)

As shown in FIG. 36, the file structure includes a directory management area for managing all of the data that have been recorded on the output medium, a software recording area in which playback application software has been recorded, an image recording area in which subject image data (original digital image data, high-resolution image data and standard image data) representing a subject image have been recorded, an ICC (Inter Color Consortium) profile, an album component recording area in which mount image data, ornamental image data and BGM data have been recorded, and an unused area.

The details of the directory management area are illustrated in FIGS. 37 through 40, in which only data relating to the filing system of this embodiment are shown.

Figure 37:
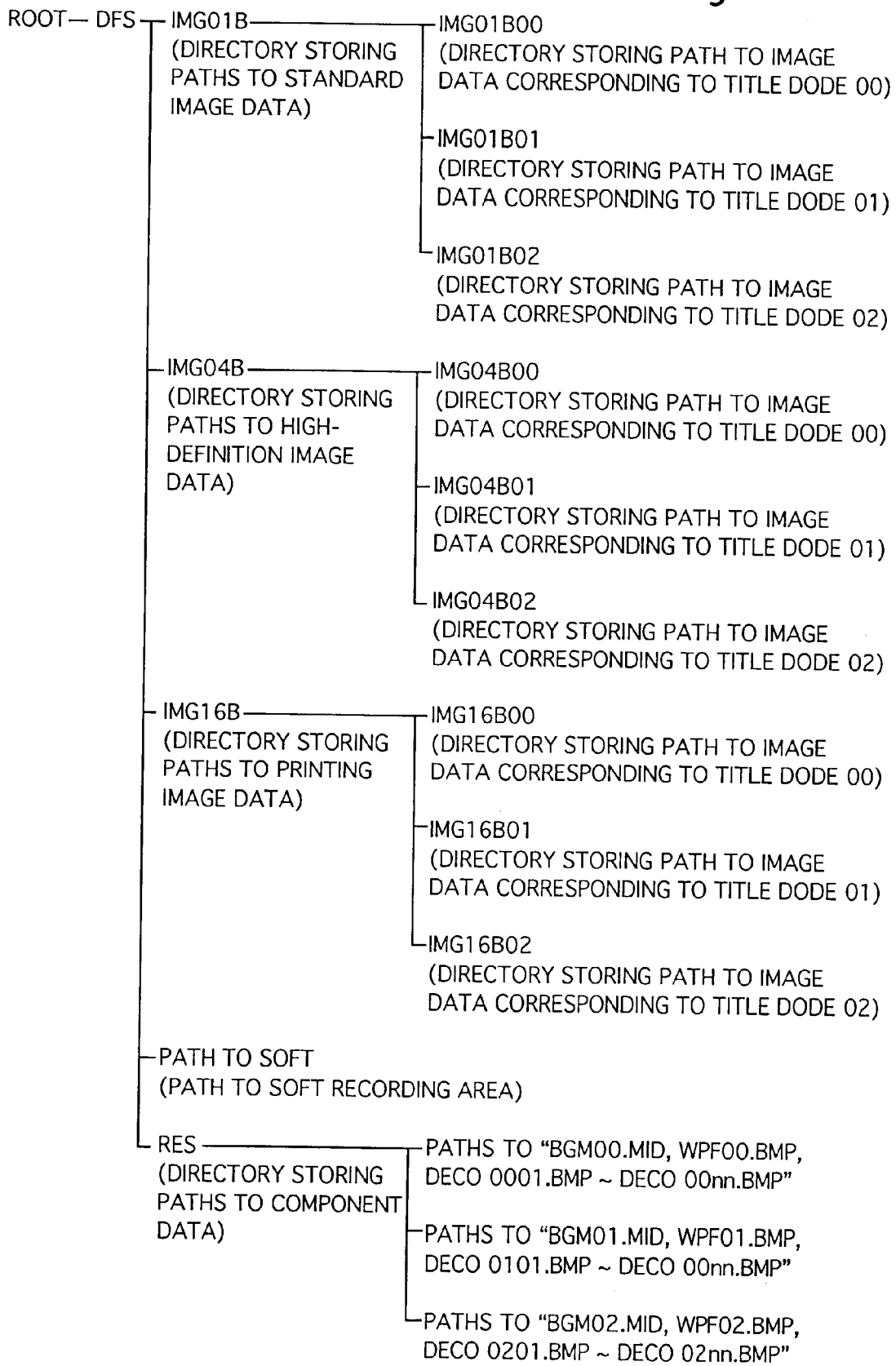
FIG. 37 illustrates the directory structure of the output medium.
Figure 38:
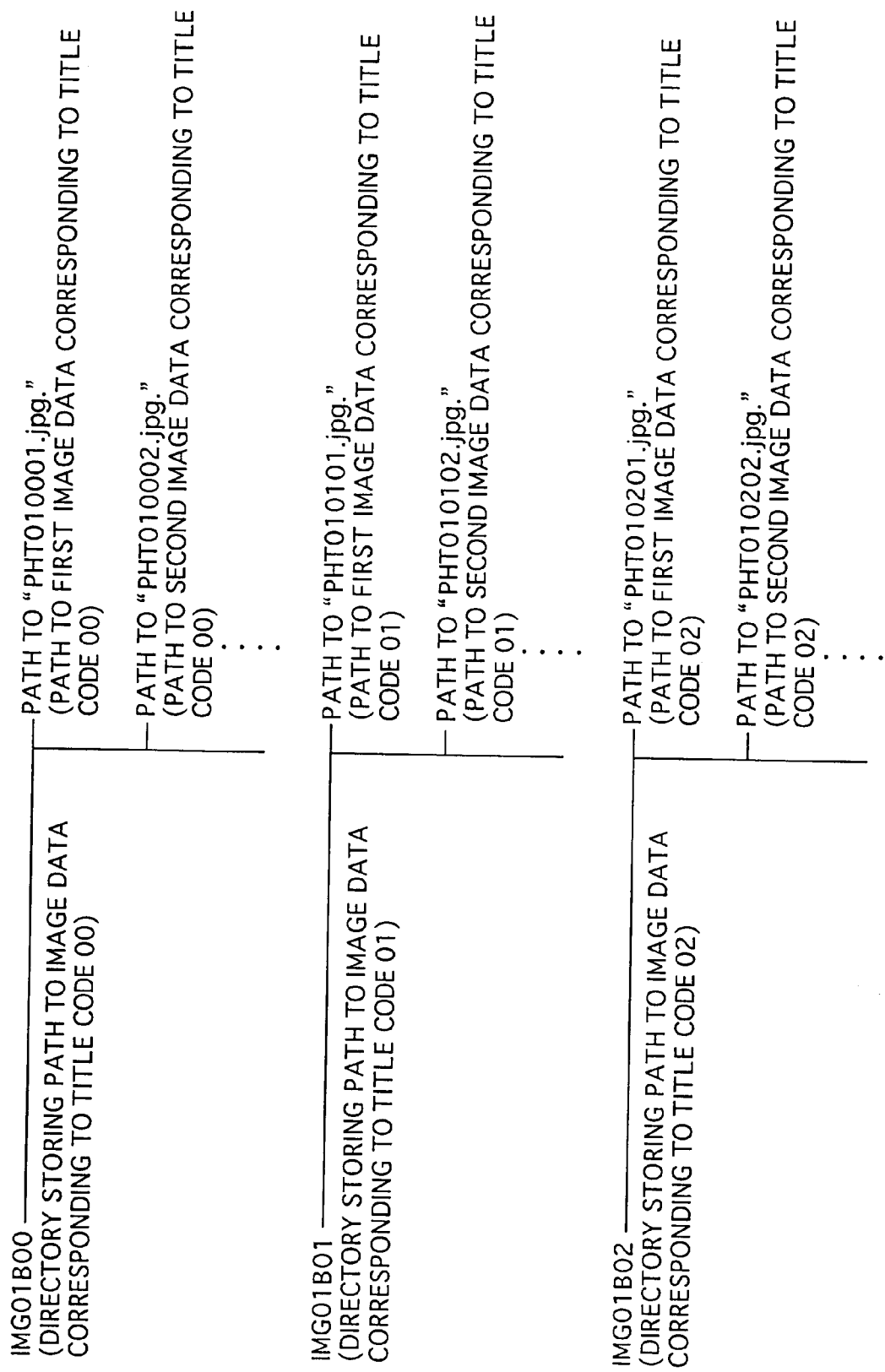
FIG. 38 illustrates the directory structure of the output medium.
Figure 39:
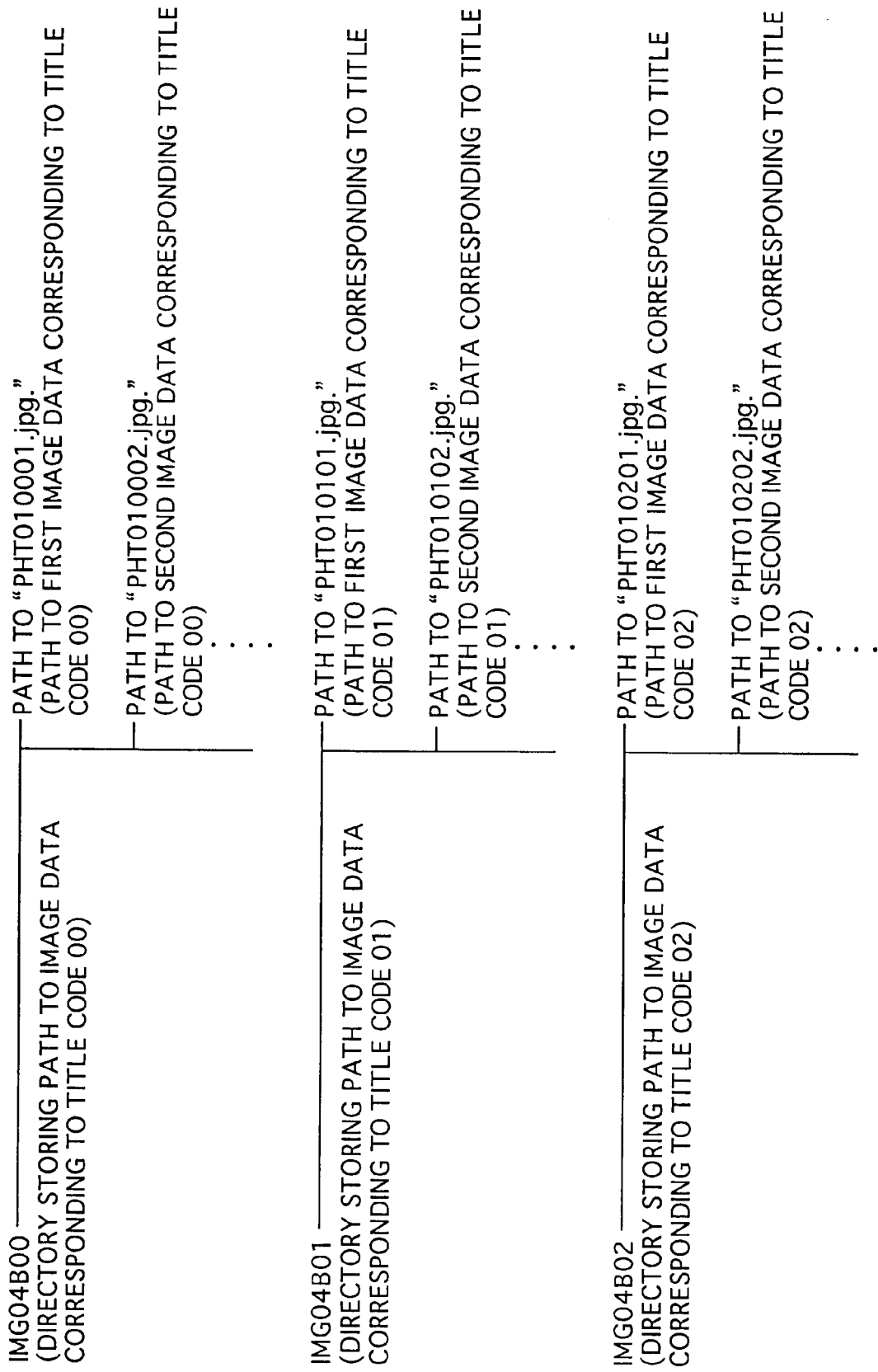
FIG. 39 illustrates the directory structure of the output medium.
Figure 40:
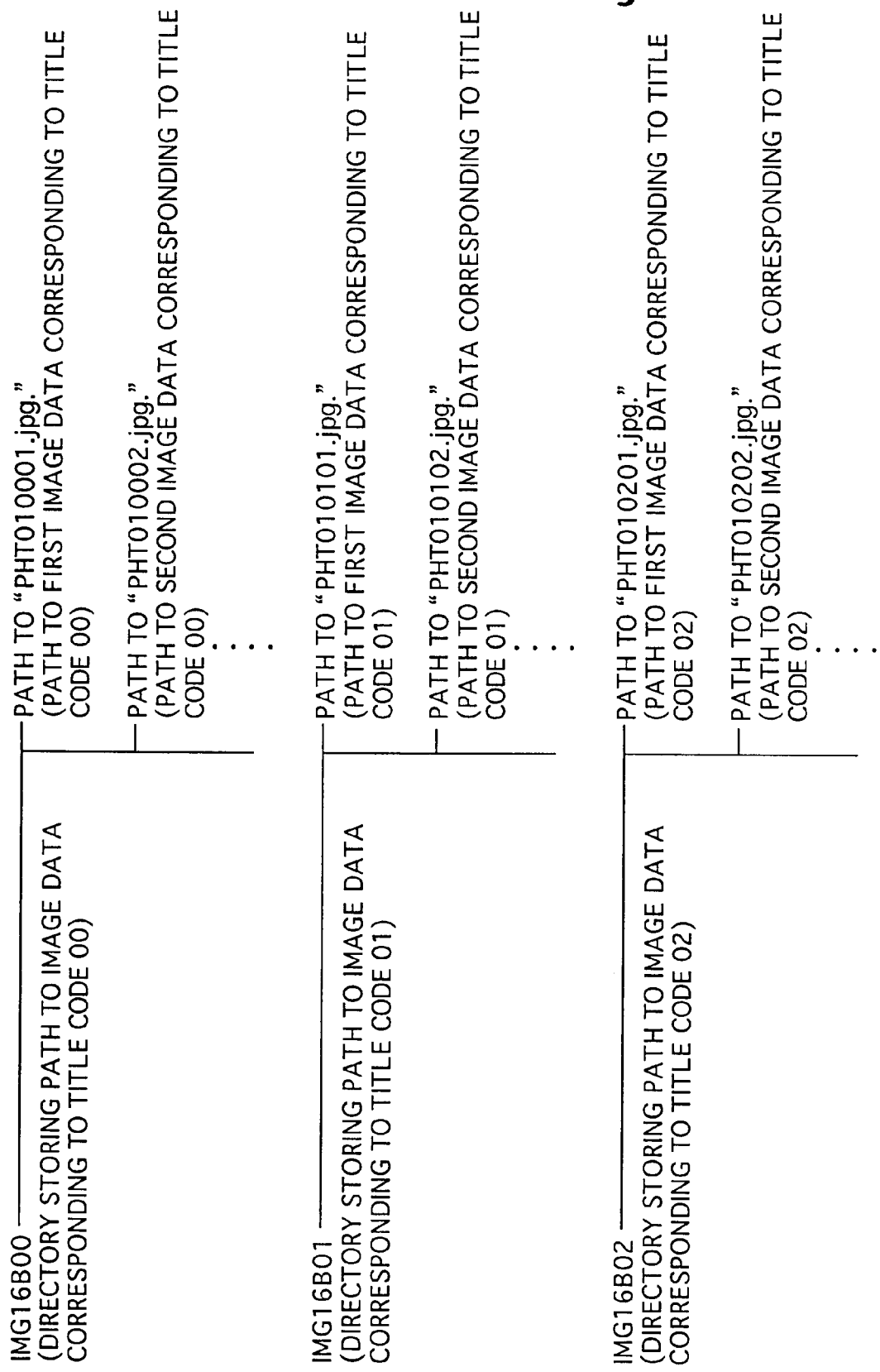
FIG. 40 illustrates the directory structure of the output medium.

As shown in FIG. 37, a root directory "ROOT" in the directory management area has a plurality of sub-directories. One of these plurality of sub-directories is a sub-directory "DFS". The sub-directory "DFS" stores the paths of data that have been recorded by the filing system of this embodiment (Among the plurality of subdirectories that exist, the sub-directory "DFS" is illustrated in FIG. 37.).

The sub-directory "DFS" includes a directory "IMG01B" in which a path to the standard image data has been stored, a directory "IMG04B" in which a path to the high-definition image data has been stored, a directory "IMG16B" in which a path to the printing image data has been stored, and a directory in which a path to the software recording area ("path to software") and paths to the component data of the mount image data, ornamental image data and BGM data have been stored. Various data corresponding to title codes "00", "01" and "02" have been recorded on the output medium having the file structure of FIGS. 36 through 41. Since paths to component data corresponding to the title codes "00", "01" and "02" have been recorded in the directory "RES" in which the path to the component data has been stored, it will be understood that three types of virtual albums can be created from an output medium possessing this directory structure.

Paths of image data corresponding to the title codes "00", "01" and "02" have been stored with regard to each of the standard image data, high-definition image data and printing image data. A plurality of paths to each item of image data have been recorded in correspondence with the title code (the image data may of course be a single item of image data rather than a plurality thereof). This indicates that there are a plurality of images having the same title code. For example, this indicates that if a title code is that for "Flowers," then a plurality of images of flowers have been recorded.

Figure 41:
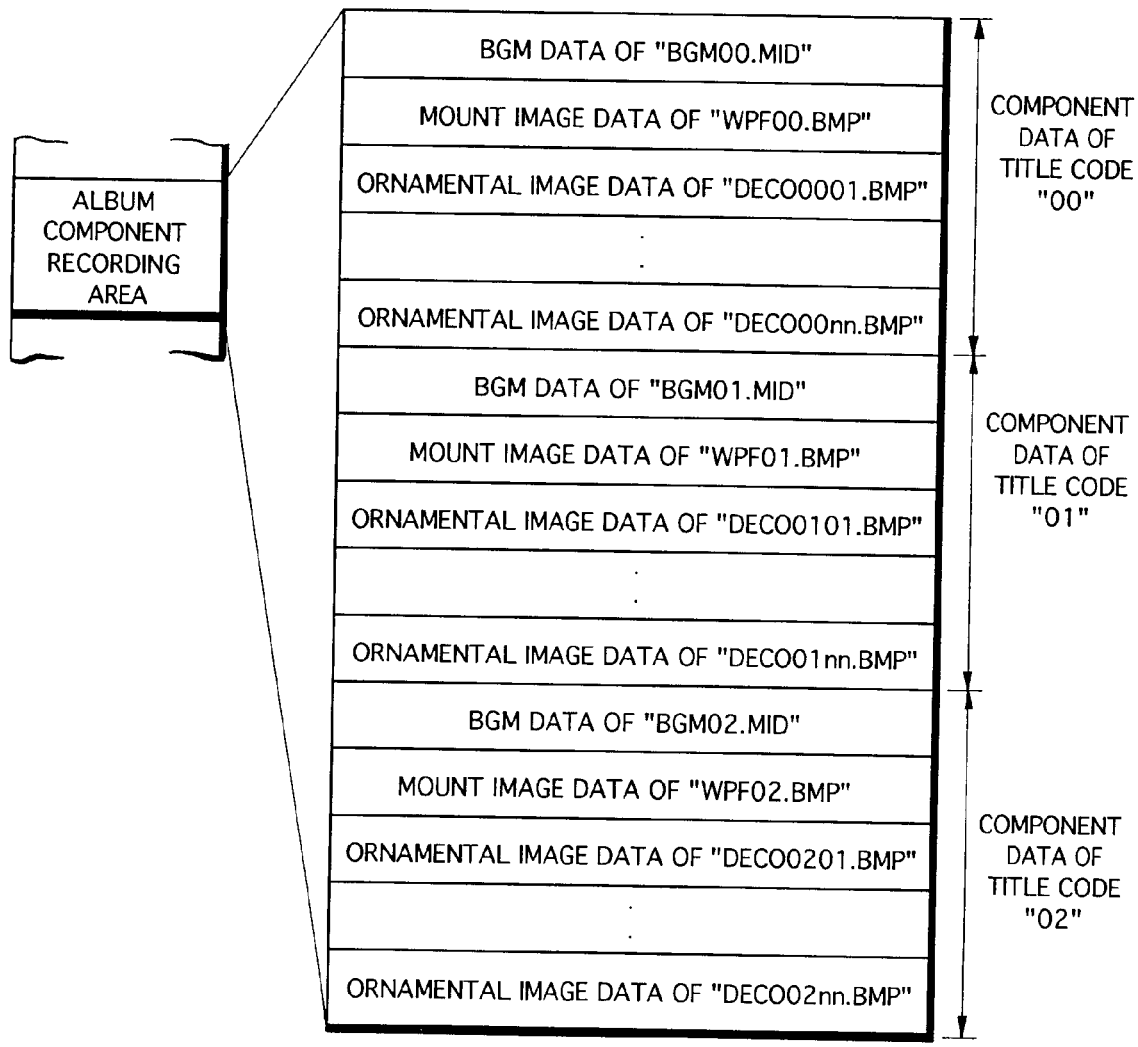
FIG. 41 illustrates the content of an area for recording a photo album component.

FIG. 41 illustrates the details of an album component recording area.

Mount image data, ornamental image data and BGM data: corresponding to the title code "00", mount image data, ornamental image data and BGM data corresponding to the title code "01", and mount image data, ornamental image data and BGM data corresponding to the title code "02" have been stored in the album component recording area. Further, nn-number of items of data have been stored with regard to each item of ornamental image data.

Since the output medium has the file structure shown in FIGS. 36~41, standard image data, high-definition image data and printing image data, as well as mount image data, ornamental image data and BGM data corresponding to the title codes can be read. For example, if a title code is specified, reference is had to the directory management area of the output medium and the path to each item of data is read. The storage location of each item of data is determined from the path so that it is possible to read each item of data.

Thus, standard image data, high-definition image data and printing image data, as well as mount image data, ornamental image data and BGM data, are correlated with one another by the title codes.

(8) Reproduction Apparatus

Figure 42:
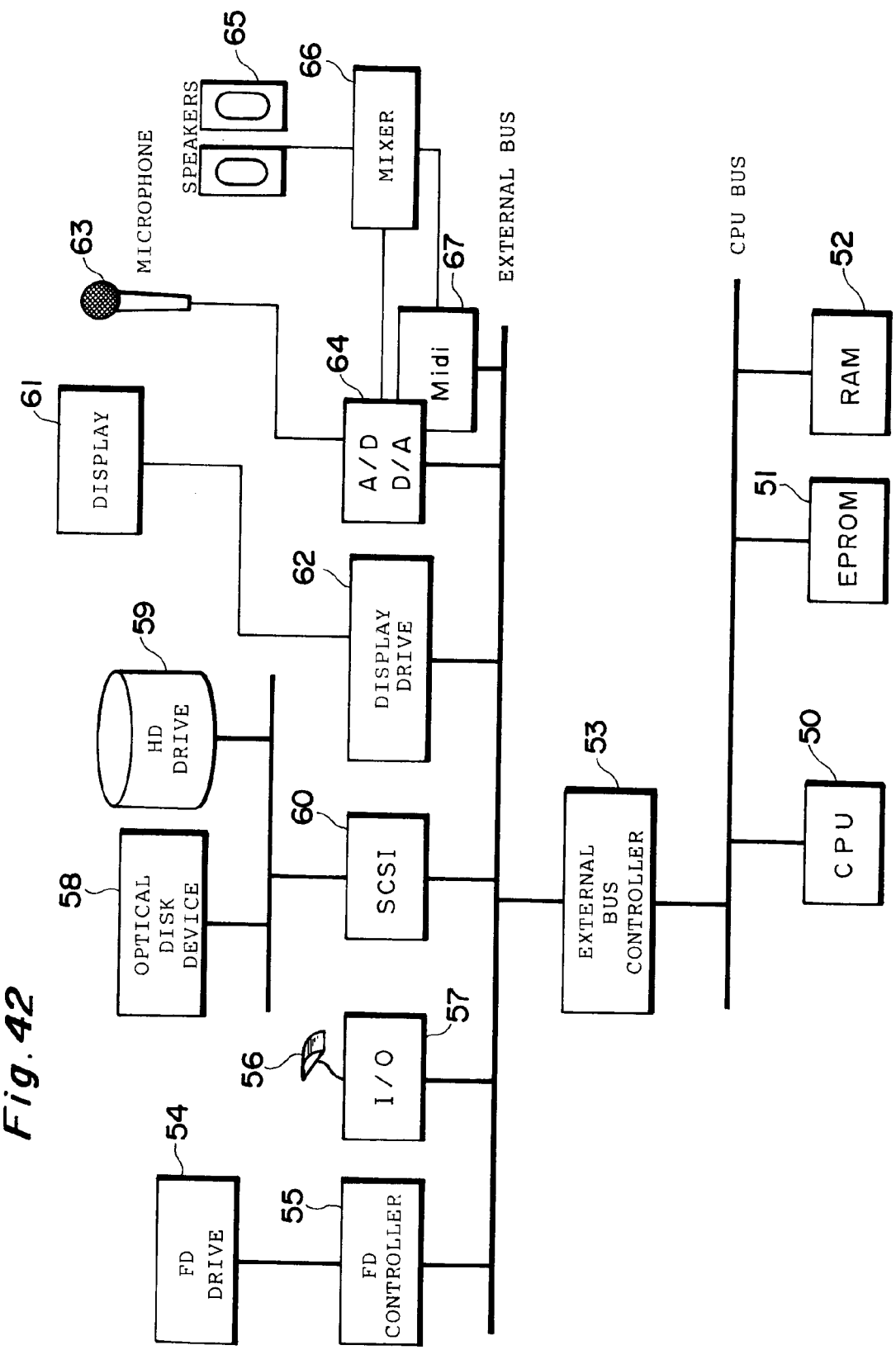
FIG. 42 is a block diagram illustrating the electrical configuration of a reproduction apparatus.

FIG. 42 is a block diagram illustrating the electrical configuration of an apparatus for playing back an output medium on which image data have been recorded in the filing system shown in FIG. 5. A virtual album is produced by this reproduction apparatus.

The overall operation of the reproduction apparatus is under the supervision of a CPU 50.

The apparatus includes an EPROM 51 storing a playback program and a RAM for temporarily storing image data and other data as well. The CPU 50, EPROM 51 and RAM 52 are connected to an external bus controller 53 by a CPU bus. The reproduction apparatus further includes a floppy disk drive 54 for reading data that has been recorded on a floppy disk and for recording data on a floppy disk, a floppy disk controller 55 for controlling the floppy disk drive 54, a mouse 56 serving as an input unit, an interface 57 for connecting the mouse 56 to the reproduction apparatus, an optical disk device 58 for reading data that has been recorded on an optical disk and magneto-optical disk (output medium) filed in the filing system and for recording data on the optical disk and magneto-optical disk, a hard disk drive 59 for reading initially set data (data indicating how many images should be displayed on a single mount, etc.) that has been recorded on a hard disk and for recording data on the hard disk, and an SCSI 60. The reproduction apparatus further includes a display unit 61 for displaying a created album, messages and the like, a display driver 62 for driving the display unit 61, a microphone 63 serving as a voice input unit, an analog/digital and digital/analog converter circuit 64, a speaker 65 serving as a voice output unit, a mixer 66 and an MIDI (musical instrument digital interface) 67. The display unit 61, microphone 63 and speaker 65 may be attached to and detached from the reproduction apparatus. The floppy disk controller 55, interface 57, SCSI. 60, display driver 62 and analog/digital and digital/analog converter circuit 64 are connected to the external bus controller 53 by an external bus.

The reproduction apparatus shown in FIG. 42 plays back an output medium that has been subjected to filing processing in the filing system of FIG. 5 (This output medium that has undergone filing processing will be referred to as a "user's recording medium" below.).

(9) Reproduction Processing

Figure 43:
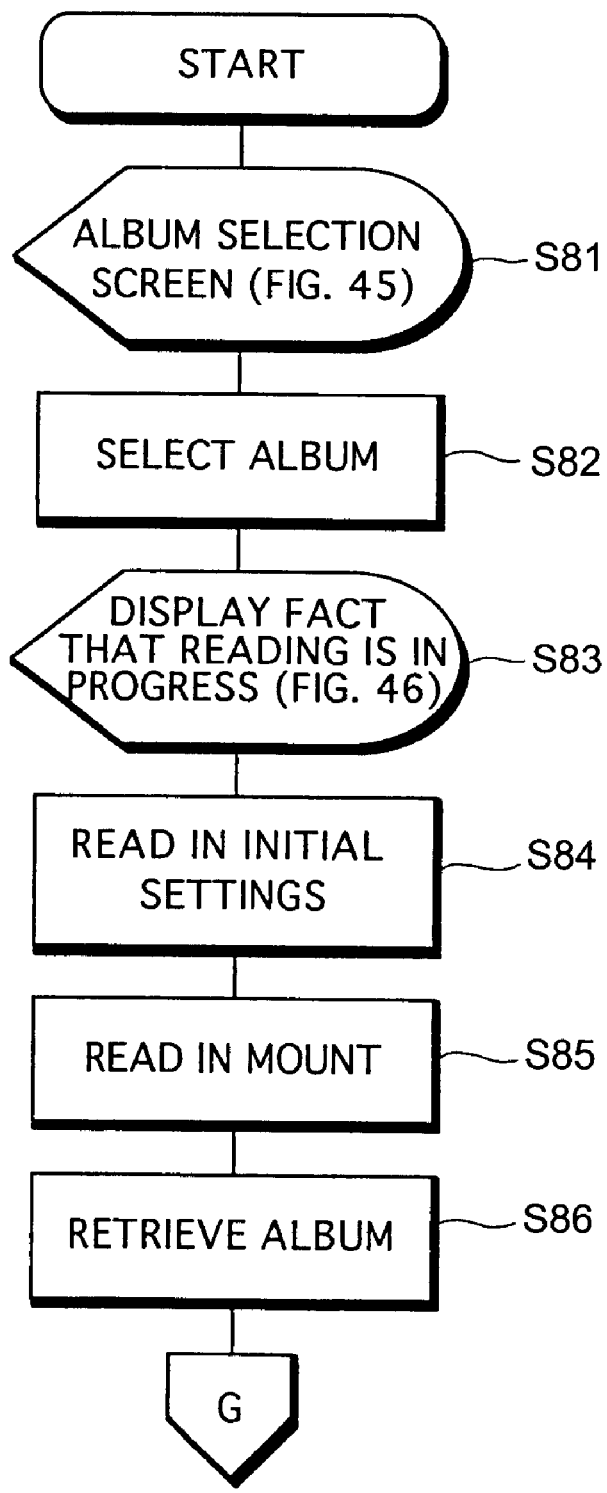
FIG. 43 is a flowchart illustrating the processing procedure of reproduction processing.
Figure 44:
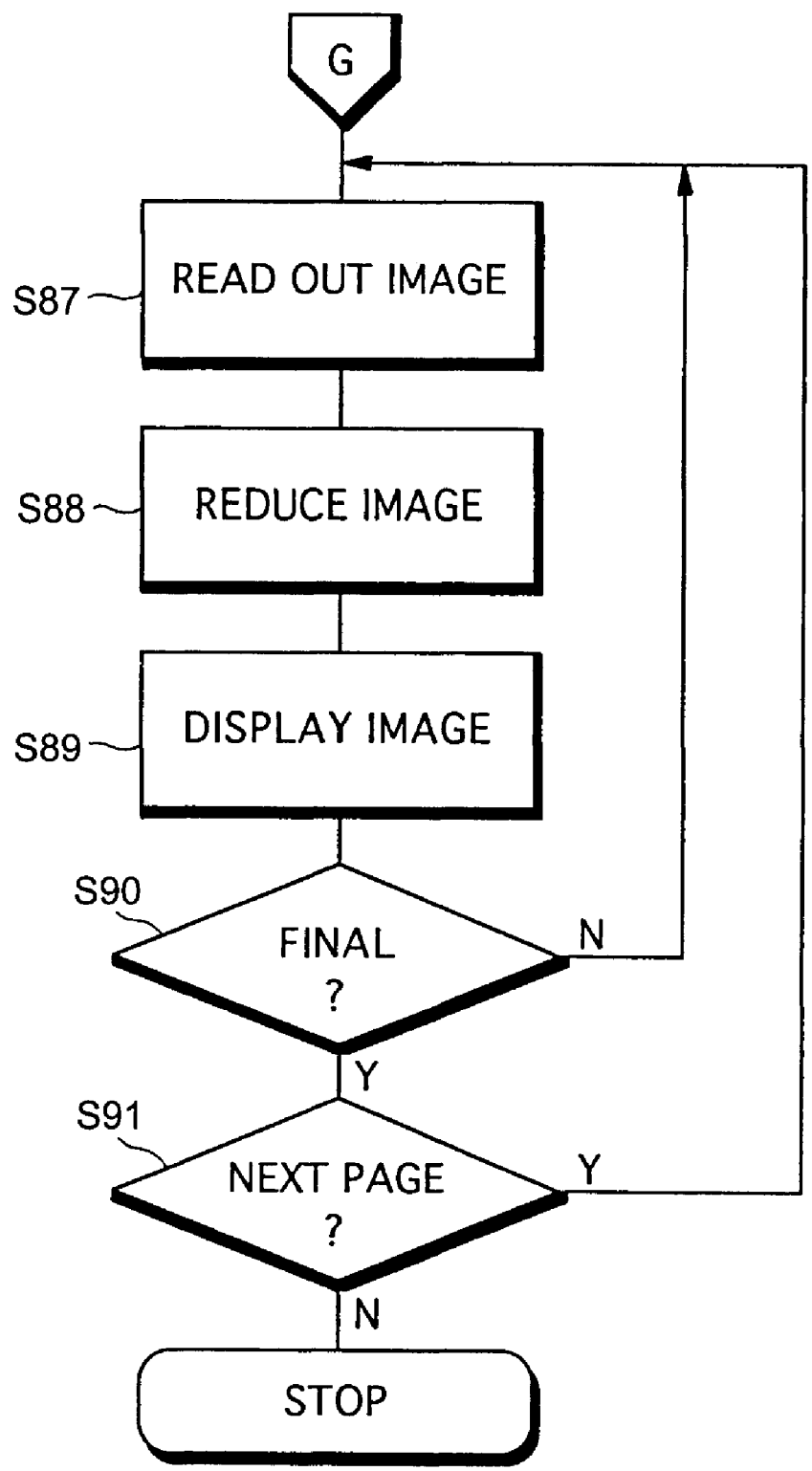
FIG. 44 is a flowchart illustrating the processing procedure of reproduction processing.

FIGS. 43 and 44 are flowcharts illustrating the processing procedure of the reproduction apparatus shown in FIG. 42. Further, FIGS. 45 through 56 illustrate display screens displayed on the display unit of the reproduction apparatus during playback processing.

When a floppy disk having a small storage capacity has been used as the input medium in the filing system of FIG. 5, the mount image data, ornamental image data and BGM data are not recorded on the floppy disk. This means that an album will not be created even if the floppy disk is loaded in the reproduction apparatus shown in FIG. 42 (In a situation where the floppy disk has been loaded in the reproduction apparatus of FIG. 42, images represented by image data selected by the user from image data that have been recorded on the floppy disk would be displayed on the display unit 61.). Accordingly, in a case where a virtual album is to be created in the reproduction apparatus shown in FIG. 42, an optical disk or magneto-optical disk that has undergone filing processing by the system shown in FIG. 5 is loaded in the optical disk device 58 as the user's recording medium.

Figure 45:
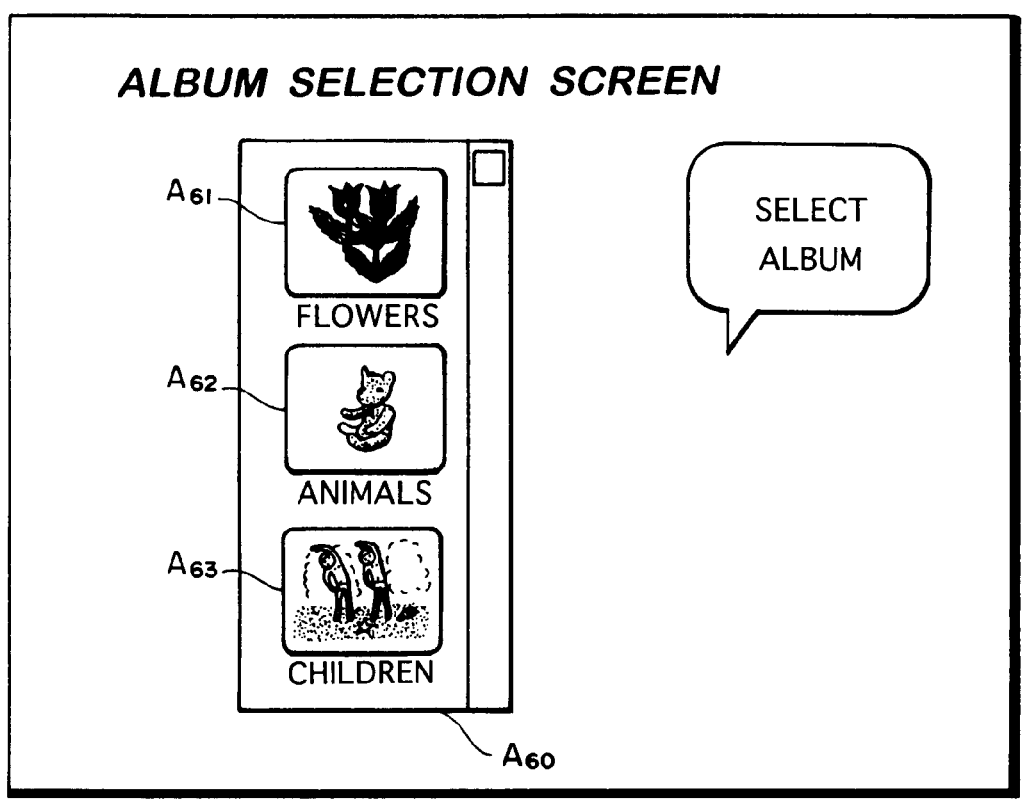
FIG. 45 illustrates an example of a screen displayed on a display unit of the reproduction apparatus.

If an optical disk or magneto-optical disk have been loaded in the optical disk device 58, an album selection screen shown in FIG. 45 is displayed on the display unit 61 (step 81). A variety of virtual albums capable of being created using the user's recording medium are displayed in the form of the selection screen on the display unit 61 (step 81).

The album selection screen can be produced by reading image data representing the first frames of images having different title codes from among the standard image data that have been recorded on the user's recording medium. Of course, by referring to the directory "RES" in which the path to the component data has been stored, it is possible to determine the type of title code in correspondence with which the component data have been recorded on the user's recording medium, as well as the particular title code to which the component data corresponds. The album selection screen shown in FIG. 45 may therefore be created by referring to the title codes and component data.

An area $A_{60}$ is displayed on the album selection screen and three subdivisions $A_{61}$, $A_{62}$ and $A_{63}$ are displayed in the area $A_{60}$. The number of these subdivisions corresponds to the number of items of data that correspond to title codes that have been stored on the optical disk or the like loaded in the optical disk device 58 as the user's recording medium. In the example of FIG. 45, data (a photograph of flowers, a photograph of animals and a photograph of children) corresponding to three types of title codes have been recorded on the user's recording medium. The subdivision $A_{61}$ indicates that an album of photographs of flowers can be created, the subdivision $A_{62}$ that an album of photographs of animals can be created, and the subdivision $A_{63}$ that an album of photographs of children can be created.

Figure 46:
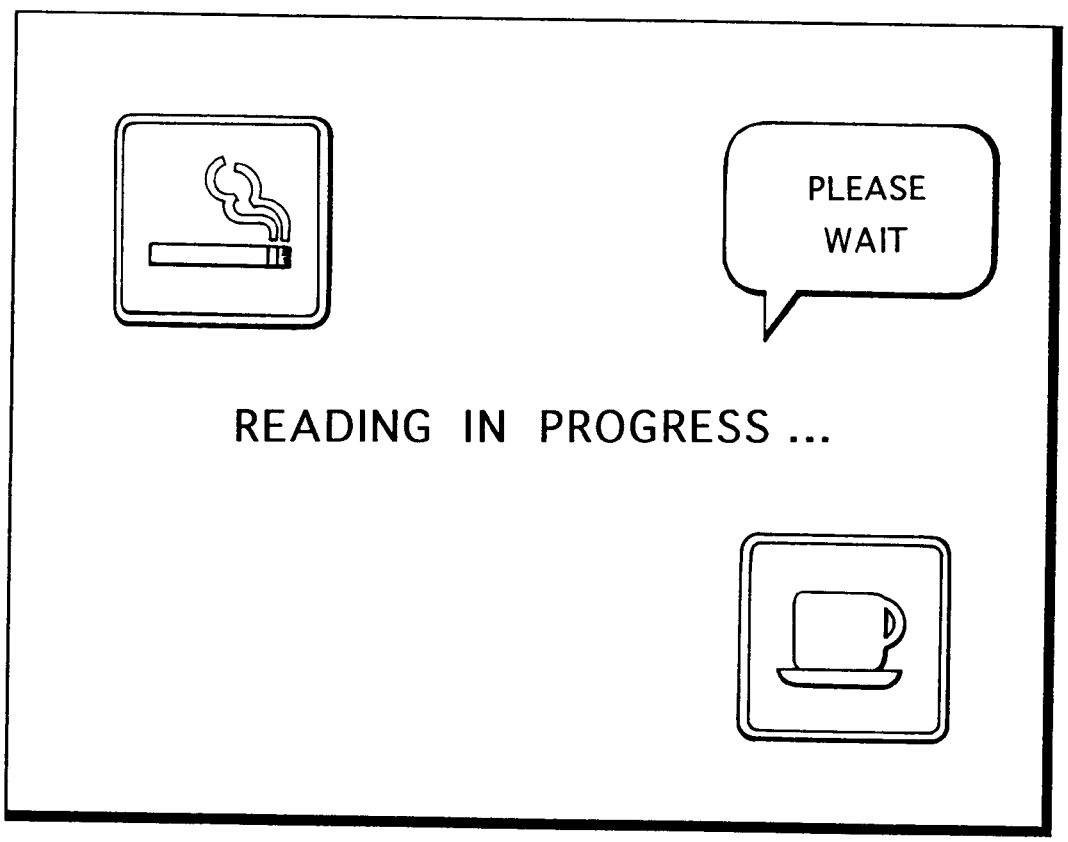
FIG. 46 illustrates an example of a screen displayed on the display unit of the reproduction apparatus.

If the user touches any one of the subdivisions $A_{61}$, $A_{62}$ and $A_{63}$, the display screen on the display unit 61 changes to a screen that notifies the user of the fact that the initially set data as well as the mount image data, ornamental image data and BGM data are currently being read in, as shown in FIG. 46 (steps 82, 83). An animation may be displayed at this time if desired.

If an album to be created is selected, an initial setting is performed, which includes setting the number of frames of images to be displayed on one page of the virtual album. The initial setting data necessary for making an initial setting have already been stored on the hard disk of the reproduction apparatus; the initial setting data are read out of the hard disk (step 84). An arrangement may be adopted in which, rather than storing the data in the hard disk, the user is allowed to enter the data for the setting of the number of image frames to be stored on one page of the virtual album. Further, the number can also be changed in a manner described below.

Next, mount image data, ornamental image and voice data specified by title information corresponding to the selected virtual album are read out of the user's recording medium (step 85). All image data having the title information corresponding to the selected album are retrieved and stored temporarily in the RAM 52 (step 86). Image data representing the first frame of the images in the retrieved image data are read out of the RAM 52 (step 87). The image data that have been read out are applied to the CPU 50, where these image data are subjected to processing for size reduction (step 88). As a result, thumbnail image data representing a thumbnail image are obtained. Since thumbnail image data have been recorded on the optical disk loaded in the optical disk device 58, it is of course permissible to read this thumbnail image data out of the optical disk.

Figure 47:
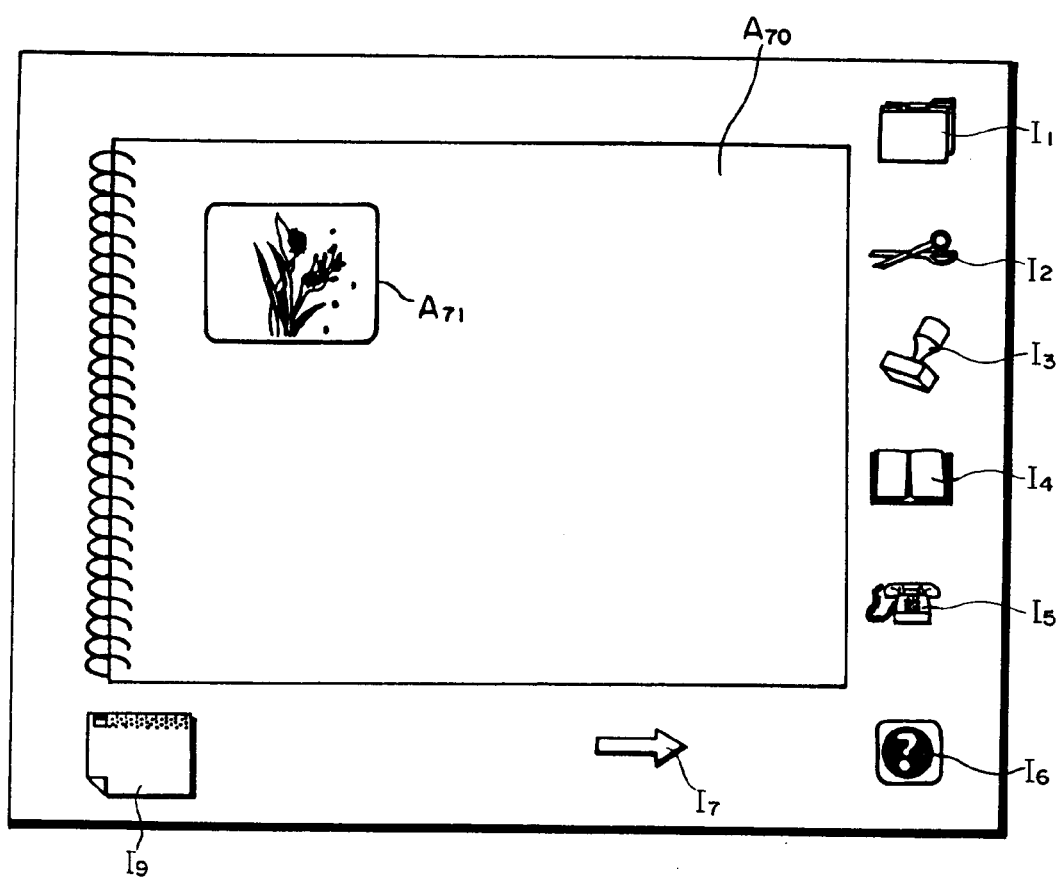
FIG. 47 illustrates an example of a screen displayed on the display unit of the reproduction apparatus.
Figure 48:
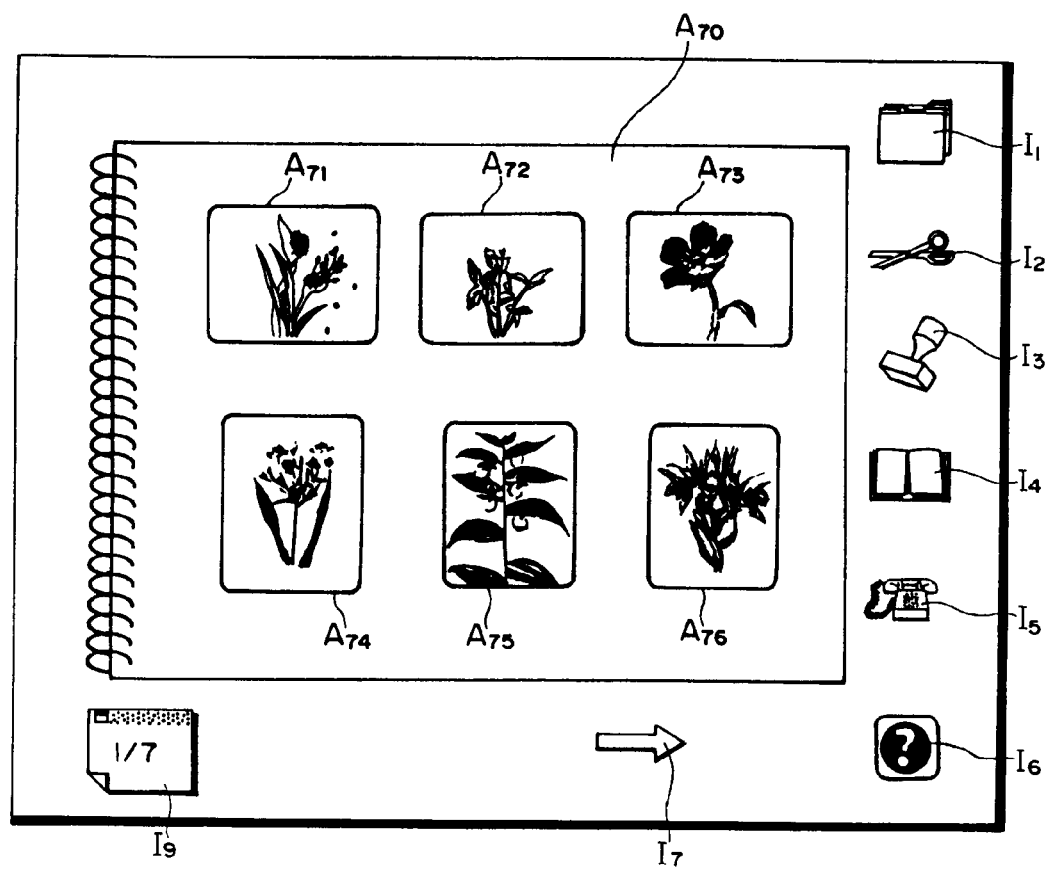
FIG. 48 illustrates an example of a screen displayed on the display unit of the reproduction apparatus.

When thumbnail image data are obtained, the thumbnail image represented by the thumbnail image data is pasted on a mount $A_{70}$ represented by the mount image data, as shown in FIG. 47 (step 89). The processing of steps 87 to 89 is repeated until the images of the number of frames set by the initial setting are pasted on the mount $A_{70}$ (step 90). For example, if six images are to be pasted on the single mount $A_{70}$ in accordance with the initial setting, a screen of the kind shown in FIG. 48 is displayed on the display screen of the display unit 61 (this screen represents a virtual album obtained when ornamental image data have not been recorded on the user's recording medium).

Various icons are also displayed on the display screen of the display unit 61, as shown in FIG. 47. An icon $I_1$ is clicked using the mouse 56 when the album currently being displayed on the display unit 61 is to be changed another album of a different kind. An icon $I_2$ is clicked when part of an image displayed on the display unit 61 is to be extracted, an icon $I_3$ when a mount, ornamental image and BGM of the album is to be changed, an icon $I_4$ when the number of images displayed on the mount $A_{70}$ is to be changed, an icon $I_5$ if a connection is to be made to the Internet, an icon $I_6$ when instructions on handling the reproduction apparatus are required, and an icon $I_7$ when the page is to be turned over to the next page. An icon $I_8$ (see FIG. 49) is clicked to return to the preceding page. An icon $I_9$ displays the total number of pages in the album as well as the page of the album currently being displayed.

Windows conforming to the icons $I_1$~$I_6$ appear by clicking the respective icons $I_1$~$I_6$, thus making it possible to execute the corresponding processing. For example, if the icon $I_7$ is clicked in a case where the display screen of the display unit 61 is as shown in FIG. 48 (step 91), the screen of next page of the album appears and the display screen of the display unit 61 takes on the appearance shown in FIG. 49. If the icon $I_8$ is clicked at this time, the screen of the display unit 61 returns to the state shown in FIG. 48.

Figure 49:
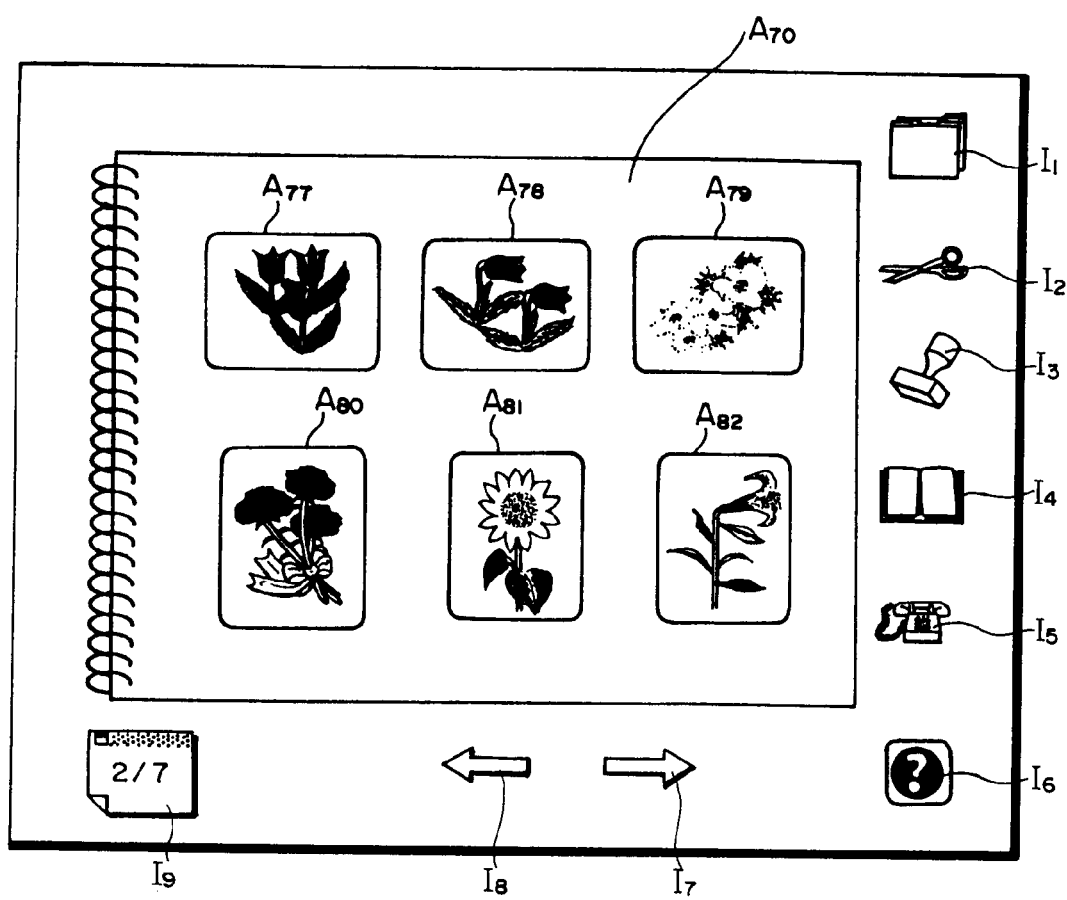
FIG. 49 illustrates an example of a screen displayed on the display unit of the reproduction apparatus.
Figure 52:
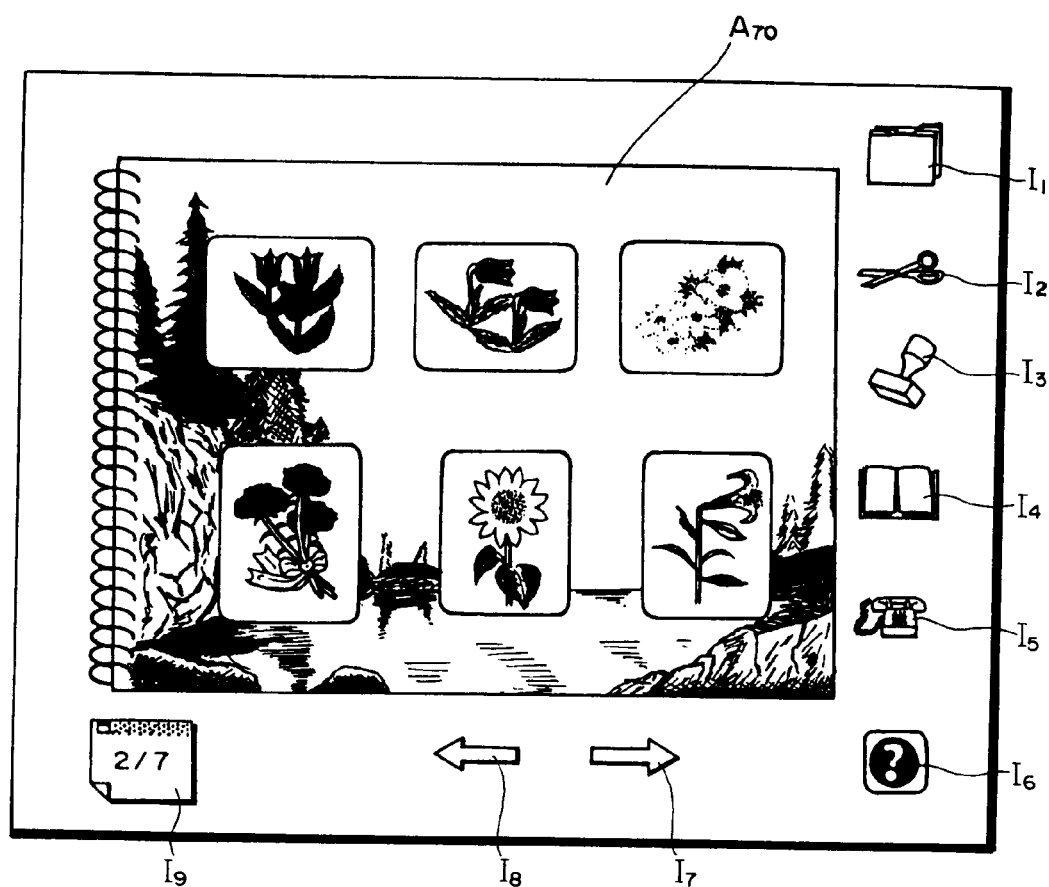
FIG. 52 illustrates an example of a screen displayed on the display unit of the reproduction apparatus.
Figure 53:
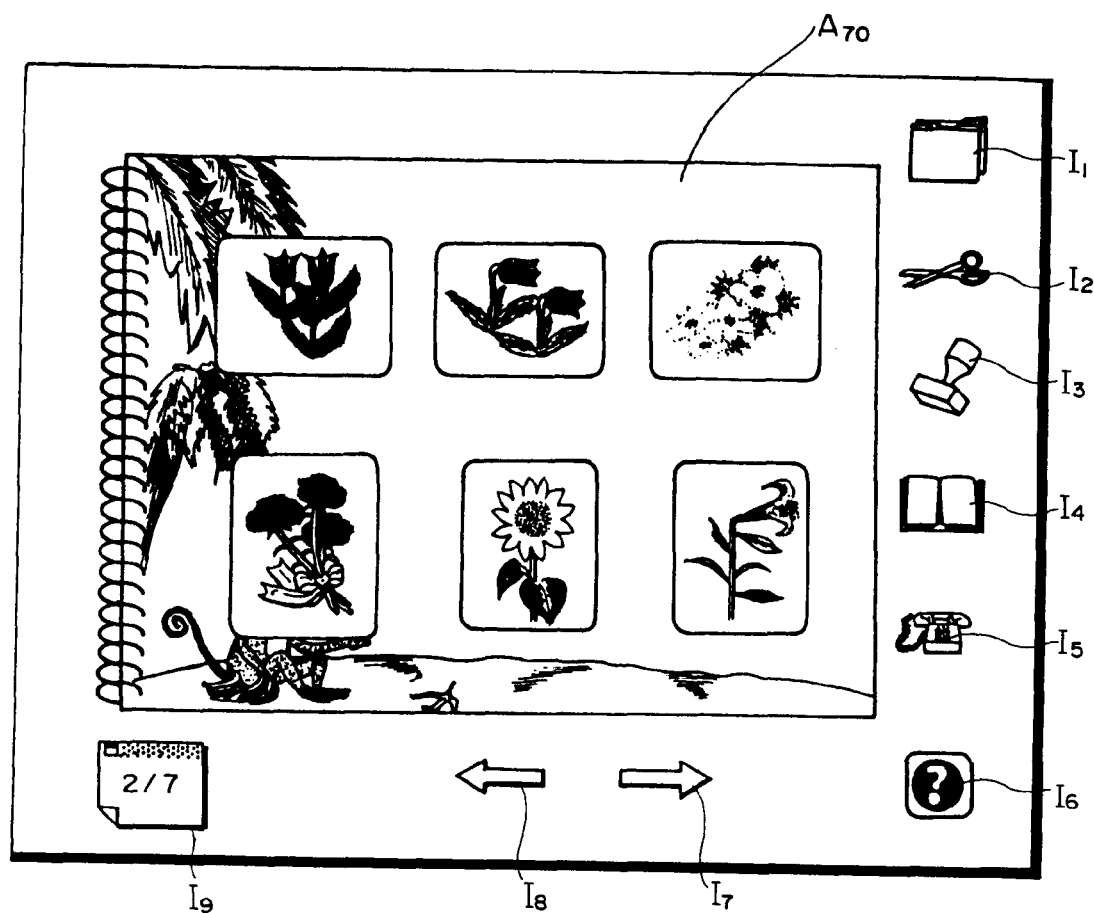
FIG. 53 illustrates an example of a screen displayed on the display unit of the reproduction apparatus.

By clicking the icon $I_3$, the screen appears for changing or adding on the image of a mount, an ornamental image and BGM, as shown in FIG. 50. The screen includes an area $A_{91}$ clicked when the mount is to be changed, an area $A_{92}$ clicked when the ornamental image is to be changed and an area $A_{93}$ clicked when BGM is to be changed. By clicking the area $A_{91}$, $A_{92}$ or $A_{93}$, the screen in which a plurality of types of mounts are displayed, the screen in which a plurality of types of ornamental images are displayed or the screen in which a plurality of BGM names are displayed appear. By clicking the desired mount, for example, from among the mounts displayed in one of the screen, the mount is changed (by way of example, the screen in which mounts of a plurality of types are displayed is illustrated in FIG. 51). Display screens on which the mounts have been changed from that on the display screen of FIG. 49 are shown in FIGS. 52 and 53.

Figure 54:
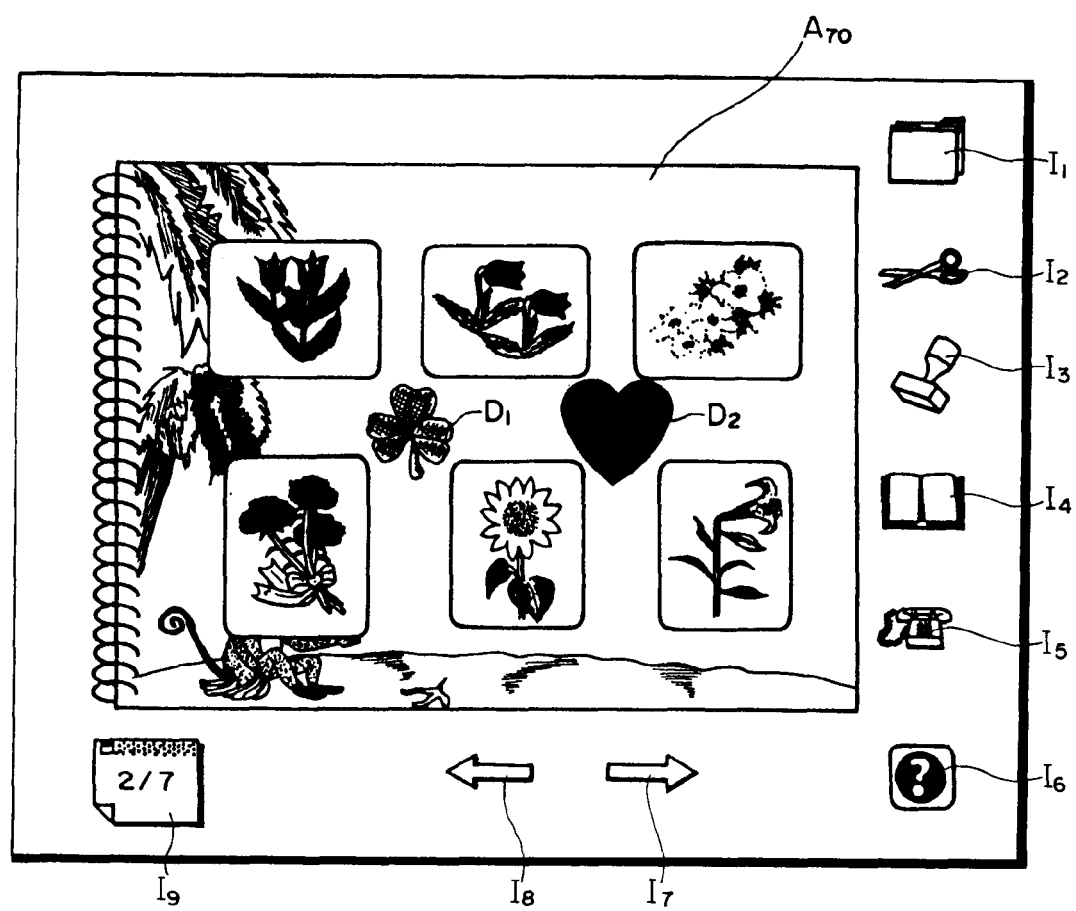
FIG. 54 illustrates an example of a screen displayed on the display unit of the reproduction apparatus.

Furthermore, ornamental images $D_1$ and $D_2$ may be displayed upon being added to the album, as shown in FIG. 54. If the ornamental images $D_1$ and $D_2$ are to be displayed on the album (if ornamental image data have not been recorded on the user's recording medium), the icon $I_3$ is clicked to display the screen shown in FIG. 50 and then the area $A_{92}$ is clicked. As a result, a plurality of ornamental images are displayed on the display unit 61. By clicking the desired ornamental image contained among the ornamental images displayed, this ornamental image is selected and the ornamental image is displayed on the album, as shown in FIG. 54. Of course, if ornamental image data have been stored on the user's recording medium, then the ornamental image represented thereby will also be displayed from the moment the album is displayed. The positions at which the ornamental images $D_1$ and $D_2$ are displayed can be moved by dragging the images.

When a mount image, ornamental image or BGM is to be changed or added on in a virtual album, this is possible within the limits of the data that have been stored on the user's recording medium (of course, if another user's recording medium is used, then it will be possible to change or add on a mount image, ornamental image or BGM within the limits of the data that have been stored on this user's recording medium). It goes without saying that when a mount image, ornamental image or BGM is changed or added on, data corresponding to the mount image, ornamental image or BGM changed or added on area read from the user's recording medium.

In a case where a mount image, ornamental image or BGM is changed or added on, the data representing these data and the display position data are recorded on the user's recording medium or on a recording medium (e.g., a floppy disk) other than the user's recording medium. As a result, a virtual album in which mount images, ornamental images and BGM have been changed or added on can be printed again at a later time. Further, by taking these media to a processing laboratory, high-quality images can be printed.

Figure 55:
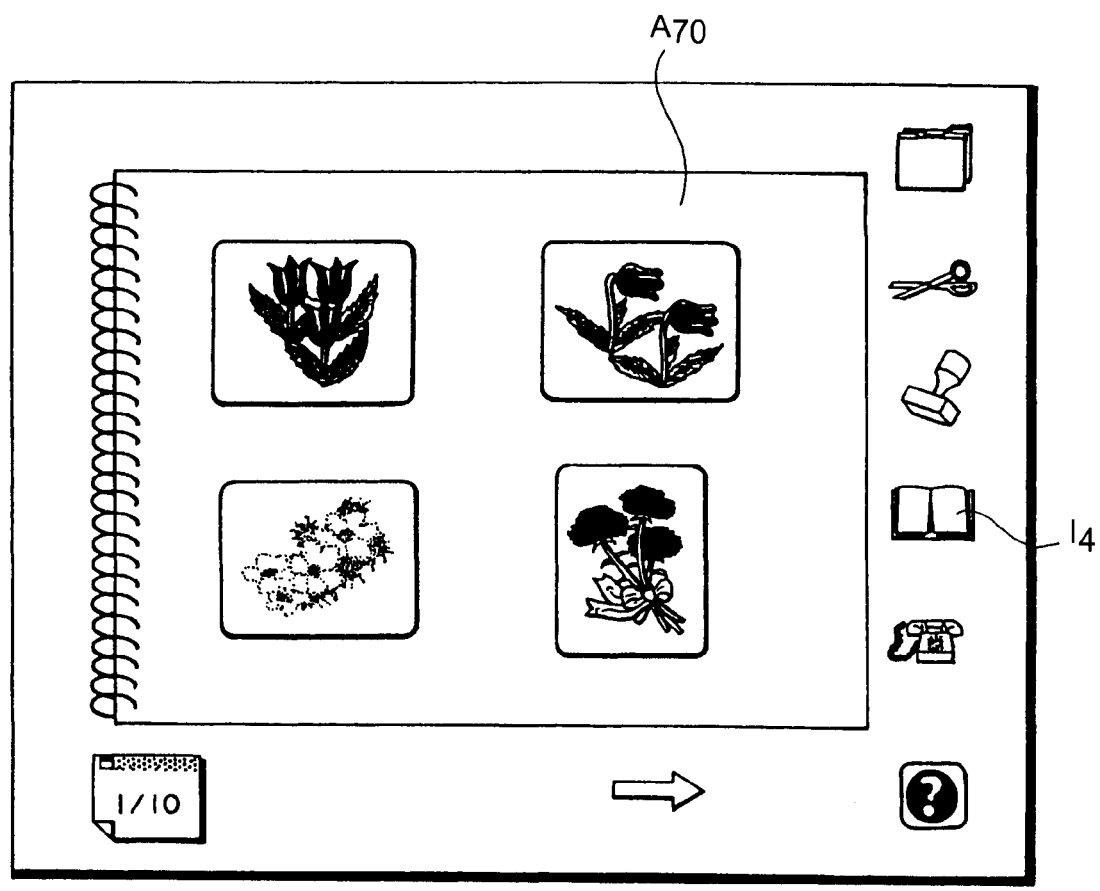
FIG. 55 illustrates an example of a screen displayed on the display unit of the reproduction apparatus.
Figure 56:
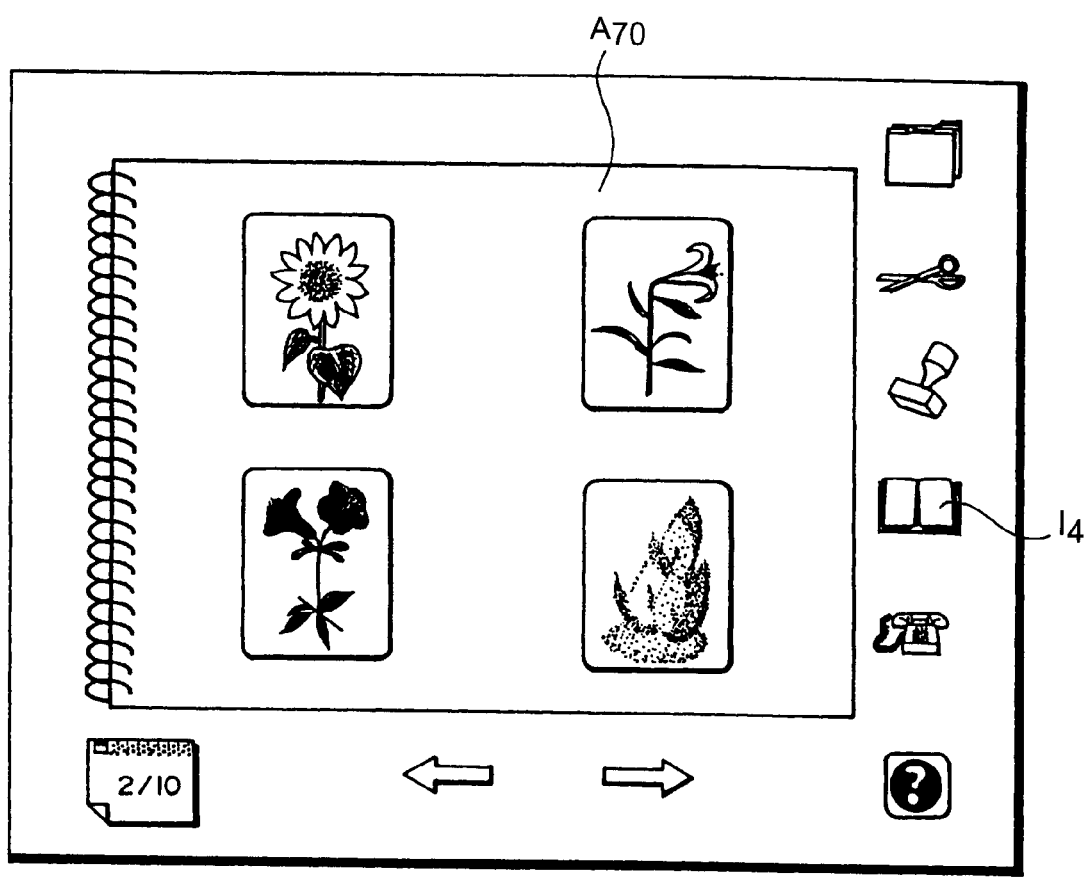
FIG. 56 illustrates an example of a screen displayed on the display unit of the reproduction apparatus.

FIGS. 55 and 56 illustrate examples in which a plurality of images are displayed on the single mount $A_{70}$ by clicking the icon $I_4$. Images thus displayed on the mount $A_{70}$ can be changed to a number desired by the user.

A printer may be connected to the reproduction apparatus and a virtual album displayed on the display unit may be printed.

Further, in the above-described reproduction apparatus, an item of software for pasting images represented by image data, mount image data, ornamental image and voice data on a mount and an item of software for pasting an ornamental image that ornaments an image represented by image data have been stored on the same user's recording medium. However, these items of software may be stored on separate media. In such case the individual media would be set in the reproduction apparatus and the data that have been stored on each storage medium would be written in the reproduction apparatus to create an album.

B. Embodiment of Printing of Combined Images

The processing described below is executed in this embodiment.

First, the user carries a desired photograph or the like to a store in which a photo processing laboratory system, described below, has been installed. The image representing the photograph brought by the user is converted to digital image data and recorded on a magneto-optical disk by the laboratory system. The medium on which the digital image data have been recorded is taken home by the user. Here, using his or her own filing system (a personal computer or the like), the user adds indicia (characters, pictures, etc.) to the image represented by the digital image data. The medium on which the added indicia and the data representing the image have been recorded is taken to the processing laboratory again, where the image having the added indicia is printed.

The details of the foregoing will become clear from the description that follows.

(1) Laboratory System

① Configuration of Laboratory System

Figure 57:
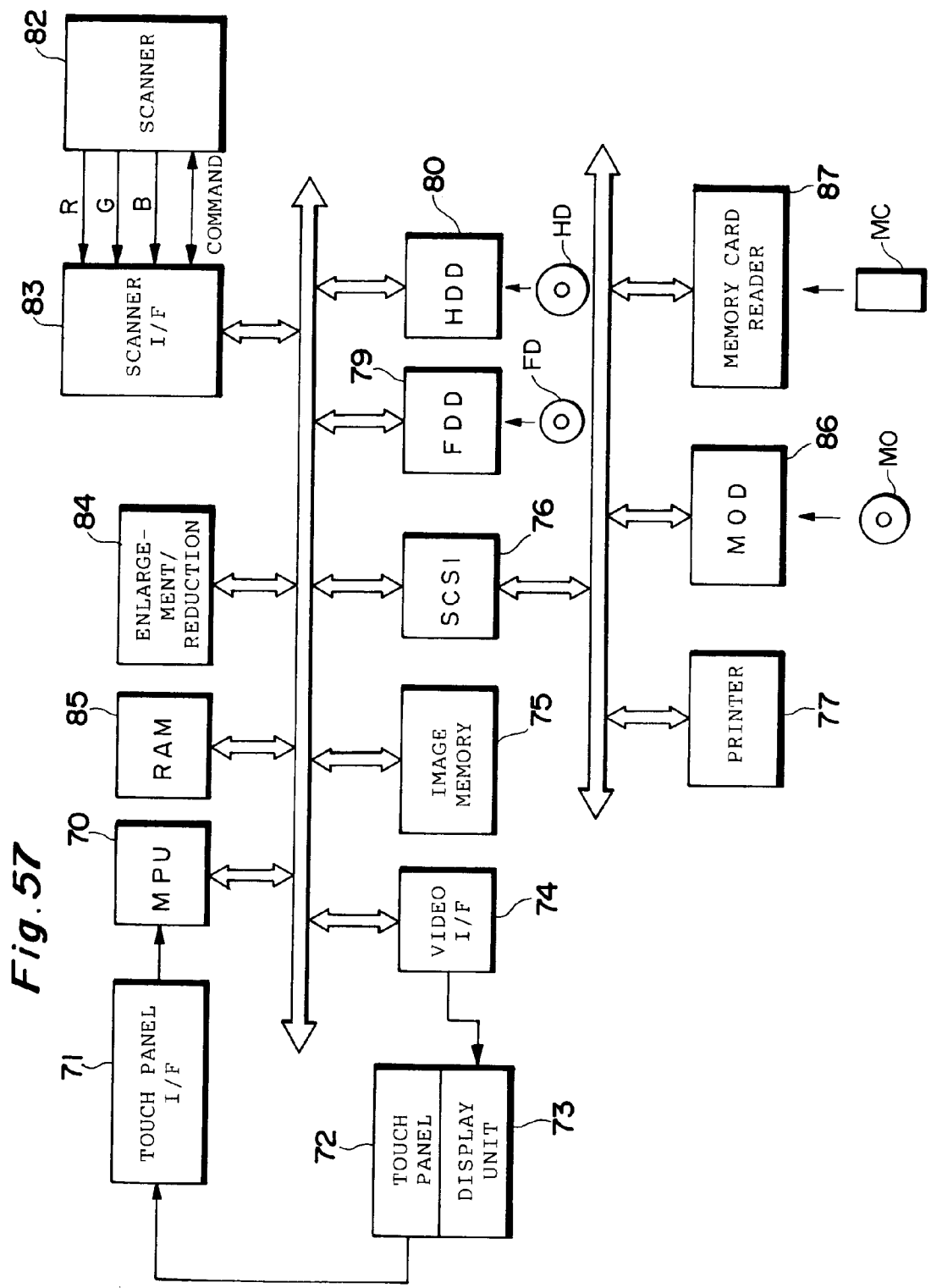
FIG. 57 is a block diagram illustrating the electrical configuration of a photo processing laboratory system.

FIG. 57 illustrates the electrical configuration of a photo processing laboratory.

As in the manner of the filing system described above, the laboratory system is installed at various locations, such as a film developing establishment (store), photography shop, department store, convenience store and other types of stores and shops. In general the laboratory system also is operated by the customer (user). At locations such as a film developing store where an operator is always present, the laboratory system may be operated in its entirety by the operator.

The input medium handled by this laboratory system is a visible image medium on which images are represented in visible form. The output medium handled by the laboratory system is a digital medium.

This laboratory system executes digital medium recording processing in which an image that has been recorded on the visible image medium brought by the user is recorded on the digital medium and printing processing for printing an image represented by image data that has been recorded on the digital medium.

The overall operation of the laboratory system is supervised by an MPU 70.

The laboratory system includes a display unit 73 for displaying images and other information, an interface (video interface) 74 of the display unit 73, a touch panel 72 placed on the display screen of the display unit 73 for accepting commands from the user, a touch panel interface 71, an image memory 75 for temporarily storing image data, an SCSI 76, a printer 77, a floppy disk drive 79 for driving a magnetic disk, a hard disk drive 80 for driving a hard disk, a magneto-optical disk drive 86 for driving a magneto-optical disk, and a memory card reader 87. The laboratory system further includes a scanner (inclusive of a flat-bed scanner) 82 for reading an image represented on a visible image medium, a scanner interface 83, an enlargement/reduction circuit 84 for enlarging and reducing the size of an image represented by image data, and a RAM 85 for temporarily storing data.

The user performs an operation to execute digital medium recording processing in accordance with the display presented on the display unit 73. Specifically, the touch panel 72 has been formed on the display screen of the display unit 73 and is connected to the MPU 70 via the interface 71. Guidance (comprising illustrations and text) for assisting operation and one or a plurality of areas to be touched are displayed on the display screen of the display unit 73. A keypad function (inclusive of a numerical value) is displayed in each area. This makes it possible to implement function keypad and numeric keypad. An input signal representing the position of the area touched by the finger of the operator or user is applied to the MPU 70. By utilizing the touch panel, the operator designates the input medium, designates a frame to be recorded on the output medium or printed, etc.

The scanner 82 reads images represented on the visible image medium and outputs image data representing the images. The scanner 82 is connected to the MPU 70 via the scanner interface 83. If the scanner 82 is a scanner for photographic film, the scanner 82 would include a light source, an image sensing optical system, a line sensor (or two-dimensional image sensing device), a mechanism for transporting the film or line sensor, a signal processing circuit and an A/D converter circuit, etc. In case of a flat-bed scanner, the scanner is equipped with a flat bed. A reflective original is placed upon the flat bed. Light from the light source is projected upon the reflective original and light reflected from the reflective original enters the line sensor or two-dimensional image sensing device. A video signal outputted by the line sensor or image sensing device is subjected to prescribed processing and then outputted as digital image data.

The hard disk drive 80 writes data to a hard disk and reads out data that have been recorded on the hard disk.

The floppy disk drive 79, magneto-optical disk drive 86 or memory card reader 87 writes data inclusive of image data to a floppy disk FD, magneto-optical disk MO or memory card MC, respectively, serving as output media, or reads data from the floppy disk FD, magneto-optical disk MO or memory card MC and rewrites the data.

The printer 77 prints images represented by image data applied thereto.

② File Structure of Digital Medium

Figure 58:
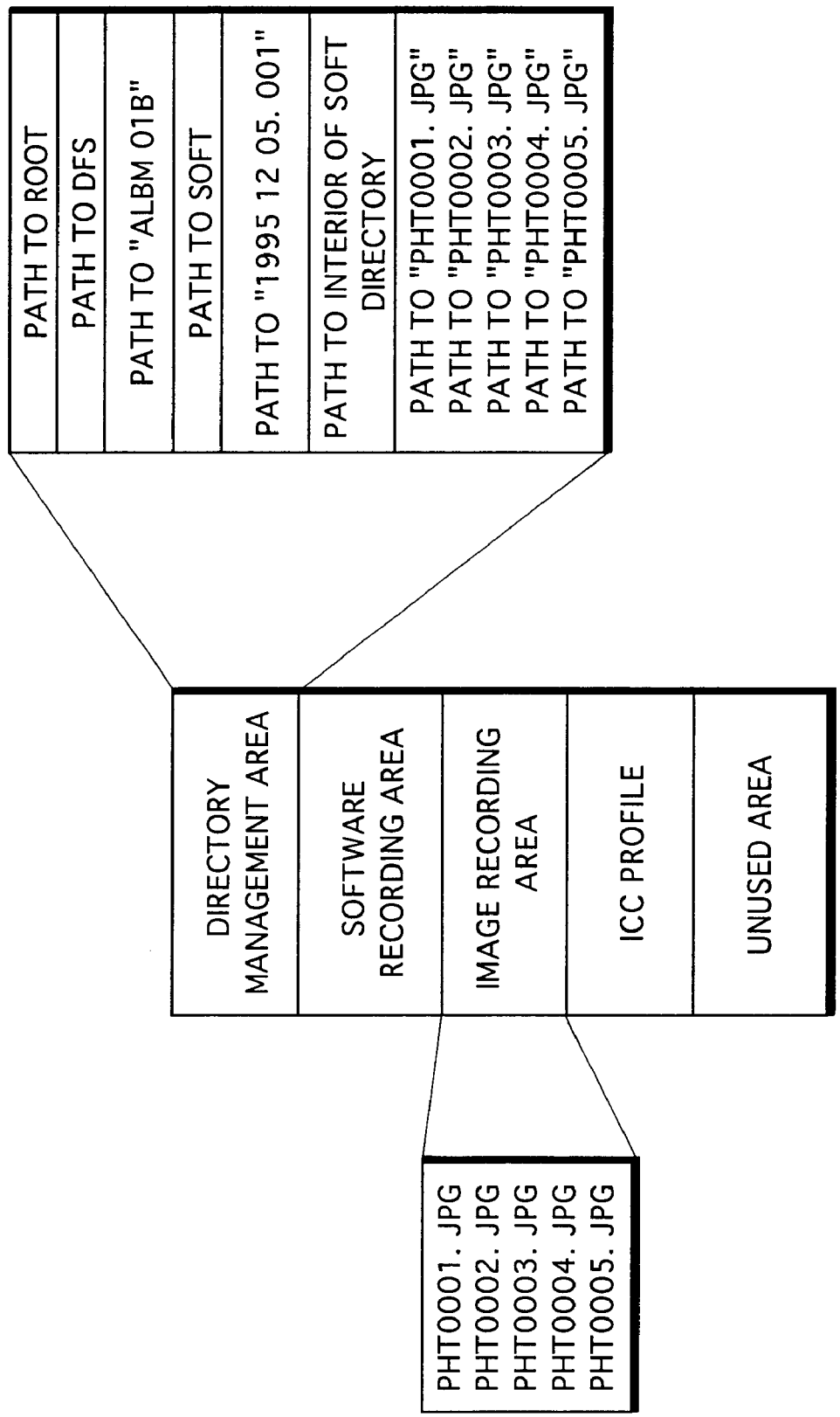
FIG. 58 illustrates the file structure of a digital medium.
Figure 59:
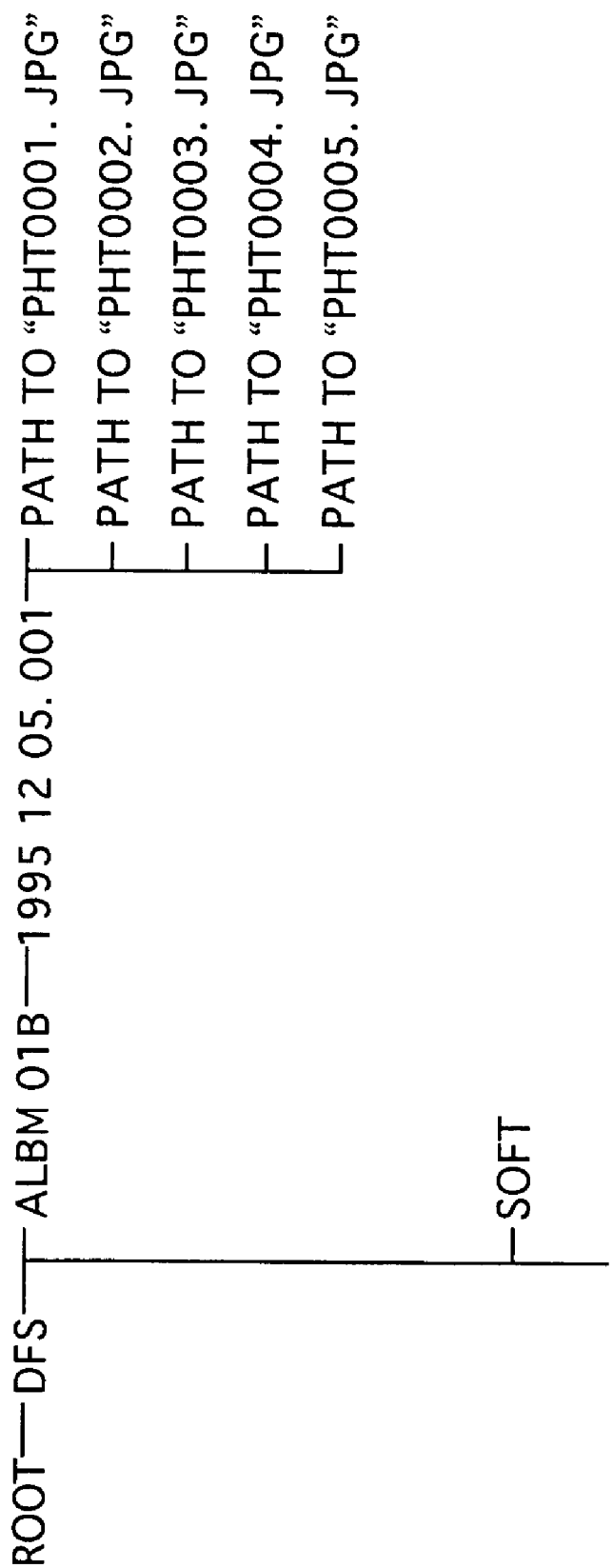
FIG. 59 illustrates the details of a directory management area of the digital medium.

FIGS. 58 and 59 illustrate the file structure (data structure) of a digital medium on which image data have been recorded in the laboratory system. The file structure is illustrated in logical form; what is shown is not the physical structure. The various data shown in FIGS. 58 and 59 may be in a dispersed state rather than in the state of a single, continuous group. In the digital medium shown in FIGS. 58 and 59, a state in which the images of five frames have been recorded in the laboratory system of FIG. 57 is illustrated. In order to record image data on the digital medium, the desired visible image medium is set in the scanner 82 and a conversion to image data is performed. The digital medium is set in the floppy disk drive 79, magneto-optical disk drive 86 or memory card reader 87 and the converted image data are recorded.

The digital medium includes a directory management area for managing all of the data that have been recorded on the digital medium, a software recording area for recording application software, an image recording area for recording image data, an ICC profile and an unused area. In the digital medium illustrated in FIG. 58, five frames of image data assigned the file names "PHT0001.JPG"~"PHT0005.JPG" have been recorded in the image recording area.

Paths to the data as well as other data have been recorded in the directory management area. The details of the directory management area are illustrated in FIG. 59.

As shown in FIG. 59, a root directory "ROOT" in the directory management area has a plurality of sub-directories. One of these plurality of sub-directories is a sub-directory "DFS". The sub-directory "DFS" stores data peculiar to the laboratory system according to this embodiment.

The sub-directory "DFS" includes directories "ALBM01B", "SOFT" as well as other directories. The sub-directory "ALBM01B" stores paths to the image data. In this embodiment, paths to each of the items of data are stored for each day on which image data have been recorded on the digital medium. Accordingly, the directory "ALBM01B" further includes a directory "19951205.001". The directory "19951205.001" stores the paths to the image data having the file names "PHT0001.JPG"~"PHT0005.JPG". A path to the application software stored in the software recording area has been stored in the directory "SOFT".

The image data that have been stored on the digital medium can be read out by storing the paths to the data in the directory management area of the digital medium. For example, when image data having the file name "PHT001.JPG" are to be read out of the digital medium, first the data that have been recorded in the directory management area are read out and stored in the RAM 45. Next, the directory "DFS" is traversed from the root directory "ROOT", the directory "ALBM01B" is traversed from the directory "DFS", the directory "19951205.001" is traversed from the directory "ALBM01B", and the path to the image data of "PHT0001.JPG" is acquired. The image data of "PHT0001.JPG", which have been stored in the image data recording area, can be acquired from the path to the image data of "PHT0001.JPG".

(2) Filing System

① Configuration of Filing System

This filing system is capable of using the components shown in FIG. 5, as mentioned above. Unlike the filing system in the embodiment of the above-described virtual album, this filing system is a personal computer system generally installed in the home of the user and is operated by the user. By using this filing system, indicia are entered into an image represented by image data that have been recorded on a digital medium.

② File Structure of Digital Medium

Figure 60:
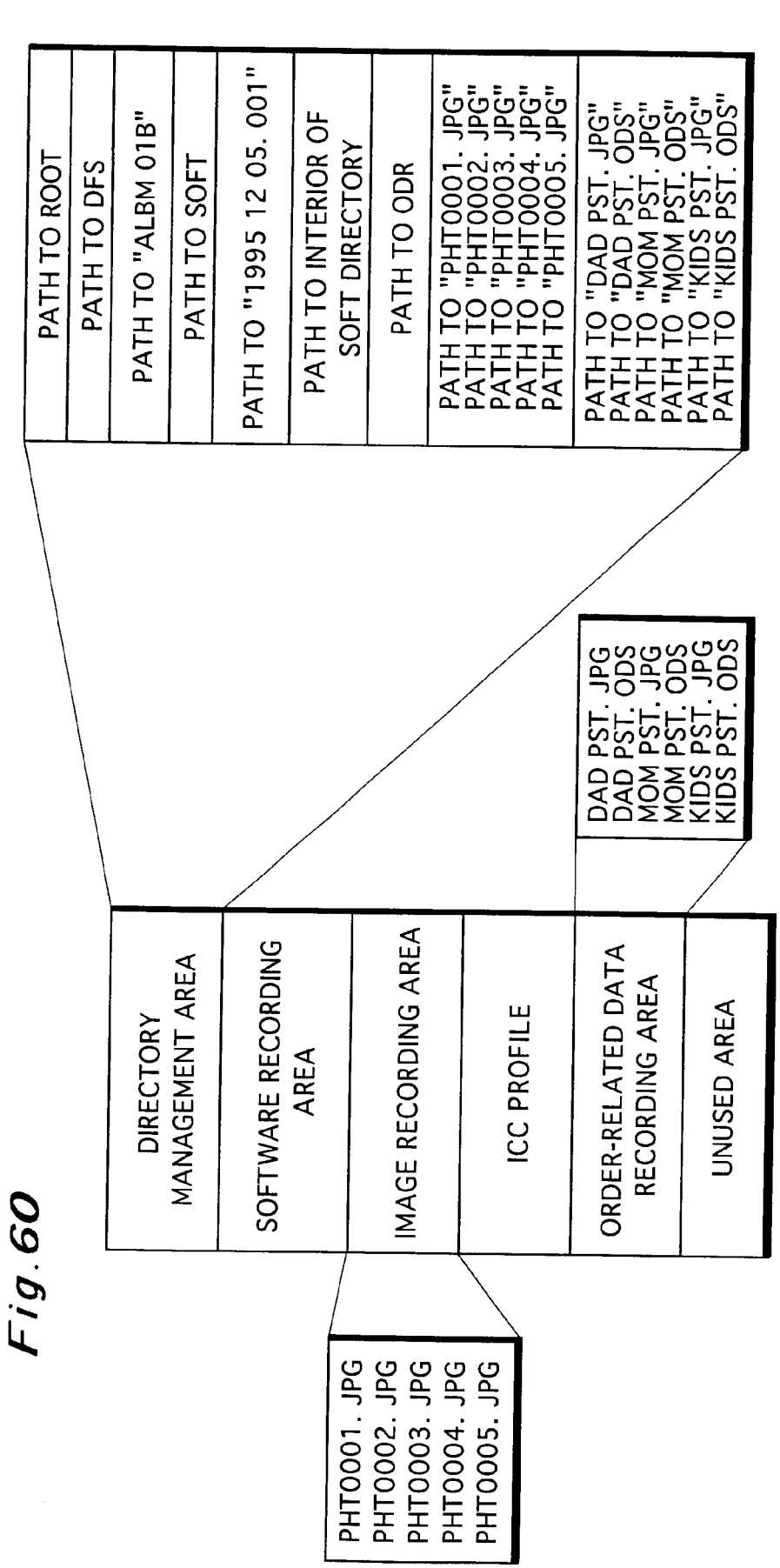
FIG. 60 illustrates the file structure of the digital medium.
Figure 61:
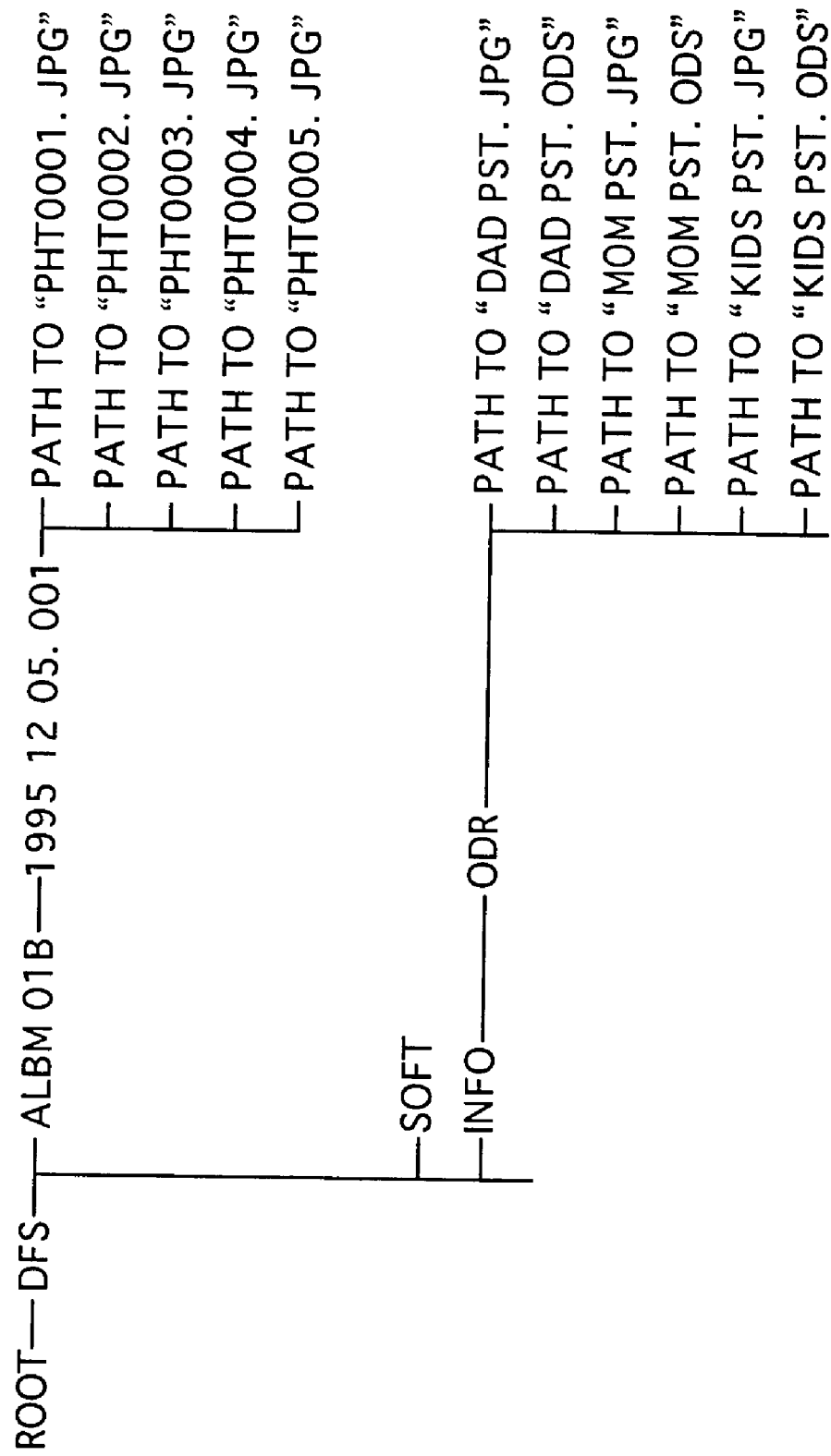
FIG. 61 illustrates the details of the directory management area of the digital medium.

Using the filing system shown in FIG. 5, the user adds on indicia to an image represented by image data that have been recorded in a photo processing laboratory system (image data representing a combined image to which indicia have been added on shall be referred to as "ordered image data" below). Further, information relating to printing of an image to which indicia have been added on is recorded. The file structure of a digital medium on which ordered image data and information relating to printing have been recorded is illustrated in FIGS. 60 and 61. The following description will focus mainly on ordered image data added on by the user and information relating to printing.

As shown in FIG. 60, an area for recording order-related data is recorded anew on the digital medium.

Ordered image data onto which indicia have been added by the user and data representing information related to printing have been recorded in the order-related data recording area. The data that have been recorded in the order-related data recording area contain data possessing an extension "JPG" and data possessing an extension "ODS". The data having the extension "JPG" is ordered image data onto which indicia have been added by the user, and the data having the extension "ODS" is data representing printing information.

FIG. 61 illustrates the details of the directory management area of the digital medium. A directory "INFO" is newly formed in the subdirectory "DFS" of the directory management area, as shown in FIG. 61, and a directory "ODR" is formed in the directory "INFO". A path to the data recorded in the order-related data recording area has been stored in the directory "ODR". By reading this path out of the directory management area, data that have been recorded in the order-related data recording area can be read out of the digital medium. For example, when ordered image data having the file name "DAD PST.JPG" and printing image data having the file name "DAD PST.ODS" are to be read out of the digital medium, first the data that have been stored in the directory management area are read out and these data are stored temporarily in memory. Next, the directory "DFS" is traversed from the root directory "ROOT", the directory "INFO" is traversed from the directory "DFS", the directory "ODR" is traversed from the directory "INFO", and the path to the ordered image data of "DAD PST.JPG" and the path to the printing information data "DAD PST.ODR" are acquired. The ordered image data of "DAD PST.JPG" and the printing information data of "DAD PST.ODR" that have been recorded in the order-related data recording area can be readout from the path to the ordered image data of "DAD PST.JPG".

Processing for recording these ordered image data of "DAD PST.JPG" and printing information data of "DAD PST.ODR" on a digital medium will be described next.

(3) User Processing

Figure 62:
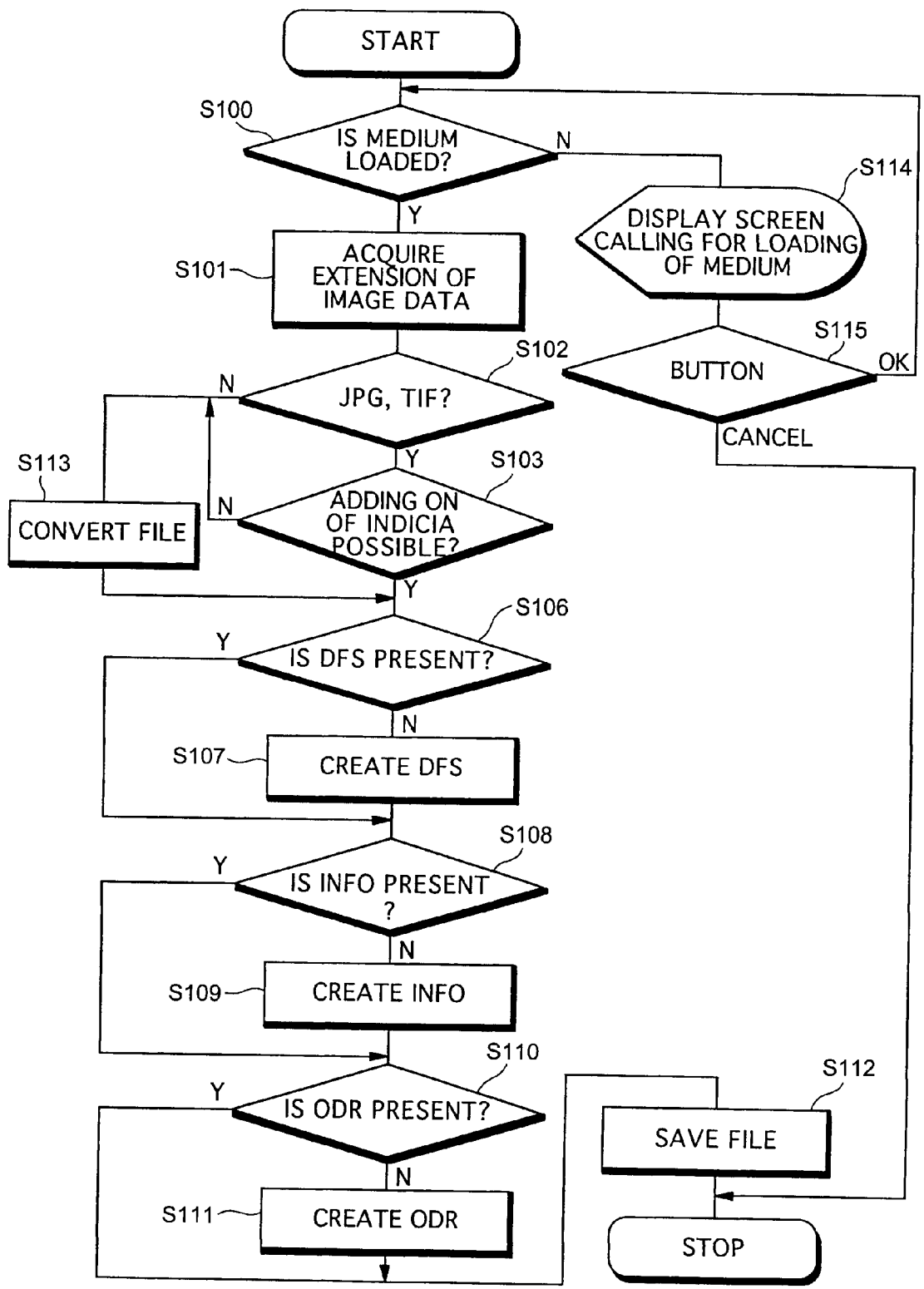
FIG. 62 is a flowchart illustrating the processing procedure of a user's filing system.

FIG. 62 is a flowchart showing a processing procedure in which the user adds indicia image data representing indicia as well as printing information data to a digital medium on which image data have been recorded in a laboratory system. The program for executing this processing has been recorded in the software recording area of the digital medium. The processing is executed by reading the program out of the software recording area.

Figure 63:
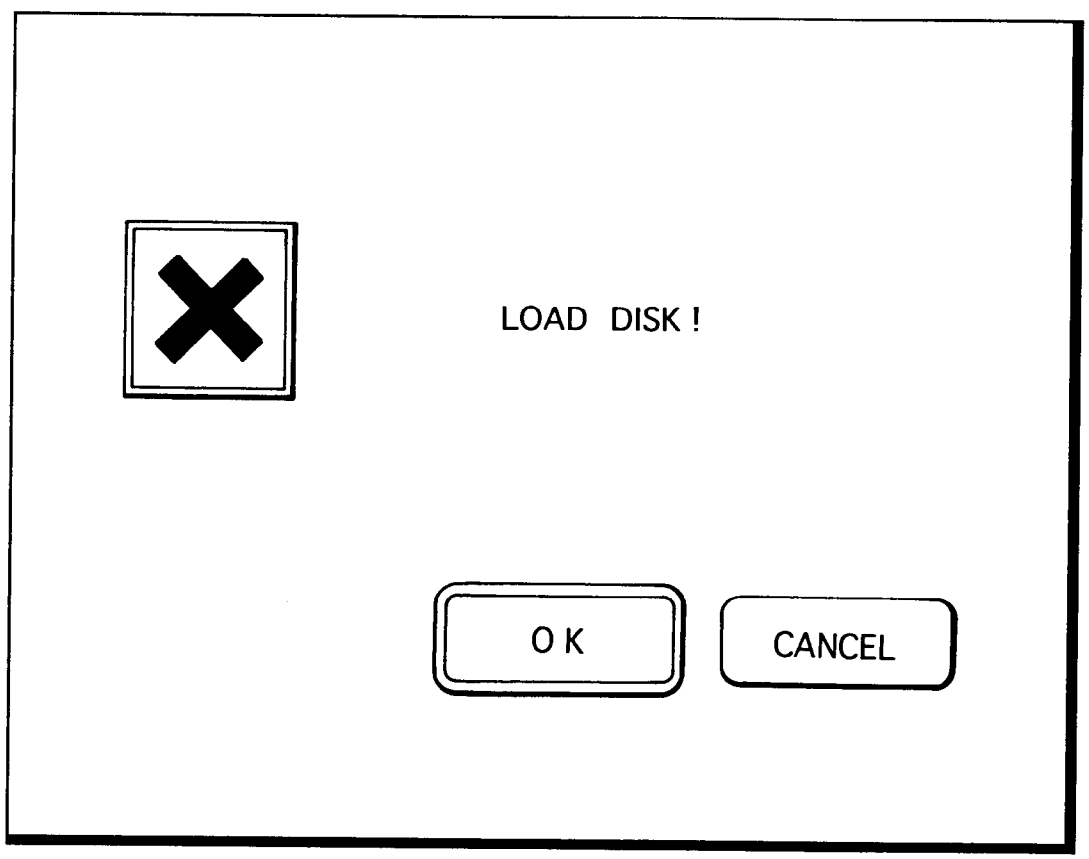
FIG. 63 illustrates an example of a screen displayed on a display unit of the filing system.

The user loads the digital medium into the floppy disk device 45 or optical disk device 46 of the filing system shown in FIG. 5 (step 100). If the digital medium has not been loaded, a screen calling for its loading is displayed on the display unit 35, as shown in FIG. 63 (step 114). If the user touches an area in which "OK" is displayed, the program returns to the processing of step 100. If the user touches an area in which "CANCEL" is displayed, processing ends (step 115).

If the digital medium has been loaded in the filing system, the data that have been recorded in the directory management area of the digital medium are read and stored temporarily in memory. After the data have been stored in memory, an extension regarding image data (these are image data that have been recorded using the laboratory system shown in FIG. 57) representing an image to which indicia are to be added by the user is acquired (step 101). If image data have not been recorded on the digital medium in a predetermined recording format, the adding on of indicia cannot be performed in the user's filing system. Accordingly, it is determined whether the extension is "JPG" or "TIF". The image data undergo file conversion processing unless the extension is "JPG" or "TIF" ("NO" at step 102; step 113).

In a case where the laboratory system and filing system are products manufactured by different companies, there are instances where indicia cannot be added on in the user's filing system. Accordingly, whether or not indicia can be added on in the user's filing system is judged from a header added to the image data (step 103). If it is judged that indicia cannot be added on, then file conversion processing is executed (step 113). The application software for this file conversion processing has been recorded in the software recording area of the digital medium. For example, an extension would be acquired, the type of recording format that was used to record the image data would be determined from the extension, and a file conversion to a predetermined recording format conforming to this recording format would be executed.

First, it is determined whether the directory "DFS" is contained in the data of the directory management area that has been stored in memory (step 106). If the directory "DFS" is not present, then this directory is created (step 107). Next, it is determined whether the directory "INFO" is present (step 108). If the directory "INFO" is not present, then this directory is created (step 109). Further, it is determined whether the directory "ODR" is present (step 110). If the directory "ODR" is not present, then this directory is created (step 111).

Ordered image data, to which indicia or the like have been added, and printing information data are recorded on the digital medium in the directory "ODR" thus created or already exiting (step 112).

Processing for recording ordered image data, to which indicia or the like have been added, and printing information data in the directory "ODR" will now be described.

Figure 64:
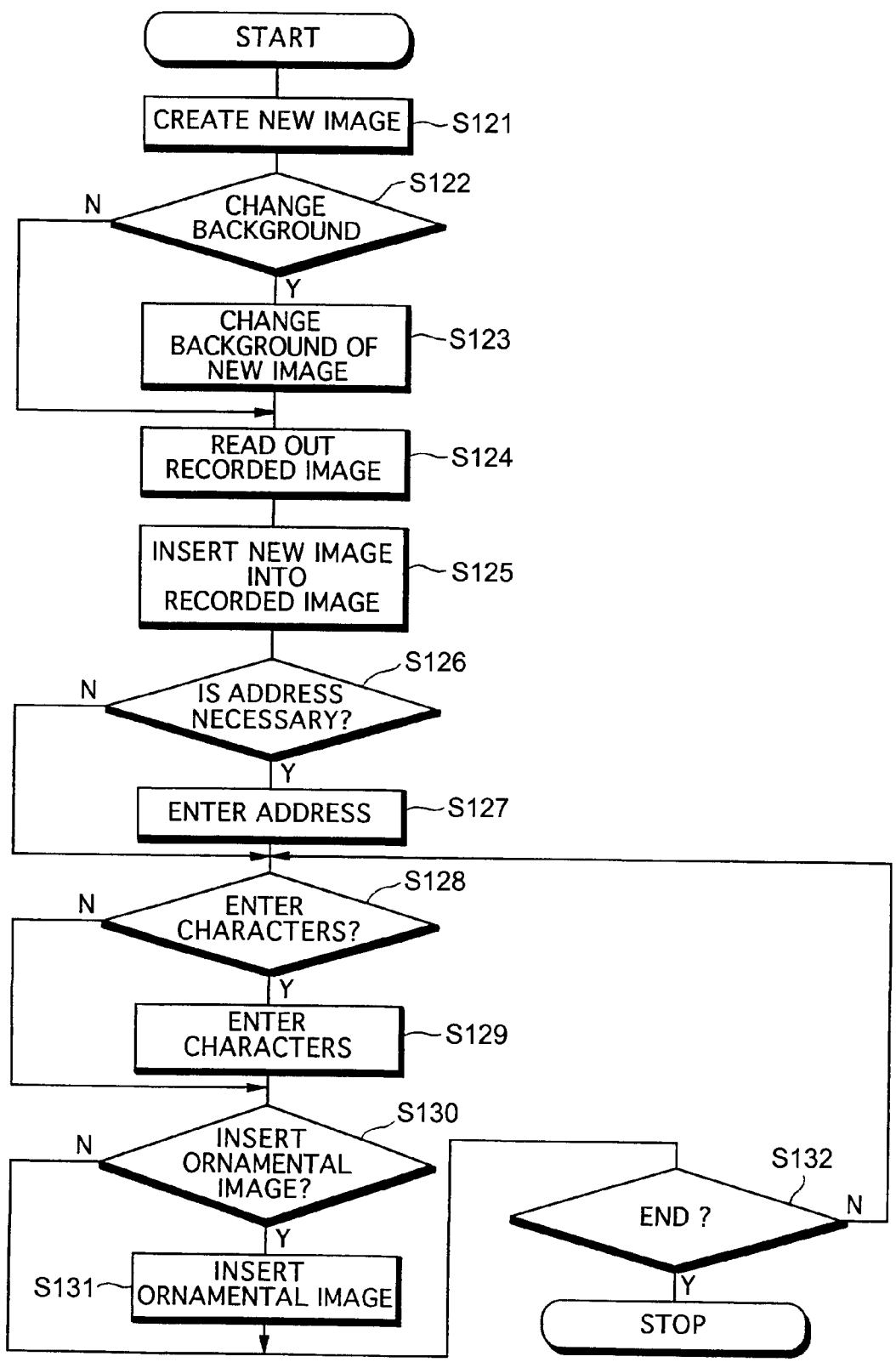
FIG. 64 is a flowchart illustrating the processing procedure of the user's filing system.

FIG. 64 is a flowchart illustrating a processing procedure for generating character image data to which indicia or the like have been added. FIGS. 65a~69b illustrate generated information indicative of images such as indicia. Here an embodiment in which images for printing a New Year's card is illustrated. It goes without saying that a program for generating ordered image data also has been recorded in the software recording area of the digital medium.

Figure 65A:
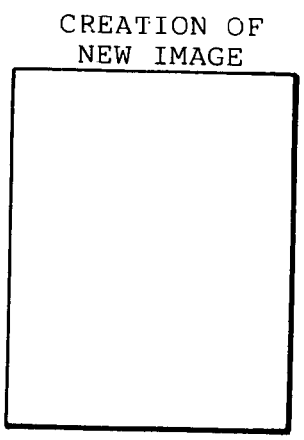
FIGS. 65a~65f illustrate a process through which images representing a New Year's card are generated.
Figure 65B:
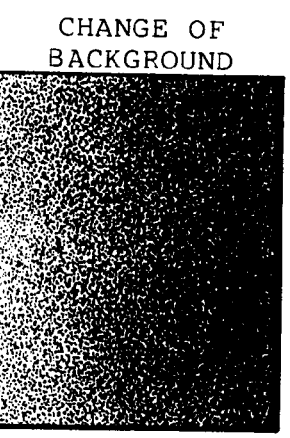

First, a new image of the kind shown in FIG. 65a is created in the filing system and the new image displayed on the display unit 35 (step 121). If necessary, image data are read out of a floppy disk on which image data representing a desired background image have been recorded (though it is permissible to read the image data out of another digital medium or visible image medium and not just a floppy disk) and the background of the new image is changed (steps 122, 123) (see FIG. 65b).

Figure 65C:
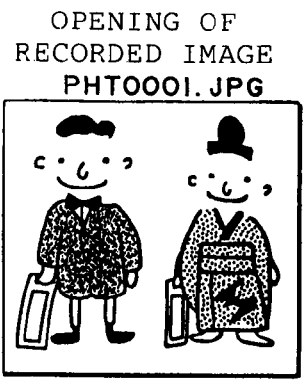
Figure 65D:

Next, a digital medium on which image data have been recorded in the laboratory system is loaded in the filing system and desired image data (e.g., image data having a file name "PHT001.JPG") are read out (step 124). The image data that have been read out of the digital medium are stored in memory temporarily and the recorded image represented by these image data is displayed on the display unit 35 (FIG. 65c). The recorded image is inserted into new image and the result is displayed on the display unit 35 (step 125) (FIG. 65d).

Figure 65E:
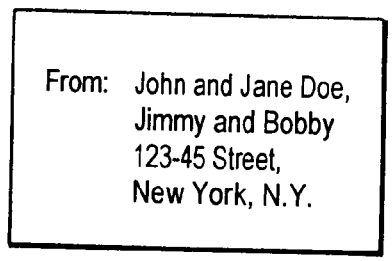
Figure 65F:

If it is necessary to add one's name and address to the New Year's card, then the name and address are entered from the control unit 32 and displayed on the display unit 35 (steps 126, 127) (FIG. 65e). The size of the entered name and address is changed to that desired and the name and address are positioned on the new image in which the recorded image has been inserted in the manner shown in FIG. 65d (FIG. 65f).

As a result of the foregoing operation, an image representing a sample of the New Year's card is generated first. The image data representing this image are recorded in memory.

Next, images of New Year's cards for the user's family and for separate individuals are generated using the image representing this sample.

The generation of an image for a New Year's card for one's father will be described first.

FIG. 66a1 illustrates a state in which an image representing a New Year's card sample read out of memory has been displayed on the display unit 35.

If necessary, characters are entered from the control unit 32 and characters ("Best Wishes for the New Year") A2 are added to the image of the sample (steps 128, 129) (FIG. 66a2). Next, if necessary, an ornamental image A3 for ornamenting the New Year's card is added to the image of the sample (steps 130, 132) (FIG. 66a3).

Figures 67A, 67B:
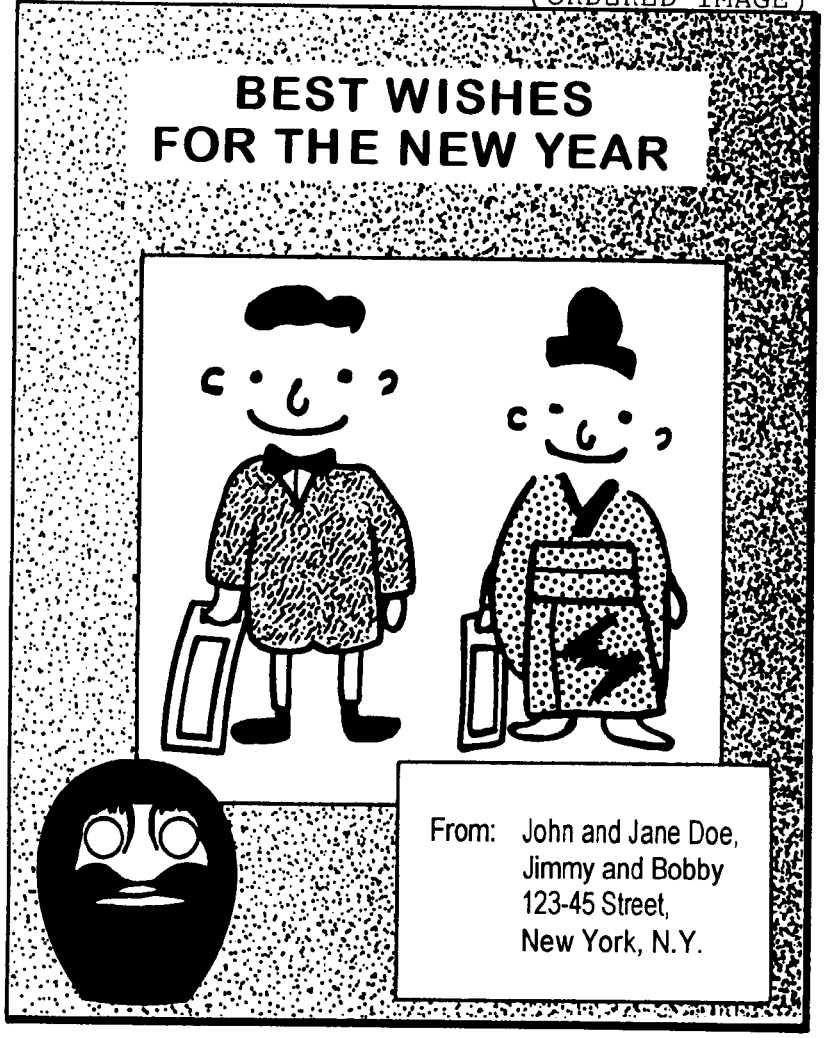
FIG. 67a illustrates an example of an image representing a New Year's card.
FIG. 67b illustrates an example of printing information.

This completes the image representing the New Year's card for one's father (FIG. 66a3, FIG. 67a). With regard to the image data representing the completed image, the file name "DAD PST.JPG", for example, is assigned and this file name is recorded in the order-related data recording area as ordered image data managed by "ODR" in the directory "INFO" contained in the directory "DFS" of the digital medium in the manner mentioned above. Further, a path to the image data "DAD PST.JPG" also is recorded in the directory management area of the digital medium.

Similarly, image data representing the image of the sample area are read out of memory, character inputs ("Happy New Year") B2 and ("New Year's Greetings") C2 are made (FIG. 66b2 and FIG. 66c2) and ornamental images B3 and C3 are inserted (FIG. 66b3 and FIG. 66c3). As a result, images representing New Year's cards for one's mother and for children (FIG. 68a and FIG. 69a) are produced. With regard to the image data representing the completed images, the file names "MOM PST.JPG" and "KIDS PST.JPG", for example, are assigned and these file names are recorded in the order-related data recording area as ordered image data managed by "ODR" in the directory "INFO" contained in the directory "DFS" of the digital medium in the manner mentioned above. Further, paths to the image data "MOM PST.JPG" and "KIDS PST.JPG" also are recorded in the directory management area of the digital medium.

Figure 70:
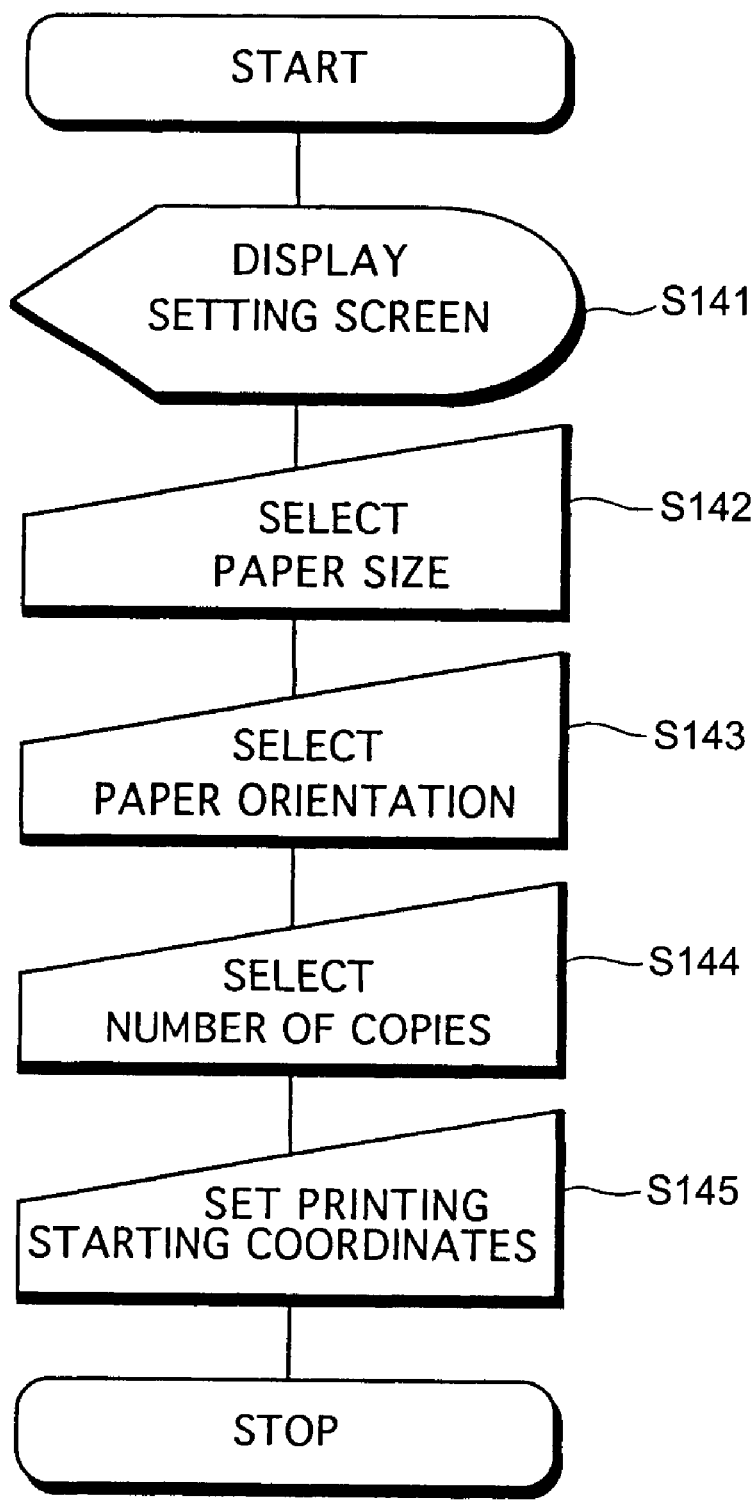
FIG. 70 is a flowchart illustrating a processing procedure for generating printing information.
Figure 71:
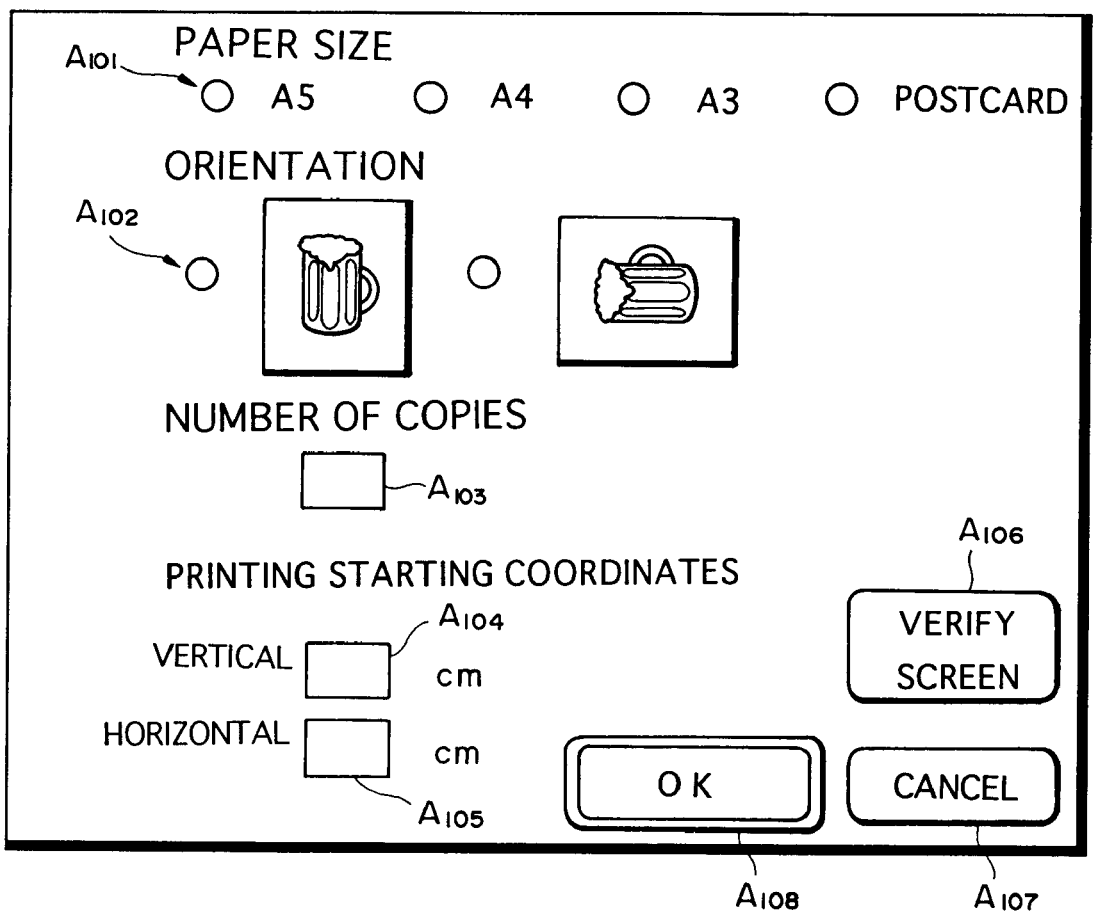
FIG. 71 illustrates an example of a screen displayed on the display unit of the filing system.

FIG. 70 is a flowchart illustrating a processing procedure for creating data representing printing information, and FIG. 71 illustrates an example of a screen displayed on the display unit 35 in a case where data representing printing information are created. A program representing this processing procedure has also been recorded in the software recording area of the digital medium.

In a case where data representing printing information are generated, the digital medium is loaded into the filing system. As a result, the printing information setting screen shown in FIG. 71 is displayed on the display unit 35 based upon the application software that has been recorded on the digital medium (step 141).

In addition to sections $A_{101}$ and $A_{102}$, areas $A_{103}$, $A_{104}$, $A_{105}$, $A_{106}$, $A_{107}$ and $A_{108}$ are displayed on the printing information setting screen.

The section $A_{101}$ is for setting paper size. The user clicks the radio button (for the postcard size in this case) representing the desired size (step 142). The section $A_{102}$ indicates the orientation of the paper when printed on. The user clicks the radio button (for the vertical orientation in this case) indicating the desired orientation (step 143).

The area $A_{103}$ displays the number of print copies entered from the control unit 32. By clicking in the area $A_{103}$ and then entering a number from the control unit 32, the number of copies is set (step 144).

The areas $A_{104}$ and $A_{105}$ display printing starting coordinates entered from the control unit 32. The printing starting coordinates, which indicate the position on the paper from which printing of the ordered image is to start, are represented by the coordinates of the upper left-hand corner of the ordered image to be printed. It is assumed that the upper left-hand corner of the selected paper is the origin of the printing starting coordinates. For example, when the size of the paper and the size of the ordered image to be printed coincide, (0,0) are entered as the printing starting coordinates. The printing starting coordinates are set by clicking in the area $A_{104}$ or $A_{105}$ and then entering the coordinates from the control unit 32 (step 145).

The area $A_{106}$ is clicked by the user when the image to be printed is verified. The area $A_{107}$ is clicked by the user when the setting of printing information is canceled. The area $A_{108}$ is clicked when the set printing information has been verified. The printing information that has been set can be changed by entering the information again.

Figures 68A, 68B:
FIG. 68a illustrates an example of an image representing a New Year's card.
FIG. 68b illustrates an example of printing information.
Figures 69A, 69B:
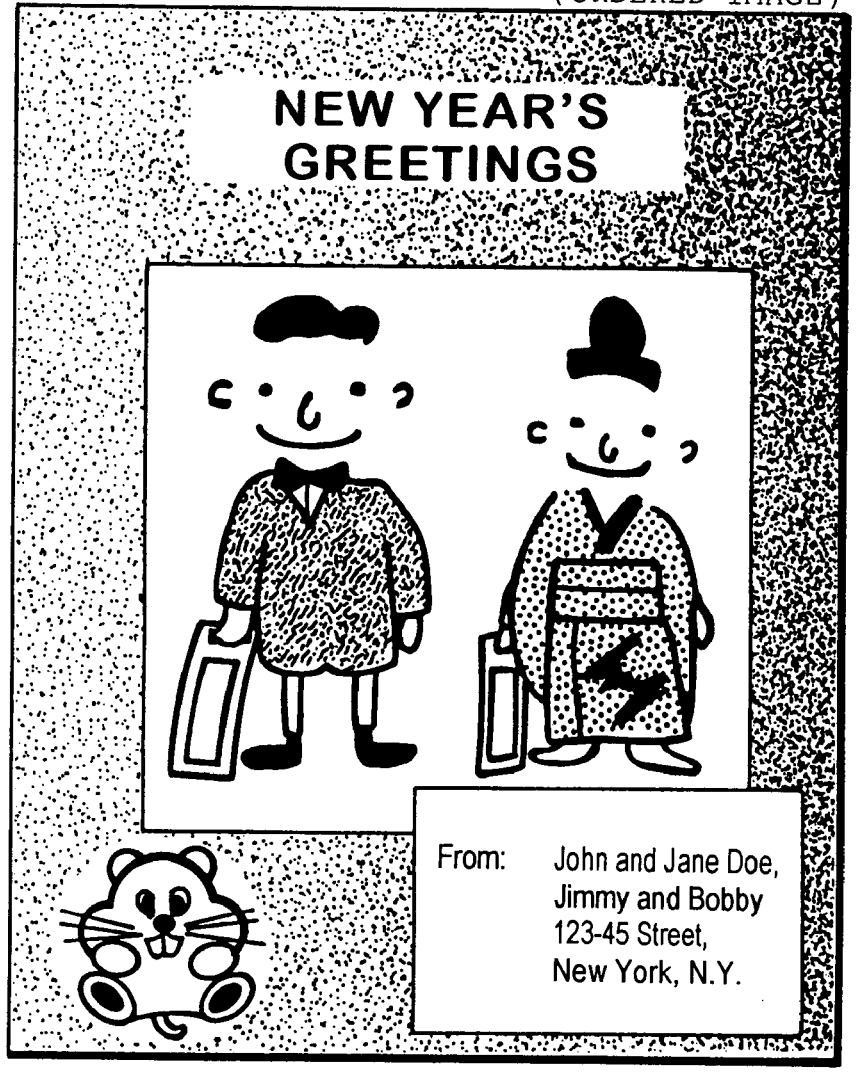
FIG. 69a illustrates an example of an image representing a New Year's card.
FIG. 69b illustrates an example of printing information.

Examples of printing information for one's father, one's mother and one's children set in this manner are illustrated in FIGS. 67b, 68b and 69b, respectively. These items of printing information are assigned the file names "DAD PST.ODR", "MOM PST.ODR" and "KIDS PST.ODR", for example, and they are recorded in the order-related data recording area as printing information data managed by the directory "ODR" in the directory "INFO" contained in the directory "DFS" of the digital medium in the manner described above. Further, paths to "DAD PST.ODR", "MOM PST.ODR" and "KIDS PST.ODR" are recorded in the directory management area of the digital medium in correspondence with paths to "DAD PST.ODR", "MOM PST.ODR" and "KIDS PST.ODR" Each of these items of data is recorded on the digital medium as shown in FIG. 60 in the manner described above.

(4) Laboratory Processing

A digital medium on which ordered image data representing images to which indicia have been added by the user and data representing printing information is carried to a store in which a laboratory system has been installed. The digital medium is loaded into the laboratory system and the images represented by the image data that have been recorded on the digital medium are printed.

Figure 72:
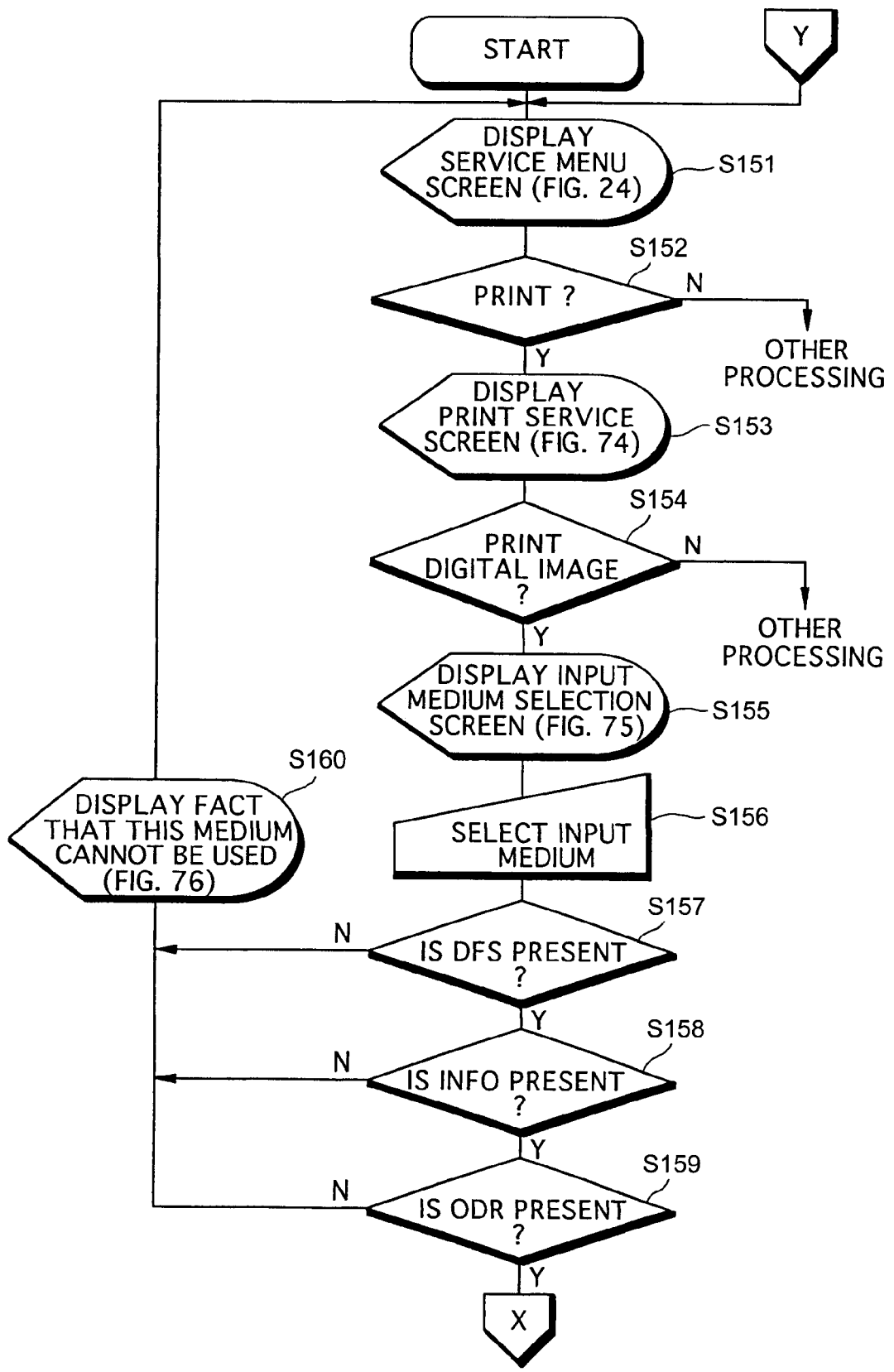
FIG. 72 is a flowchart illustrating a processing procedure for printing in a photo processing laboratory system.
Figure 73:
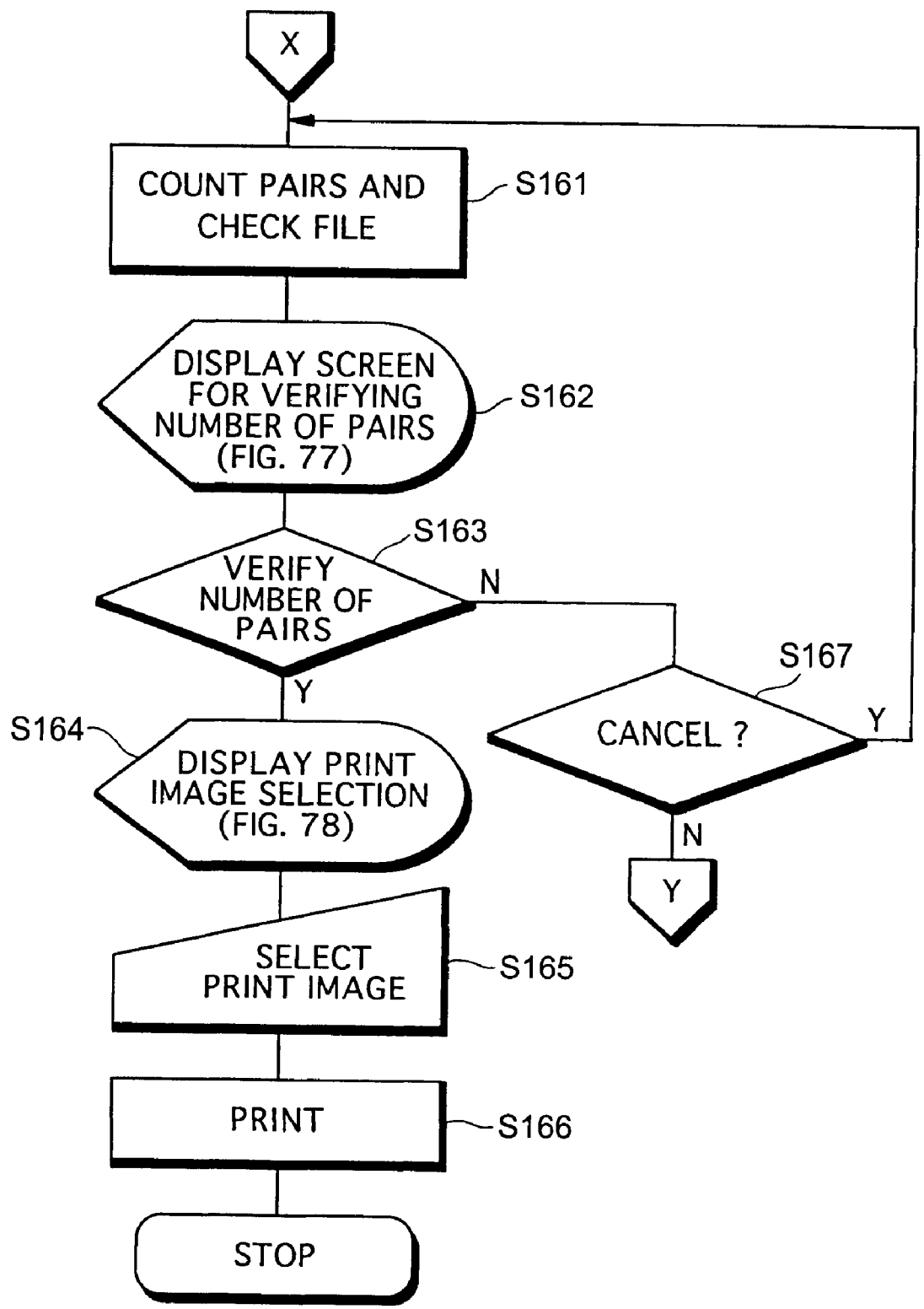
FIG. 73 is a flowchart illustrating a processing procedure for printing in the photo processing laboratory system.
Figure 74:
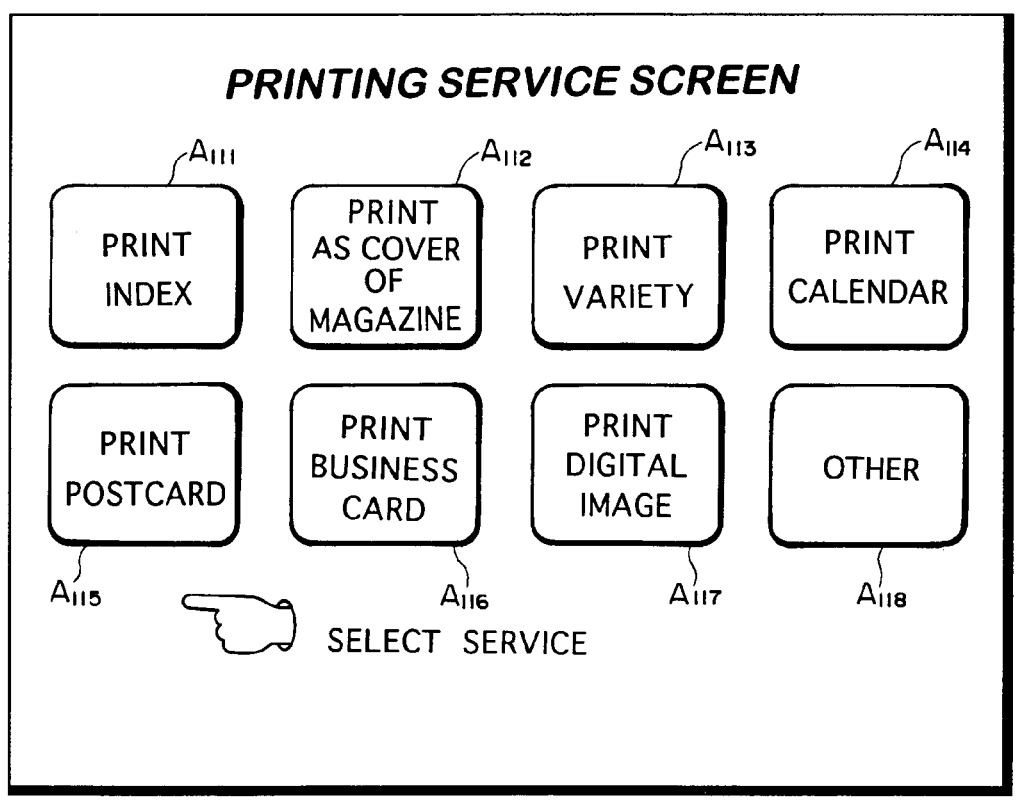
FIG. 74 illustrates an example of a screen displayed on a display unit of the photo processing laboratory system.

FIGS. 72 and 73 are flowcharts illustrating a processing procedure for printing in a laboratory system. FIGS. 74~80 illustrate examples of display screens in the laboratory system. It goes without saying that the program for this printing processing also is stored in the software recording area of the digital medium and the processing is executed in accordance with this program.

The service selection screen shown in FIG. 24 is displayed on the display screen 73 of the laboratory system (step 151).

When printing is to be carried out, the area $A_{12}$ is touched ("YES" at step 152). In response to touching of the area $A_{12}$, the display unit 73 changes over the display to the printing service screen shown in FIG. 74 (step 153).

Areas $A_{111}$, $A_{112}$, $A_{113}$, $A_{114}$, $A_{115}$, $A_{116}$, $A_{117}$ and $A_{118}$ are displayed on the printing service screen. The area $A_{111}$ is touched by the user when a list of thumbnail images of all images that have been recorded on the digital medium is to be displayed, by way of example. The area $A_{112}$ is touched by the user when an image that has been recorded on the digital medium is to be printed upon being arranged as if it were the cover of a magazine. The area $A_{113}$ is touched by the user in a case where an image that has been recorded on the digital medium is to be printed upon being pasted on an already stored template image for ornamentation purposes. The area $A_{114}$ is touched by the user in a case where an image that has been recorded on the digital medium is printed in association with a calendar. The area $A_{115}$ is touched by the user in a case where an image that has been recorded on the digital medium is printed in association with a postcard. The area $A_{116}$ is touched by the user in a case where an image that has been recorded on the digital medium is printed in association with a business card. The area $A_{117}$ is touched by the user in a case where ordered image data and data representing printing information that have been recorded on the digital medium are read out and printed. In this embodiment, the area $A_{117}$ is touched (step 154). The area $A_{118}$ is touched by the user when another type of printing is to be performed.

Figure 75:
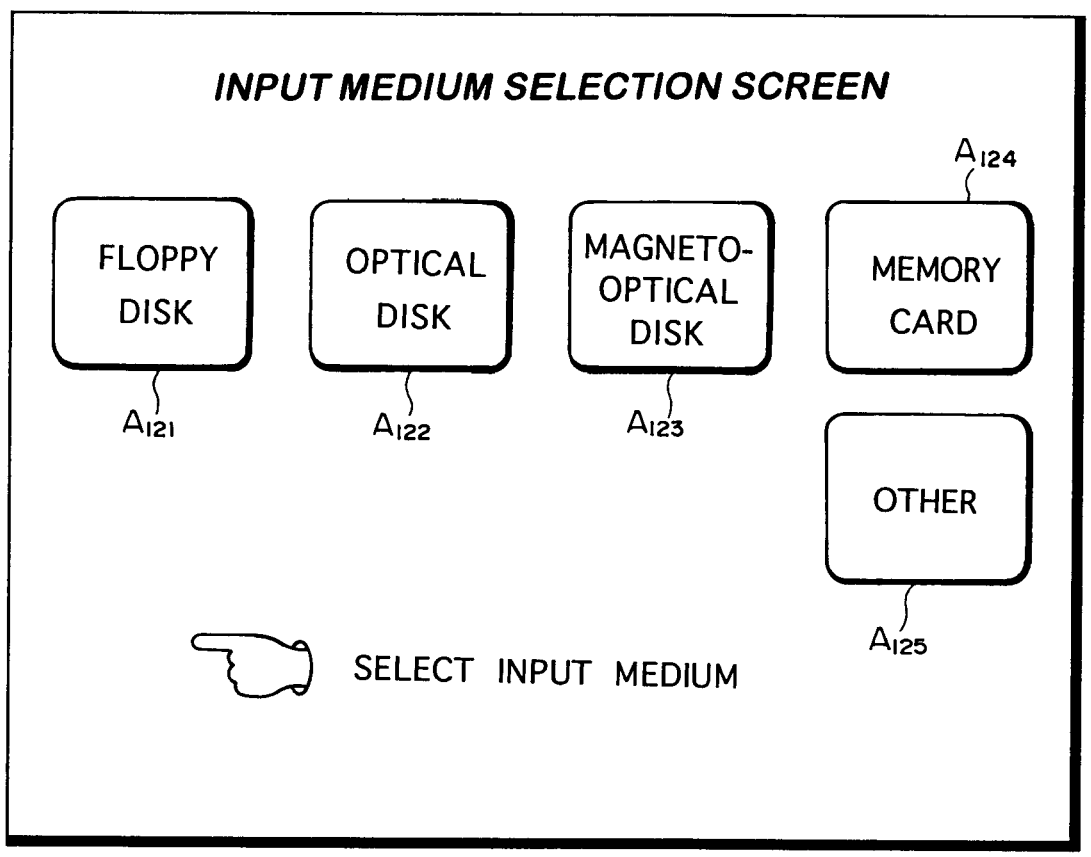
FIG. 75 illustrates an example of a screen displayed on the display unit of the photo processing laboratory system.

When the area $A_{117}$ is touched, the display unit effects a changeover to an input medium selection screen shown in FIG. 75.

The input medium selection screen includes areas $A_{121}$, $A_{122}$, $A_{123}$, $A_{124}$ and $A_{125}$. The area $A_{121}$ is touched by the user when the input medium of the filing system is a floppy disk, the area $A_{122}$ when the input medium is an optical disk, the area $A_{123}$ when the input medium is a magneto-optical disk and the area $A_{124}$ when the input medium is a memory card. The area $A_{125}$ is touched by the user when the input medium of the filing system is some other medium. The driver 79 or 86 conforming to the input medium or the memory card reader 87 is selected by the users (steps 155, 156).

Figure 76:
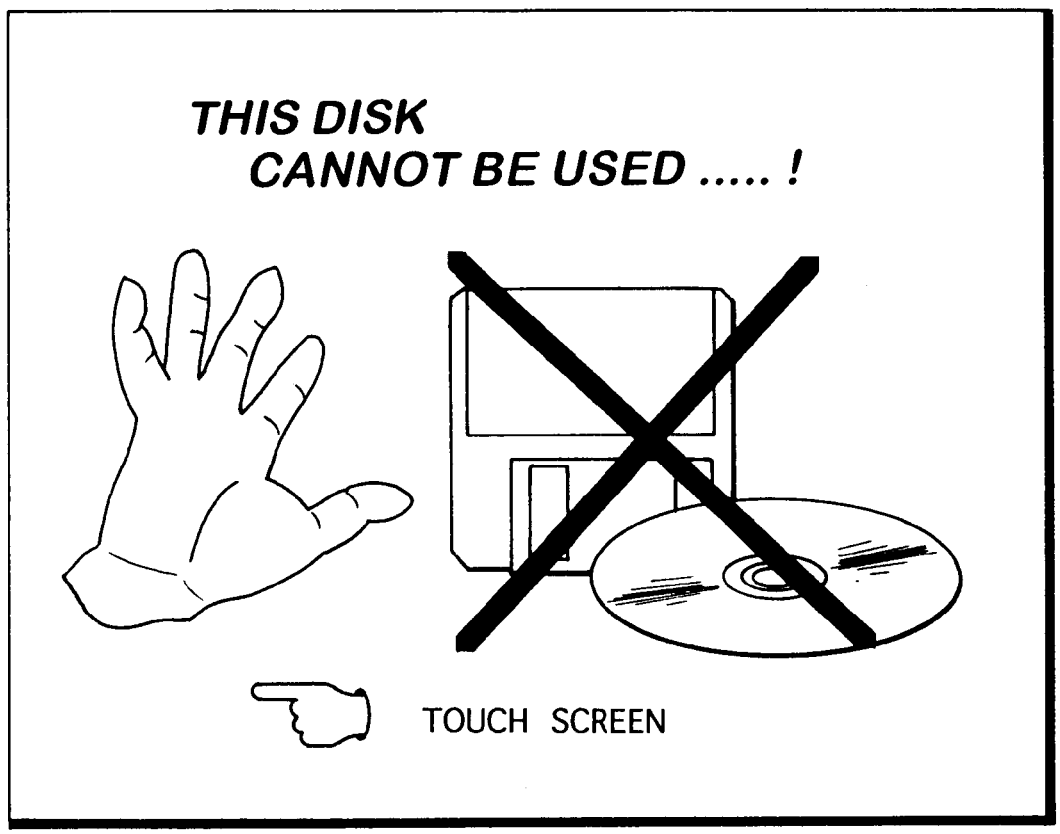
FIG. 76 illustrates an example of a screen displayed on the display unit of the photo processing laboratory system.
Figure 77:
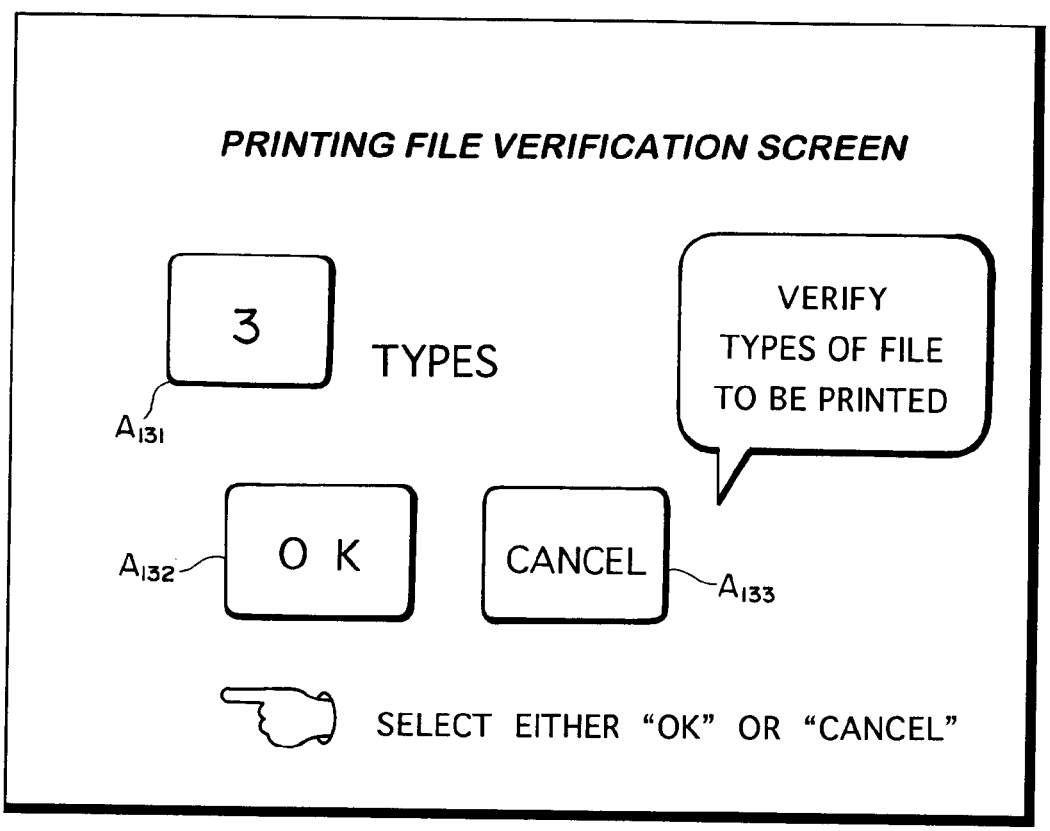
FIG. 77 illustrates an example of a screen displayed on the display unit of the photo processing laboratory system.

When the input medium is selected using the input medium selection screen, the data that have been recorded in the directory management area of the input medium are read out. On the basis of the data that have been read, it is determined whether the directories "DFS", "INFO" and "ODR" are present in the input medium (steps 157~159). If even one of these directories is absent, then ordered image data representing the image to be printed cannot be found. Consequently, a screen to the effect that the medium that has been loaded in the filing system cannot be used is displayed, as shown in FIG. 76 (step 160).

If the directories "DFS", "INFO" and "ODR" are present in the input medium ("YES" at steps 157, 158 and 159), the number of pairs of ordered image data and printing information data that have been recorded on the input medium are counted and file check processing is executed (step 161). As a result, the screen on the display unit 73 is changed over to a printing file verification screen shown in FIG. 77 (step 162).

Areas $A_{131}$, $A_{132}$ and $A_{133}$ are displayed on the printing file verification screen. The number of pairs of ordered image data and printing information data are displayed on the area $A_{131}$. The area $A_{132}$ is touched by the user when the number of types displayed in area $A_{131}$ has been verified. The area $A_{133}$ is touched by the user when printing is to be canceled. If the area $A_{133}$ is touched, the program returns to step 161.

Figure 78:
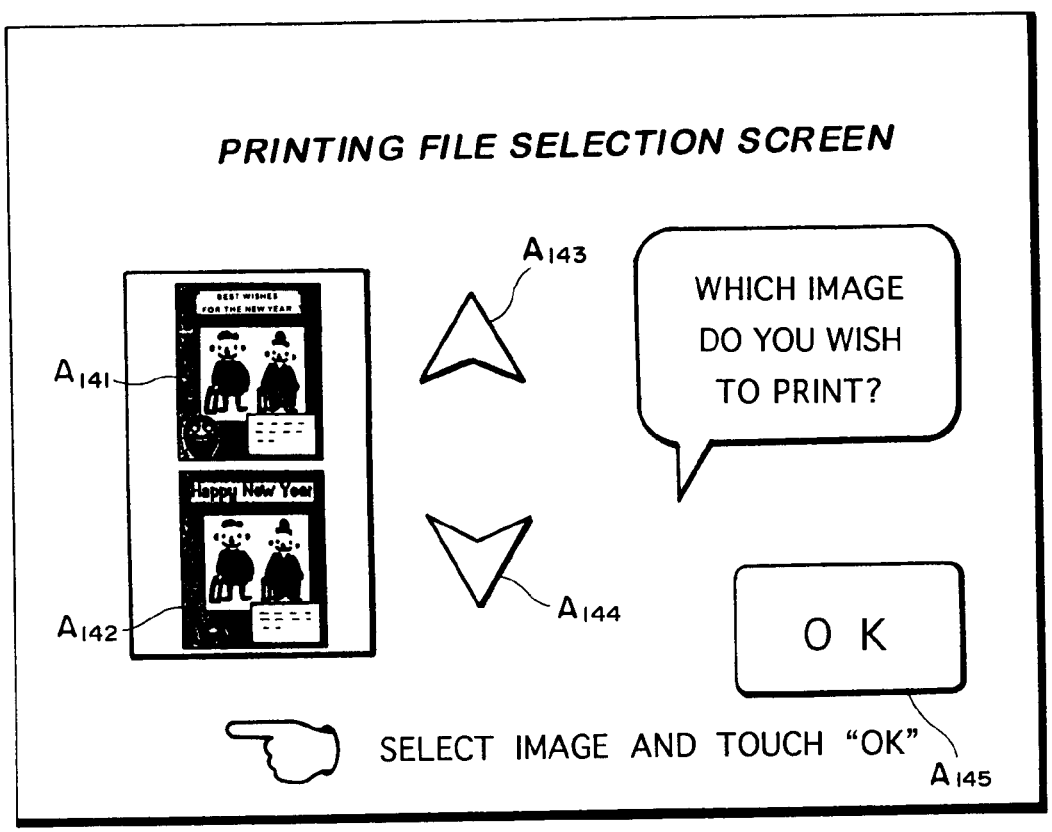
FIG. 78 illustrates an example of a screen displayed on the display unit of the photo processing laboratory system.
Figure 79:
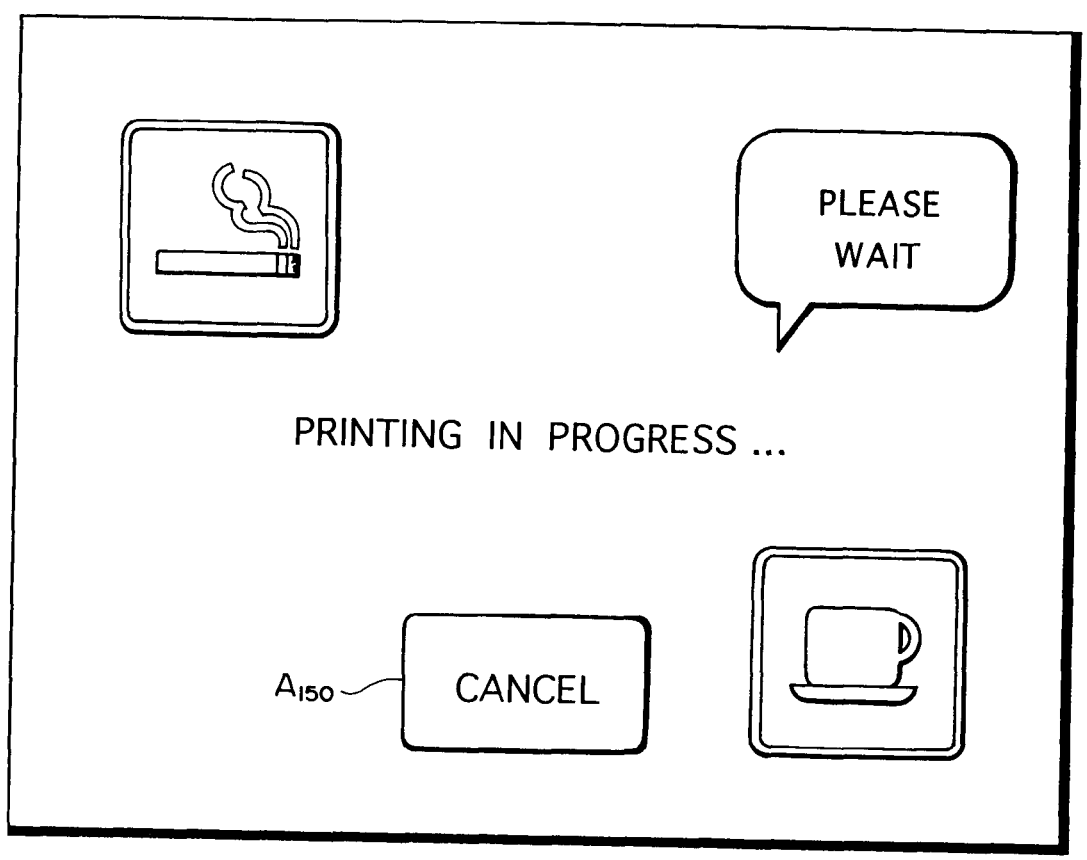
FIG. 79 illustrates an example of a screen displayed on the display unit of the photo processing laboratory system.

If the area $A_{132}$ is touched ("YES" at step 169), a printing file selection screen shown in FIG. 78 is displayed (step 164).

Areas $A_{141}$, $A_{142}$, $A_{143}$, $A_{144}$ and $A_{145}$ are displayed on the printing file selection screen.

Thumbnail images of ordered images to be printed are displayed in the areas $A_{141}$ and $A_{142}$. The thumbnail images can be obtained by using the enlargement/reduction circuit 84 to apply reduction processing to the ordered images that have been read out of the digital medium. Frames are fed forward by touching the area $A_{143}$ and are fed in reverse by touching the area $A_{144}$. As a result, the images displayed in the areas $A_{141}$ and $A_{142}$ are changed. The area $A_{141}$ or $A_{142}$ in which the thumbnail image is displayed is touched. When selection of the image is completed, the area $A_145$ is touched by the user (step 165). When the area $A_{145}$ is touched, the image data of the ordered image corresponding to the thumbnail image selected by the user are read out of the digital medium by referring to the path and the image is printed. A screen shown in FIG. 79 notifying the user of the fact that printing is in progress is displayed (step 166). This screen includes an area $A_{150}$. Printing is canceled by touching the area $A_{150}$.

In the printing operation the printing image data that have been recorded in the order-related data recording area are read out from the path of the printing image information stored in the directory "ODR" and printing is carried out in accordance with the printing information represented by these printing information data.

Figure 80:
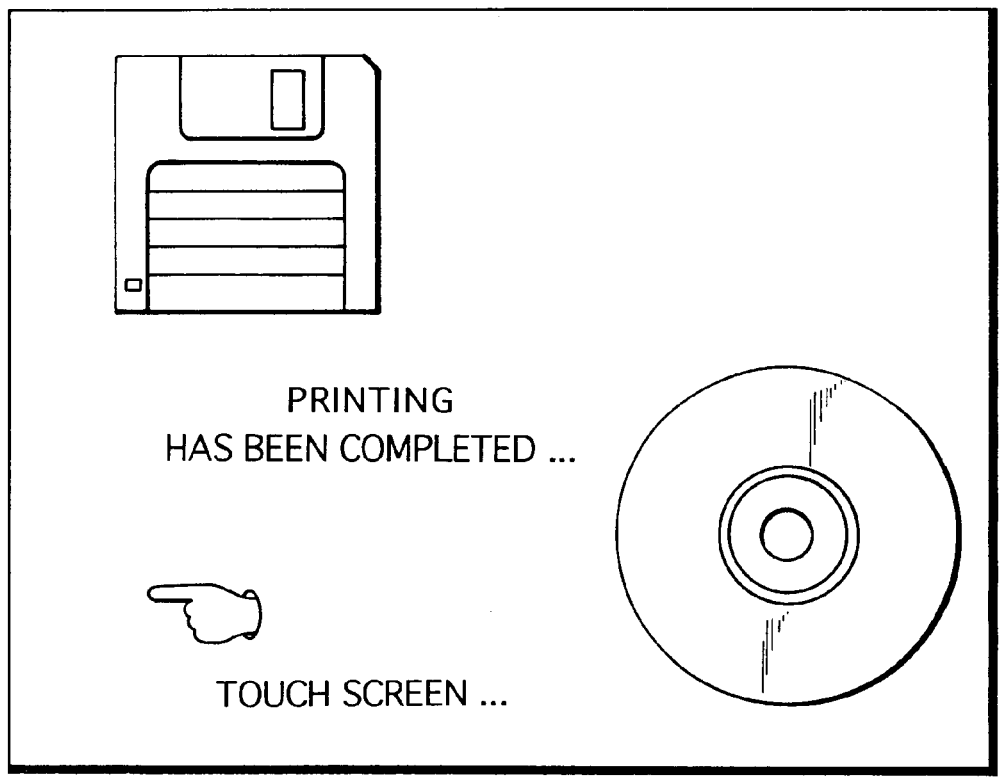
FIG. 80 illustrates an example of a screen displayed on the display unit of the photo processing laboratory system.

When the printing has been completed, the screen on the display unit 73 is changed over to the screen shown in FIG. 80.

The operation described above can be performed by recording a program for implementing the foregoing embodiments on a digital medium such as a floppy disk, optical or magneto-optical disk in advance and then reading the program from the digital medium. It is also possible to perform the above-described operation by receiving this program via a communication network.

As many apparently widely different embodiments of the present invention can be made without departing from the spirit and scope thereof, it is to be understood that the invention is not limited to the specific embodiments thereof except as defined in the appended claims.

What is claimed is:

1. A filing system comprising:

an image data input device for entering image data representing an image;

a mount image data memory in which mount image data on which images represented by the image data entered by said image data input unit are to be pasted, are stored, the mount image data being a plurality of mount images including images of frames;

an ornamental image data memory in which ornamental image data, which represent a plurality of ornamental images for ornamenting the mount images, are stored;

an album type data input device for entering data relating to a type of an album;

a determining device for automatically determining the mount image from the plurality of mount images that are stored in said mount image data memory based on the type of image data and for determining an ornamental image from the plurality of ornamental images represented by the ornamental image data that are stored in said ornamental image data memory based on the data relating to a type of the album entered by said album type data input device; and a memory control device for storing the image data, which have been entered from said image data input device, mount image data, which represent the mount image determined by said determining device, and ornamental image data, which represent the ornamental image determined by said determining device, on a portable storage medium in correlated form.

2. The system according to claim 1, wherein said image data input device is a visible-image medium reading unit for reading a visible image medium inclusive of developed firm and outputting image data of images represented on the visible image medium.

3. The system according to claim 1, wherein said image data input device is an image data reading device for reading image data from a digital medium on which image data have been stored.

4. The system according to claim 1, wherein said image data input device is a reading device for reading images of frames appearing on developed film having information recording zones for recording at least information related to frames, and for outputting image data representing these images; and said determining device reads information that has been recorded in the information recording zones and, on the basis of the information read, selects one type of mount image from among the images of the plural types of mounts represented by the mount image data that have been recorded in said mount image data memory.

5. The system according to claim 1, further comprising a remaining-capacity determination device for determining whether the portable storage medium has enough storage capacity to store the image data and mount image data;

wherein when it has been determined by said remaining-capacity determination device that there still is enough storage capacity, said memory control device stores image data entered from said image data input device and the mount image data representing the mount image selected by said mount image selecting device on said portable storage medium.

6. The system according to claim 1, further comprising a large-capacity storage medium determination device for determining whether the portable storage medium is a large-capacity storage medium;

wherein when it has been determined by said large-capacity storage medium determination device that the portable storage medium is a large-capacity storage medium, said memory control device stores image data entered from said image data input device and the mount image data representing the mount image selected by said mount image selecting device on said portable storage medium.

7. The system according to claim 1, further comprising:

a display unit for displaying a list of thumbnail images of images represented by image data entered by said image data input device; and a designating device for designating a desired image from among the thumbnail images displayed in the list on said display unit;

wherein, from among image data entered by said image data input device, said memory control device stores data, which represent the image corresponding to the thumbnail image designated by said designating device, on the portable storage medium.

8. The system according to claim 1, further comprising an image data compression device for compressing the image data;

wherein said memory control device stores the image data, which have been compressed by said image data compression device, on the portable storage medium.

9. A filing system according to claim 1, further comprising an ornamental image data memory in which ornamental image data, which represent ornamental images for ornamenting images represented by image data entered by said image data input device, have been stored in advance;

wherein said memory control device stores ornamental image data, which have been stored in said ornamental image data memory, in the portable storage medium in addition to image data entered from said image data input device and mount image data representing a mount selected by said mount image determining device, said ornamental image data being stored in correlation with said image data and said mount image data.

10. The system according to claim 1, further comprising a sound data memory in which sound data have been stored in advance;

wherein said memory control device stores sound data, which have been stored in said sound data memory, in the portable storage medium in addition to image data entered from said image data input device and mount image data representing a mount selected by said mount image selecting device, said sound data being stored in correlation with said image data and said mount image data.

11. The system according to claim 1, further comprising:

a stored image data readout device for reading out the image data and the mount image data that have been stored in the portable storage medium; and an image synthesizing device for synthesizing a virtual album image obtained by pasting an image, which is represented by the image data that have been readout by said stored image data readout device, on an image of a mount represented by the mount image data read out, by said stored image data readout device.

12. The system according to claim 11, further comprising a display unit for displaying a virtual album image represented by the virtual album image data created by said image synthesizing device.

13. The system according to claim 11, further comprising a printer for printing a virtual album image represented by the virtual album image data created by said image synthesizing device.

14. A filing method comprising the steps of:

entering image data representing an image;

storing, in advance, mount image data, on which images represented by the entered image data are to be pasted, the mount image data being a plurality of mount images, and ornamental image data, which represent a plurality of ornamental images for ornamenting the mount images;

entering data relating to a type of album;

automatically determining a mount image from the plurality of mount images that have been stored in advance based on the type of image data, the mount image including a frame image, and determining an ornamental image from the plurality of ornamental images represented by the ornamental image data memory, based on a type of the album selected; and storing the entered image data, the mount image data, and the ornamental image data, which represent the ornamental image determined, on a common portable storage medium in correlated form.

15. The method according to claim 14, further comprising the steps of:

storing, in advance, ornamental image data representing ornamental images for ornamenting images represented by entered image data; and storing the ornamental image data, which have been stored in advance, on the portable storage medium in addition to the image data that have been entered and mount image data representing the mount that has been determined, said ornamental image data being stored in correlation with said image data and said mount image data.

16. The method according to claim 14, further comprising the steps of:

storing sound data in advance; and storing the sound data, which have been stored in advance, on the portable storage medium in addition to the image data that have been entered and mount image data representing the mount that has been determined, said sound data being stored in correlation with said image data and said mount image data.

17. The method according to claim 14, further comprising the steps of:

reading the image data and the mount image data that have been stored on the portable storage medium; and synthesizing data representing a pasted image obtained by pasting an image, which is represented by the image data that have been read, on an image of a mount represented by the mount image that have been read out.

18. A filing system comprising:

an image data input device for entering image data representing an image and ornamental image data representing an ornamental image;

a mount image data memory in which mount image data on which images represented by the image data and the ornamental image data entered by said image data input unit are to be pasted, are stored, the mount image data being a plurality of mount images including images of frames;

a mount image determining device for automatically determining a desired mount image from the plurality of mount images that have been stored in said mount image data memory, based on the type of image data; and a memory control means for storing the image data and the ornamental image data, which have been entered from said image data input unit, and mount image data on a common portable storage medium in correlated form.

19. A filing system comprising:

an image data input device for entering image data representing an image;

a mount image data memory in which mount image data on which images represented by the image data entered by said image data input unit are to be pasted, are stored, the mount image data being a plurality of mount images including images of frames;

an ornamental image data memory in which ornamental image data, which represent a plurality of ornamental images for ornamenting the mount images are stored;

an album type data input device for entering data relating to a type of an album;

a display control device for controlling a display device so as to display mount images that have been stored in said mount image data memory;

a determining device for automatically determining a desired mount image from the plurality of mount images that are stored in said mount image data memory based on the type of image data and for determining an ornamental image from the plurality of ornamental image data that are stored in said ornamental image data memory based on the data relating to a type of the album entered by said album type data input device; and a memory control device for storing the image data, which have been entered from said image data input unit, and mount image data, and ornamental image data, which represent the ornamental image determined by said ornamental image determining device, on a portable storage medium in correlated form.

* * * * *